United States Patent
Fujita et al.

(10) Patent No.: US 10,131,981 B2
(45) Date of Patent: Nov. 20, 2018

(54) HOT-DIP GALVANIZED STEEL SHEET AND MANUFACTURING METHOD OF THE SAME

(71) Applicant: NIPPON STEEL & SUMITOMO METAL CORPORATION, Tokyo (JP)

(72) Inventors: Soshi Fujita, Tokyo (JP); Shintaro Yamanaka, Tokyo (JP)

(73) Assignee: NIPPON STEEL AND SUMITOMO METAL CORPORATION, Tokyo (JP)

( * ) Notice: Subject to any disclaimer, the term of this patent is extended or adjusted under 35 U.S.C. 154(b) by 644 days.

(21) Appl. No.: 14/418,852

(22) PCT Filed: Aug. 2, 2013

(86) PCT No.: PCT/JP2013/071004
§ 371 (c)(1),
(2) Date: Jan. 30, 2015

(87) PCT Pub. No.: WO2014/021452
PCT Pub. Date: Feb. 6, 2014

(65) Prior Publication Data
US 2015/0225829 A1    Aug. 13, 2015

(30) Foreign Application Priority Data

Aug. 3, 2012  (JP) ................................. 2012-172739

(51) Int. Cl.
*B32B 15/01*  (2006.01)
*C23C 2/02*  (2006.01)
(Continued)

(52) U.S. Cl.
CPC .............. *C23C 2/02* (2013.01); *B32B 15/013* (2013.01); *C21D 6/001* (2013.01); *C21D 6/002* (2013.01);
(Continued)

(58) Field of Classification Search
None
See application file for complete search history.

(56) References Cited

U.S. PATENT DOCUMENTS 8,076,008 B2   12/2011   Kaneko et al.
8,128,762 B2    3/2012   Watanabe
(Continued)

FOREIGN PATENT DOCUMENTS

CN   101649415 B   8/2011
CN   101646797 B   5/2012
(Continued)

OTHER PUBLICATIONS

Chinese Office Action and Search Report for Chinese Application No. 201380040033.2, dated Aug. 1, 2016, with a partial English translation of the Office Action only.
(Continued)

*Primary Examiner* — Daniel J. Schleis
(74) *Attorney, Agent, or Firm* — Birch, Stewart, Kolasch & Birch, LLP

(57) ABSTRACT

The present invention provides a hot-dip galvanized steel sheet that is excellent in plating wettability and plating adhesiveness even when a base steel sheet contains Si and Mn, and a manufacturing method of the same. The hot-dip galvanized steel sheet according to the present invention includes a base steel sheet containing Si, Mn, and other predetermined components, and a hot-dip galvanizing layer formed on at least one surface of the base steel sheet. In the base steel sheet, a value of $H_A$ representing average hardness in a surface layer ranging from an interface between the base steel sheet and the hot-dip galvanizing layer to 50 μm in depth and a value of $H_B$ representing average hardness in a deep portion ranging from the interface to greater than 50 μm in depth satisfy all the following three relational expressions.

(Continued)

$50 \leq H_A \leq 500$ (1)

$50 \leq H_B \leq 500$ (2)

$0.5 \leq H_A/H_B \leq 0.9$ (3)

10 Claims, 6 Drawing Sheets

(51) Int. Cl.
| | |
|---|---|
| C23C 2/06 | (2006.01) |
| C23C 2/28 | (2006.01) |
| C21D 9/46 | (2006.01) |
| C21D 8/02 | (2006.01) |
| C22C 38/02 | (2006.01) |
| C22C 38/04 | (2006.01) |
| C22C 38/06 | (2006.01) |
| C22C 38/12 | (2006.01) |
| C22C 38/14 | (2006.01) |
| C23C 2/40 | (2006.01) |
| C21D 6/00 | (2006.01) |
| C22C 38/00 | (2006.01) |
| C22C 38/08 | (2006.01) |
| C22C 38/16 | (2006.01) |
| C22C 38/22 | (2006.01) |
| C22C 38/26 | (2006.01) |
| C22C 38/28 | (2006.01) |
| C22C 38/32 | (2006.01) |
| C22C 38/38 | (2006.01) |

(52) U.S. Cl.
CPC ............ *C21D 6/005* (2013.01); *C21D 6/008* (2013.01); *C21D 8/021* (2013.01); *C21D 8/0226* (2013.01); *C21D 8/0236* (2013.01); *C21D 8/0263* (2013.01); *C21D 8/0278* (2013.01); *C21D 9/46* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/22* (2013.01); *C22C 38/26* (2013.01); *C22C 38/28* (2013.01); *C22C 38/32* (2013.01); *C22C 38/38* (2013.01); *C23C 2/06* (2013.01); *C23C 2/28* (2013.01); *C23C 2/40* (2013.01); *Y10T 428/12799* (2015.01)

(56) References Cited

U.S. PATENT DOCUMENTS

| | | | |
|---|---|---|---|
| 2007/0051438 A1 | 3/2007 | Honda et al. | |
| 2009/0162691 A1* | 6/2009 | Ishizuka | C23C 2/02 428/659 |
| 2010/0037995 A1 | 2/2010 | Watanabe | |
| 2012/0152411 A1 | 6/2012 | Morimoto et al. | |
| 2013/0000796 A1* | 1/2013 | Takeda | C21D 6/00 148/533 |
| 2014/0234656 A1 | 8/2014 | Fujita et al. | |

FOREIGN PATENT DOCUMENTS

| | | | |
|---|---|---|---|
| CN | 102482753 A | | 5/2012 |
| JP | 55-122865 A | | 9/1980 |
| JP | H04263054 | * | 9/1992 |
| JP | 11-343551 A | | 12/1999 |
| JP | 2000-309847 A | | 11/2000 |
| JP | 2001-323355 A | | 11/2001 |
| JP | 2005-60743 A | | 3/2005 |
| JP | 2006-233333 A | | 9/2006 |
| JP | 2008-7842 A | | 1/2008 |
| JP | 2009-209397 A | | 9/2009 |
| JP | 2010-132975 A | | 6/2010 |
| JP | 2010132975 | * | 6/2010 |
| JP | 2010-196083 A | | 9/2010 |
| JP | 2011-111670 A | | 6/2011 |
| JP | 2001-279412 A | | 10/2011 |
| WO | WO 2011/025042 A1 | | 3/2011 |
| WO | WO2011126064 | * | 10/2011 |
| WO | WO 2013/047804 A1 | | 4/2013 |

OTHER PUBLICATIONS

International Search Report, dated Oct. 29, 2013, issued in PCT/JP2013/071004.
Office Action in Japanese Application No. 2013-551091 dated Jul. 15, 2014.
Office Action in Taiwanese Application No. 102127806 dated Oct. 16, 2014.
Written Opinion of the International Searching Authority, dated Oct. 29, 2013, issued in PCT/JP2013/071004.

* cited by examiner

HOT-DIP GALVANIZED STEEL SHEET AND MANUFACTURING METHOD OF THE SAME

TECHNICAL FIELD

The present invention relates to a hot-dip galvanized steel sheet and a manufacturing method of the same, and in more detail, relates to a hot-dip galvanized steel sheet excellent in plating wettability and plating adhesiveness and applicable as a member of products in an automotive field, a household appliance field, or a building material field and a manufacturing method of the same.

BACKGROUND ART

As a member of products in an automotive field, a household appliance field, or a building material field, surface-treated steel sheets to which rust prevention property is given are used. Among them, a hot-dip galvanized steel sheet is excellent in rust prevention property and is inexpensive, to thus be used heavily.

Generally, the hot-dip galvanized steel sheet is manufactured by the following method in general.

First, a thin steel sheet obtained by performing a hot-working hot rolling treatment, a cold-working hot rolling treatment, and a heat treatment on a slab is prepared as a base steel sheet (a base metal). Second, in a pretreatment step aiming at washing of the surface of the base steel sheet, degreasing and/or pickling are/is performed, or the base steel sheet is introduced into a preheating furnace without performing the pretreatment step, and thereby oil on the surface of the base steel sheet is burned to be removed. Third, the base steel sheet is heated to high temperature in a heating furnace (an annealing furnace), to thereby be subjected to recrystallization annealing. Fourth, the obtained base steel sheet is immersed in a hot-dip galvanizing bath, to thereby be subjected to a hot-dip galvanizing treatment. Incidentally, the base steel sheet is cooled down to a temperature suitable for plating prior to the immersion in a molten zinc bath.

Here, there will be explained a heat treatment atmosphere. The treatment atmosphere where the above-described recrystallization annealing is performed is set to an Fe reducing atmosphere. This makes it possible to suppress generation of oxides of Fe and to prevent or inhibit oxides of Fe from worsening plating wettability and plating adhesiveness in the subsequent hot-dip galvanizing treatment. Further, the treatment atmosphere of the above-described hot-dip galvanizing treatment is also set to an Fe reducing atmosphere similarly to the recrystallization annealing. Thereby, the hot-dip galvanized steel sheet can be manufactured continuously without being exposed to an oxidizing atmosphere such as the air.

Incidentally, the heating furnace used for performing recrystallization annealing in a continuous hot-dip galvanizing facility enabling the above-described continuous manufacture includes types such as a DFF (a direct firing type), a NOF (a non-oxidizing type), an all radiant tube type enabling the entire treatment atmosphere in the furnace to be changed into an Fe reducing atmosphere (a total reducing type), and combinations of them. At present, due to the point of easy operation, the point that roll pickup does not occur easily in the heating furnace, and the point that a high quality plated steel sheet can be manufactured at lower cost, a continuous hot-dip galvanizing facility using an all radiant tube type heating furnace has become widely used.

By the way, in recent years, in an automotive field in particular, among the hot-dip galvanized steel sheets, a hot-dip galvanized steel sheet in which elements such as Si and Mn are contained in a material of a base steel sheet and thereby the base steel sheet is increased in strength has been used increasingly. This is to satisfy a demand for achieving both an increase in strength of a member aiming at protection of passengers at the time of collision and a decrease in weight of a member aiming at improvement of fuel efficiency in the automotive filed.

However, Si and Mn are easily oxidizable elements as compared to Fe, so that there is caused a problem that Si and Mn contained in the base steel sheet are oxidized by heating for recrystallization annealing in the all radiant type heating furnace in spite of the treatment atmosphere being an Fe reducing atmosphere. Concretely, in the process of recrystallization annealing, Si and Mn existing on the surface of the base steel sheet are oxidized with a high probability, and in addition to this, thermally diffused Si and Mn are also oxidized in the vicinity of the surface of the base steel sheet, resulting in that oxides of Si and Mn are gradually concentrated in a surface layer of the steel sheet. Then, in the case when oxides of Si and Mn are concentrated in the surface layer of the base steel sheet, when the base steel sheet is immersed in a molten zinc bath in the subsequent hot-dip galvanizing treatment, the oxides of Si and the oxides of Mn exposed to the surface of the base steel sheet prevent the molten zinc and the base steel sheet from coming into contact with each other, to thus become a cause of worsening of plating wettability and become a cause of inhibition of plating adhesion to the base steel sheet.

As documents disclosing a technique for suppressing the concentration of oxides of Si and Mn described above, ones to be described below can be cited.

Patent Document 1 discloses that prior to a hot-dip galvanizing treatment, an oxidation treatment is performed on a base steel sheet in such a manner that a thickness of an oxide film to be formed on the surface becomes 400 to 10000 Å, and subsequently Fe is reduced in an in-furnace atmosphere containing hydrogen. Further, Patent Document 2 discloses that prior to a hot-dip galvanizing treatment, a surface portion of a base steel sheet is first oxidized, and subsequently an oxygen potential that determines a treatment atmosphere in a reducing furnace is adjusted, and thereby reduction of Fe and oxidation of Si inside the steel sheet (internal oxidation) are both controlled.

The techniques disclosed in these two documents are made by focusing on the recrystallization annealing process. Here, when a time period for reduction of Fe (reduction time period) is too long, removal of an oxide film of Fe can be performed, but concentration of oxides of Si in the surface layer of the base steel sheet is caused, and further when the reduction time period is too short, the oxide film of Fe remains on the surface portion of the base steel sheet. Then, realistically, when it is considered that the thickness of the oxide film formed on the surface of the base steel sheet by the oxidation treatment is non-uniform, there is caused a problem that the technique of adjusting the reduction time period described above alone is not sufficient for improving the plating adhesiveness. Further, when the thickness of the oxide film of Fe formed by the oxidation treatment is too thick, a matter in which the oxides are peeled off from the base steel sheet to attach to surfaces of rolls disposed in the furnace (roll pickup) is caused. In this case, there is also caused a problem that outlines of the oxides attached to the roll surfaces are transferred onto the surface of the following steel sheet and thereby quality is impaired (appearance flaws).

Further, Patent Documents 3, 4, and 5 each disclose a technique in which for the purpose of solving the above-described problems caused by oxidation of Fe and suppressing the aforementioned concentration of oxides of Si and Mn, prior to a hot-dip galvanizing treatment, during recrystallization annealing in an all radiant tube type heating furnace, an oxygen potential that determines a treatment atmosphere is increased up to the extent that Si and Mn are internally oxidized.

Similarly, Patent Documents 6, 7, 8, and 9 each disclose a technique of adjusting a treatment atmosphere used for a heating furnace.

However, in the techniques disclosed in Patent Documents 3 to 9, when the oxygen potential is increased too much, Si and Mn can be internally oxidized, but Fe is also oxidized, resulting in that the same problems as those described above are caused. On the other hand, even when the oxygen potential is increased up to the extent that Fe is not oxidized, internal oxidation of Si and Mn becomes insufficient, resulting in that oxides of Si and Mn are concentrated in the surface layer of the base steel sheet. Thus, either case causes a problem that the oxygen potential that determines a treatment atmosphere cannot be adjusted accurately. Therefore, by these techniques, a hot-dip galvanized steel sheet having uniform quality cannot be manufactured securely.

Further, as another example of the technique for suppressing concentration of oxides of Si and Mn, there can be cited a technique of employing a means of further increasing steps necessary for a general manufacturing method of hot-dip galvanizing described above. For example, Patent Document 10 discloses a technique in which annealing is performed two times prior to a hot-dip galvanizing treatment. Such a technique is regarded that when oxides of Si formed on the surface of a base steel sheet (surface concentrated substances) are pickled and removed after the first annealing is performed, formation of surface concentrated substances can be suppressed at the time of the second annealing. However, when the concentration of Si in the base steel sheet is high, the surface concentrated substances cannot be removed sufficiently by pickling, resulting in that there is caused a problem that plating wettability and plating adhesiveness cannot be improved sufficiently. Further, in order to remove the surface concentrated substances of Si, a facility for performing annealing two times and a facility for performing pickling are newly required, so that there is also caused a problem that facility cost is increased, and further production cost is also increased.

Further, as still another example of the technique for suppressing concentration of oxides of Si and Mn described above, there can be cited a technique in which prior to a plating step, Si and Mn are internally oxidized in a hot rolling step. For example, Patent Document 11 discloses a technique in which when manufacturing a hot-dip galvanized steel sheet in a continuous hot-dip galvanizing facility, an oxygen potential is adjusted in a hot rolling step, to thereby internally oxidize Si in a thin steel sheet (a base steel sheet). However, in such a technique, when rolling of the base steel sheet is performed in a cold rolling step following the hot rolling step, an internal oxide layer is also rolled simultaneously and a thickness dimension of the internal oxide layer is decreased, resulting in that in the subsequent recrystallization annealing process, oxides of Si are concentrated in a surface layer of the base steel sheet. Therefore, there is caused a problem that even by the technique, plating wettability and plating adhesiveness cannot be improved sufficiently. Further, in the technique, oxides of Fe are formed at the same time as Si is internally oxidized in the hot rolling step, but as described previously, there is also caused a problem that the quality of a steel sheet to be manufactured is impaired due to peeling of oxides of Fe.

Incidentally, the hot-dip galvanized steel sheet containing Si and Mn is not limited to the above-described problems (problems explained by using Patent Documents 1 to 11 as examples), and has a fundamental problem that workability (for example, ductility) of the base steel sheet is inferior to that of a hot-dip galvanized steel sheet not containing Si and Mn because the strength (hardness) of the base steel sheet is increased. Here, when the ductility of the base steel sheet is low, even if a contact between the hot-dip galvanizing layer and the base steel sheet is made well, for example, in the case when working (for example, press forming) is performed on the hot-dip galvanized steel sheet, a crack is caused in the base steel sheet itself or in an interface between the base steel sheet and the hot-dip galvanizing layer and thereby the hot-dip galvanizing layer becomes likely to be peeled off from the base steel sheet. That is, the hot-dip galvanized steel sheet containing Si and Mn is required to improve the plating adhesiveness more than the hot-dip galvanized steel sheet not containing Si and Mn is required.

PRIOR ART DOCUMENT

Patent Document

Patent Document 1: Japanese Laid-open Patent Publication No. 55-122865
Patent Document 2: Japanese Laid-open Patent Publication No. 2001-323355
Patent Document 3: Japanese Laid-open Patent Publication No. 2008-007842
Patent Document 4: Japanese Laid-open Patent Publication No. 2001-279412
Patent Document 5: Japanese Laid-open Patent Publication No. 2009-209397
Patent Document 6: Japanese Laid-open Patent Publication No. 2011-111670
Patent Document 7: Japanese Laid-open Patent Publication No. 2005-060743
Patent Document 8: Japanese Laid-open Patent Publication No. 2006-233333
Patent Document 9: International Publication Pamphlet No. WO 2013/047804
Patent Document 10: Japanese Laid-open Patent Publication No. 2010-196083
Patent Document 11: Japanese Laid-open Patent Publication No. 2000-309847

DISCLOSURE OF THE INVENTION

Problems to be Solved by the Invention

A principal object of the present invention is to provide a hot-dip galvanized steel sheet that is excellent in plating wettability and plating adhesiveness even when a base steel sheet contains Si and Mn, and a manufacturing method of the same.

Here, the term of "hot-dip galvanized steel sheet" is a surface-treated steel sheet provided with a plating layer (to be referred to as a "hot-dip galvanizing layer" hereinafter) formed by undergoing a plating treatment using a melt containing zinc as its main component (to be referred to as a "hot-dip galvanizing treatment" hereinafter).

Further, the term of "plating wettability" means a property in which plating in a molten state (molten zinc) tries to spread over a surface of a base steel sheet (a base metal) without being repelled thereon. In more detail, this plating wettability can be evaluated by observing a state of a solid-liquid interface (a contact angle), but in the present invention, it is evaluated depending on whether peeling of plating has occurred to the extent that the hot-dip galvanized steel sheet is press-formed, and then an obtained steel sheet is evaluated as an unplating defect (appearance failure, rust prevention property failure, or the like). When appearance failure is caused in the press-formed hot-dip galvanized steel sheet, for example, it is evaluated to be "poor in plating wettability."

The term of "plating adhesiveness" means a property in which plating in a solidified state (a hot-dip galvanizing layer) and a base steel sheet (a base metal) are in a state of adhering to each other while being in a surface contact with each other, or they try to maintain the state. In more detail, this plating adhesiveness can be evaluated by observing a state of a solid-solid interface, but in the present invention, it is evaluated depending on whether when a hot-dip galvanized steel sheet is press-formed by using a metal mold, the thing in which part of a hot-dip galvanizing layer peeled off from the steel sheet is turned into powder to adhere to a surface of the metal mold (what is called powdering) is recognized. When powdering is recognized, for example, appearance failure is caused in the following steel sheet to be obtained by press forming, or worsening of slidability of the metal mold is caused, so that it is evaluated to be "poor in plating adhesiveness." Incidentally, the plating adhesiveness may also be evaluated in accordance with "Test methods for hot dip galvanized coatings" of Japanese Industrial Standard JIS H 0401: 2007 (corresponding to International Standard ISO 1460: 1992).

Incidentally, those skilled in the art can understand other objects of the present invention by referring the description of the present description with their own common general technical knowledge. Objects of providing a method for manufacturing a hot-dip galvanized steel sheet excellent in plating wettability and plating adhesiveness and providing a hot-dip galvanized steel sheet having excellent workability and containing Si and Mn, for example, are also included in the object of the present invention.

Means for Solving the Problems

The present inventors, in order to solve the above-described problems, focused on an effect of, in the vicinity of an interface between a hot-dip galvanizing layer and a base steel sheet constituting a hot-dip galvanized steel sheet, hardness of the base steel sheet on plating wettability and plating adhesiveness and performed earnest examinations, and as a result, found out that even when the base steel sheet contains Si and Mn, defining the hardness of the base steel sheet by using predetermined parameters makes it possible to provide a hot-dip galvanized steel sheet excellent in workability. Further, the present inventors focused on manufacturing conditions for manufacturing such a hot-dip galvanized steel sheet and performed earnest examinations, and as a result, found out that conditions that treatment atmospheres of a radiant tube type heating furnace and a soaking furnace provided in a facility for manufacturing the hot-dip galvanized steel sheet (particularly, partial pressure ratios of carbon dioxide and carbon monoxide to be supplied into these furnaces) should satisfy are defined, thereby making it possible to provide a method for continuously manufacturing the hot-dip galvanized steel sheet excellent in plating wettability and plating adhesiveness with uniform quality.

That is, the gist of the present invention is as follows.

(A1) A hot-dip galvanized steel sheet including a base steel sheet and a hot-dip galvanizing layer formed on at least one surface of the base steel sheet, in which
the base steel sheet contains, in mass %,
C: not less than 0.05% nor more than 0.50%,
Si: not less than 0.1% nor more than 3.0%,
Mn: not less than 0.5% nor more than 5.0%,
P: not less than 0.001% nor more than 0.5%,
S: not less than 0.001% nor more than 0.03%,
Al: not less than 0.005% nor more than 1.0%, and
one or two or more of elements selected from Ti, Nb, Cr, Mo, Ni, Cu, Zr, V, W, B, Ca, and a rare-earth element REM: not less than 0% nor more than 1% each, and
a balance being composed of Fe and inevitable impurities, and
in the base steel sheet, a value of $H_A$ representing average hardness in a surface layer ranging from an interface between the base steel sheet and the hot-dip galvanizing layer to 50 μm in depth and a value of $H_B$ representing average hardness in a deep portion ranging from the interface to greater than 50 μm in depth satisfy all the following relational expressions (1) to (3).

$$50 \leq H_A \leq 500 \tag{1}$$

$$50 \leq H_B \leq 500 \tag{2}$$

$$0.5 \leq H_A/H_B \leq 0.9 \tag{3}$$

(A2) The hot-dip galvanized steel sheet according to (A1), in which
$W_{C(A)}$, $W_{Si(A)}$, and $W_{Mn(A)}$ representing content percentages of C, Si, and Mn in mass % in the surface layer of the base steel sheet respectively and $W_{C(B)}$, $W_{Si(B)}$, and $W_{Mn(B)}$ representing content percentages of C, Si, and Mn in mass % in the deep portion of the base steel sheet respectively satisfy all the following relational expressions (4) to (6).

$$0.1 \leq W_{C(A)}/W_{C(B)} \leq 0.5 \tag{4}$$

$$0.1 \leq W_{Si(A)}/W_{Si(B)} \leq 0.5 \tag{5}$$

$$0.1 \leq W_{Mn(A)}/W_{Mn(B)} \leq 0.5 \tag{6}$$

(A3) The hot-dip galvanized steel sheet according to (A1) or (A2), in which
the base steel sheet contains one or two or more of elements selected from Ti, Nb, Cr, Mo, Ni, Cu, Zr, V, W, B, Ca, and a rare-earth element REM in not less than 0.0001% nor more than 1% each.

(A4) The hot-dip galvanized steel sheet according to any one of (A1) to (A3), in which
the hot-dip galvanizing layer has a thickness in the range of not less than 1 μm nor more than 30 μm, and contains not less than 4 mass % nor more than 14 mass % of Fe, not less than 0.1 mass % nor more than 1 mass % of Al, and a balance being composed of Zn and inevitable impurities.

(B1) A method for manufacturing a hot-dip galvanized steel sheet by performing a hot-dip galvanizing treatment on a base steel sheet, in which
the base steel sheet is obtained after undergoing a casting step, a hot rolling step, a pickling step, a cold rolling step, an annealing step, and a soaking and holding step, and contains, in mass %, C: not less than 0.05% nor more than 0.50%,
Si: not less than 0.1% nor more than 3.0%,
Mn: not less than 0.5% nor more than 5.0%,
P: not less than 0.001% nor more than 0.5%,
S: not less than 0.001% nor more than 0.03%,
Al: not less than 0.005% nor more than 1.0%, and
one or two or more of elements selected from Ti, Nb, Cr, Mo, Ni, Cu, Zr, V, W, B, Ca, and a rare-earth element REM: not less than 0% nor more than 1% each, and
a balance being composed of Fe and inevitable impurities,
the annealing step and the soaking and holding step are performed in a continuous hot-dip galvanizing facility equipped with an all radiant tube type heating furnace as a heating furnace and a soaking furnace,
the annealing step is performed so as to satisfy the following heating furnace conditions:
  heating temperature: a sheet temperature $T_0$ [° C.] representing the maximum temperature that, when a cold-rolled steel sheet obtained after undergoing the cold rolling step is heated in the heating furnace, the cold-rolled steel sheet reaches is in the range of not lower than a temperature $T_1$ [° C.] nor higher than a temperature $T_2$ [° C.];
  heating time period: a heating time period $S_0$ [second] in the heating furnace is in the range of not shorter than a time period $S_1$ [second] nor longer than a time period $S_2$ [second]; and
  atmosphere gas: a nitrogen atmosphere containing carbon dioxide and carbon monoxide in which log ($PCO_2/PCO$) being a logarithmic value of a value of, in the heating furnace, a partial pressure value of carbon dioxide divided by a partial pressure value of carbon monoxide exhibits a value in the range of not less than −2 nor more than 1,
here, the temperatures $T_1$ and $T_2$ and the time periods $S_1$ and $S_2$ are defined as follows:
$T_1$: a temperature [° C.] satisfying the following relational expression (7) using $W_{Si(B)}$ and $W_{Mn(B)}$ representing content percentages of Si and Mn in mass % in a deep portion ranging from a surface of the cold-rolled steel sheet to greater than 50 μm in depth respectively;

$$T_1 = 500 - 50 \times W_{Si(B)} - 20 \times W_{Mn(B)} \quad (7)$$

$T_2$: a temperature [° C.] satisfying the following relational expression (8) using a temperature $T_{Ac3}$ [° C.] corresponding to a transformation point $A_{c3}$ of the cold-rolled steel sheet;

$$T_2 = T_{Ac3} + 40 \quad (8)$$

$S_1$: a time period [second] satisfying the following relational expression (9) using $W_{Si(B)}$ [mass %] representing the content percentage of Si and $W_{Mn(B)}$ [mass %] representing the content percentage of Mn in the deep portion of the cold-rolled steel sheet; and $$S_1 = 50 + 20 \times W_{Si(B)} + 10 \times W_{Mn(B)} \quad (9)$$

$S_2$: a time period [second] satisfying the following relational expression (10) using $W_{C(B)}$ [mass %] representing content percentage of C in the deep portion of the cold-rolled steel sheet, $$S_2 = 200 + 1000 \times W_{C(B)} \quad (10)$$

the soaking and holding step is performed so as to satisfy the following soaking furnace conditions:
soaking and holding time period: a time period during which the cold-rolled steel sheet is held in the soaking furnace is in the range of not shorter than 100 seconds nor longer than 600 seconds; and
atmosphere gas: a nitrogen atmosphere containing carbon dioxide and carbon monoxide in which a value of log($PCO_2/PCO$) in the soaking furnace is in the range of −5 or more to less than −2, and
in the plating step, a hot-dip galvanizing layer containing not less than 4 mass % nor more than 14 mass % of Fe, not less than 0.1 mass % nor more than 1 mass % of Al, and a balance being composed of Zn and inevitable impurities is formed on the surface of the base steel sheet so as to have a thickness of not less than 1 μm nor more than 30 μm.

(B2) The method according to (B1), in which
on the occasion of performing the hot-dip galvanizing treatment, the base steel sheet obtained after undergoing the soaking and holding step is immersed in a hot-dip galvanizing bath containing not less than 0.05 mass % nor more than 0.20 mass % of Al, and then is subjected to an alloying treatment in which heating is performed to a heating temperature in the range of not lower than 450° C. nor higher than 560° C.

Effect of the Invention

According to the present invention, it is possible to provide a hot-dip galvanized steel sheet that is excellent in plating wettability and plating adhesiveness even when a base steel sheet contains Si and Mn, and a manufacturing method of the same.

MODE FOR CARRYING OUT THE INVENTION

Figure 1:
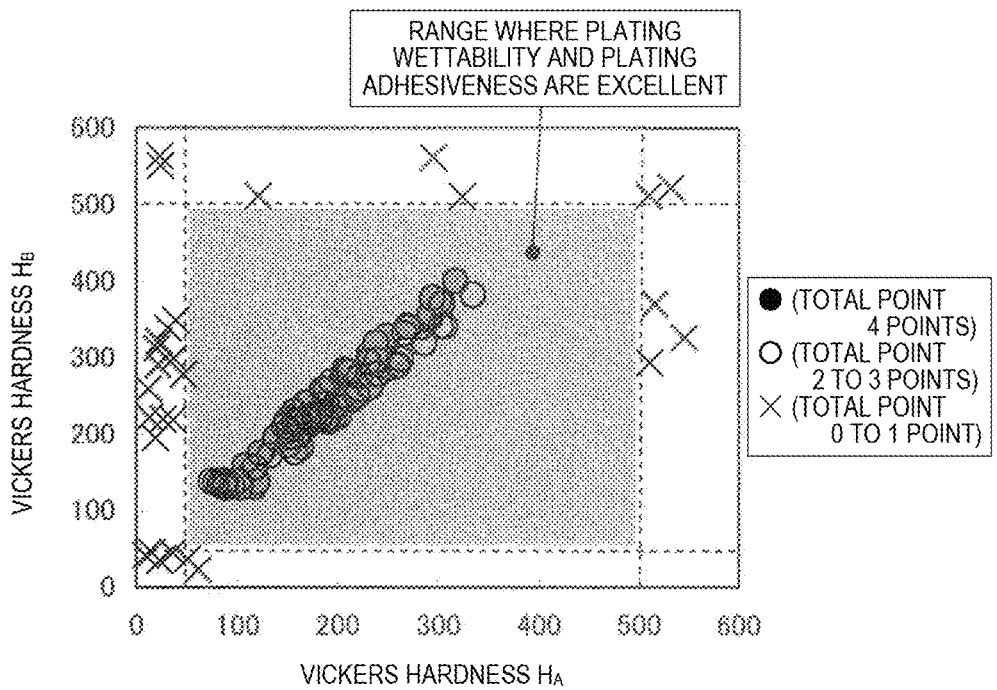
FIG. 1 is a graph showing the relationship between, of a base steel sheet, Vickers hardness $H_A$ in a surface portion and Vickers hardness $H_B$ in a deep portion of hot-dip galvanized steel sheets manufactured by a manufacturing method of a hot-dip galvanized steel sheet according to the present invention (Examples A1 to A72 and B1 to B36) and hot-dip galvanized steel sheets manufactured by another manufacturing method (Comparative examples C1 to C7, C11, C29 to C35, C38, C40 to C50, C52, C53, and C56)

Hereinafter, there will be explained embodiments for implementation of the present invention in detail.

A hot-dip galvanized steel sheet of the present invention includes a base steel sheet and a hot-dip galvanizing layer provided on at least one surface of the base steel sheet. In this embodiment, the base steel sheet contains Si and Mn. Further, the hot-dip galvanizing layer is formed on the surface of the base steel sheet by a later-described hot-dip galvanizing treatment.

Subsequently, there will be explained components composing the above-described base steel sheet and their contents. Incidentally, in the present description, the percentage [%] used for the content is mass % unless otherwise explained.

C: 0.05 to 0.50%

Carbon (C) is a useful element for increasing strength of the base steel sheet by stabilizing an austenite phase of the base steel sheet, and therefore is an essential component of the base steel sheet. Here, when the content percentage of C is set to less than 0.05%, strength of the base steel sheet becomes insufficient, and when it is set to greater than 0.50%, on the other hand, workability of the base steel sheet becomes worse. Thus, the content percentage of C is in the range of not less than 0.05% nor more than 0.50%, and is preferably in the range of not less than 0.10% nor more than 0.40%. Incidentally, even if the base steel sheet is exposed under a decarburizing atmosphere condition defined in the present invention, the content percentage of C hardly changes.

Si: 0.1 to 3.0%

Silicon (Si) is a useful element for improving strength of the base steel sheet by concentrating the component of C solid-dissolved in a ferrite phase of the base steel sheet in an austenite phase to increase resistance to temper softening of steel, and therefore is one of essential components for the base steel sheet. Here, when the content percentage of Si is set to less than 0.1%, strength of the base steel sheet becomes insufficient, and when it is set to greater than 3.0%, on the other hand, workability of the base steel sheet becomes worse and it is not possible to sufficiently improve plating wettability and plating adhesiveness of the hot-dip galvanized steel sheet. Thus, the content percentage of Si is in the range of not less than 0.1% nor more than 3.0%, and is preferably in the range of not less than 0.5% nor more than 2.0%.

Mn: 0.5 to 5.0%

Manganese (Mn) is a useful element for increasing strength of the base steel sheet by increasing hardenability of the base steel sheet, and therefore is one of essential components for the base steel sheet. Here, when the content percentage of Mn is set to less than 0.5%, strength of the base steel sheet becomes insufficient, and when it is set to greater than 5.0%, on the other hand, workability of the base steel sheet becomes worse and it is not possible to sufficiently improve plating wettability and plating adhesiveness of the hot-dip galvanized steel sheet. Thus, the content percentage of Mn is in the range of not less than 0.5% nor more than 5.0%, and is preferably in the range of 1.0% or more to less than 3.0%.

P: 0.001 to 0.5%

Phosphorus (P) is an element to contribute to improvement in strength of the base steel sheet, and therefore is a component to be added to a raw material of the base steel sheet according to the magnitude of strength required for the base steel sheet. Here, when the content percentage of P exceeds 0.5%, the material of the base steel sheet deteriorates due to grain boundary segregation. Thus, the upper limit of the content percentage of P is 0.5%. On the other hand, considerable cost is necessary for setting the content percentage of P to less than 0.001% at the stage of steelmaking, so that the lower limit of the content percentage of P is 0.001%.

S: 0.001 to 0.03%

Sulfur (S) is an impurity inevitably contained in the raw material of the base steel sheet. The component of S forms plate-shaped inclusions of MnS in the cold-rolled base steel sheet to impair workability of the base steel sheet, so that the content percentage of S is desirably low. However, decreasing the content percentage of S excessively (desulfurization) causes a cost increase in a steelmaking step. Thus, the content percentage of S is in the range of not less than 0.001% nor more than 0.03%.

Al: 0.005 to 1.0%

Aluminum (Al) is an element capable of fixing N solid-dissolved in the base steel sheet as a precipitate because of having a high affinity for nitrogen (N) in the base steel sheet, and therefore is useful as a component improving workability of the base steel sheet. On the other hand, when an excessive amount of Al is added to the raw material of the base steel sheet, it deteriorates workability of the base steel sheet on the contrary. Thus, the content percentage of Al is in the range of not less than 0.005% nor more than 1.0%.

The component except for the above-described components (a balance) of the base steel sheet is composed of Fe and inevitable impurities. As an example of the inevitable impurities, Ti, Nb, Cr, Mo, Ni, Cu, Zr, V, W, B, Ca, and a rare-earth element (REM) can be cited. The content percentage of each of the inevitable impurities is in the range of not less than 0% nor more than 1%. Incidentally, at the stage of steelmaking, adjustment may also be performed so that the content percentage of each of the inevitable impurities contained in the base steel sheet may fall within the range of not less than 0.0001% nor more than 1%. Thereby, an effect that plating wettability and plating adhesiveness of the hot-dip galvanized steel sheet to be manufactured are further improved is exhibited. Incidentally, the reason why the plating adhesiveness is improved is thought that on the occasion of a hot-dip galvanizing treatment, these elements improve reactivity of the molten zinc and the base steel sheet. However, a mechanism for improvement in reactivity is not revealed. The above-described effect cannot be exhibited sufficiently when the content percentage of each of the elements is less than 0.0001%, but the above-described effect is saturated when the content percentage of each of the elements is greater than 1%.

Incidentally, in a modified example of this embodiment, one or two or more of elements selected from Ti, Nb, Cr, Mo, Ni, Cu, Zr, V, W, B, Ca, and a rare-earth element (REM) cited as the inevitable impurities in the above-described embodiment may also be added to the raw material of the base steel sheet intensionally so that each content percentage may fall within the range of not less than 0.0001% nor more than 1%. Thereby, the effect equal to that described above can be exhibited. Incidentally, it is uneconomical to add each of the elements to the raw material of the base steel sheet so that each content percentage may become greater than 1%.

A manufacturing method of the base steel sheet is not limited in particular, and may be a well-known manufacturing method. As one example of the well-known manufacturing method, starting from preparation of the raw material of the base steel sheet, casting, hot rolling, pickling, and cold rolling are performed in this order, and thereby a cold-rolled steel sheet (a thin steel sheet) can be manufactured. The cold-rolled steel sheet obtained in this manner has a predetermined sheet thickness in the range of 0.1 mm or more to 3.5 mm, and preferably in the range of not less than 0.4 mm nor more than 3 mm. However, in the present invention and the modified example, hardness of the manufactured base steel sheet needs to be defined by predetermined parameters as will be described in detail below. Therefore, on the occasion of manufacturing such a base steel sheet having hardness defined by predetermined parameters, at least part of a manufacturing method to be described later as the present invention is preferably employed.

Subsequently, the hardness of the base steel sheet that should be manufactured in the present invention and the modified example will be explained in detail.

In this embodiment, roughly, hardness of a surface layer of the above-described base steel sheet is lower than that of an arbitrary place of a portion different from the surface layer (a deep portion). That is, on the base steel sheet, a treatment is performed so that the hardness of the surface layer may become lower than that of the deep portion. Incidentally, one example of the treatment will be explained later in the present invention.

Concretely, in this embodiment, when first hardness representing average hardness of the surface layer ranging from an interface between the base steel sheet and the hot-dip galvanizing layer to 50 μm in depth and second hardness representing average hardness of the deep portion ranging from the interface to greater than 50 μm in depth are represented by average Vickers hardnesses $H_A$ and $H_B$ respectively, all the following relational expressions (1) to (3) are satisfied.

$$50 \leq H_A \leq 500 \tag{1}$$

$$50 \leq H_B = 500 \tag{2}$$

$$0.5 \leq H_A/H_B \leq 0.9 \tag{3}$$

Here, the average Vickers hardness ($H_A$) is calculated by averaging Vickers hardnesses measured at plural measurement points on a side cross section of the exposed base steel sheet obtained by removing the hot-dip galvanizing layer from the hot-dip galvanized steel sheet. Here, the Vickers hardness is measured based on "Vickers hardness test-Test method" of Japanese Industrial Standard JIS Z 2244: 2009 (corresponding to International Standard ISO 6507-4: 2005). For the measurement of the Vickers hardness, plural measurement points are set on the side surface (cross section) side of the exposed base steel sheet. Therefore, the base steel sheet is placed on a support table so that the side surface (cross section) of the base steel sheet may be positioned vertically to the direction of movement of an indenter of a Vickers hardness testing machine. However, in this embodiment, a load used for the measurement of the Vickers hardness is set to 10 gf (0.00102N), as the depth of the measurement point (the depth from the surface of the base steel sheet), 10 µm, 20 µm, 30 µm, 40 µm, and 50 µm are employed, and at each of the depths, 3-point measurement (N3 measurement) is performed, and thereby the average Vickers hardness $H_A$ is calculated. Further, the measurement points are set on the side surface (cross section) of the base steel sheet, and each interval between the plural measurement points is set in the range of not less than 40 µm nor more than 100 µm so that a measurement trace formed at one measurement point may not affect the measurements at the other measurement points. Incidentally, the measurement of the Vickers hardness may also be performed before the hot-dip galvanizing layer is provided on the surface of the base steel sheet. The average Vickers hardness ($H_B$) is also calculated in the same manner as that of the average Vickers hardness ($H_A$), and in this embodiment, as the depths of the measurement points, the range from 60 µm to the position of a quarter of a sheet thickness of the base steel sheet is employed at 10-µm pitch and at each of the depths, 3-point measurement (N3 measurement) is performed, and thereby the average Vickers hardness $H_B$ is calculated. Incidentally, in the portion other than the surface layer of the base steel sheet (the deep portion), the hardnesses can be said to be substantially fixed, so that an average value of values of the hardnesses measured at the plural measurement points does not have to be calculated, and in this case, hardness measured at an arbitrary measurement point in the deep portion is referred to as the above-described average Vickers hardness ($H_B$).

As described above, the values of $H_A$ and $H_B$ are each not less than 50 nor more than 500 (see the above-described relational expressions (1) and (2)). This is reflected also in the graph shown in FIG. 1. Here, from results of examples and comparative examples whose results are described in the graph in FIG. 1 (see also Table 1, Tables 2-1 to 2-4, Tables 3-1 to 3-2, and Table 4-1 to Table 4-2 provided in the section of Example to be described later), the following is clarified. When the values of $H_A$ and $H_B$ are each less than 50, the base steel sheet is locally deformed easily due to a contact with a metal mold at the time of presswork and the hot-dip galvanizing layer cannot follow the deformation to peel off from the base steel sheet, resulting in that such a hot-dip galvanized steel sheet is evaluated to be poor in both plating wettability and plating adhesiveness. Further, when the values of $H_A$ and $H_B$ are each greater than 500, a crack is caused in the base steel sheet when presswork, due to this, a crack is caused also in the hot-dip galvanizing layer, and the base steel sheet is exposed, resulting in that such a hot-dip galvanized steel sheet is evaluated to be poor in both plating wettability and plating adhesiveness. Incidentally, more preferable values of the values of $H_A$ and $H_B$ are each in the range of not less than 100 nor more than 500 (see FIG. 1).

Figure 2:
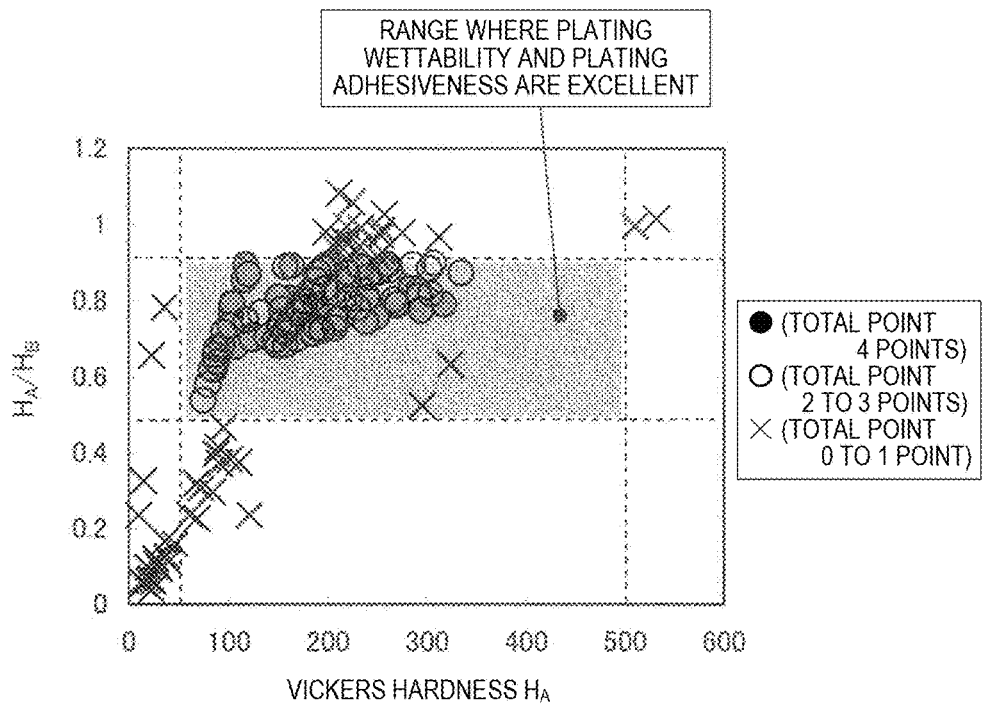
FIG. 2 is a graph showing the relationship between the Vickers hardness $H_A$ in the surface portion of the base steel sheet and a ratio of the Vickers hardness $H_A$ in the surface portion to the Vickers hardness $H_B$ in the deep portion ($H_A/H_B$) of the hot-dip galvanized steel sheets manufactured by the manufacturing method of the hot-dip galvanized steel sheet according to the present invention (Examples A1 to A72 and B1 to B36) and hot-dip galvanized steel sheets manufactured by another manufacturing method (Comparative examples C1 to C56)

The value of $H_A/H_B$ is not less than 0.5 nor more than 0.9 in this embodiment (see the above-described relational expression (3)). This is reflected also in the graph shown in FIG. 2. Further, from results of corresponding examples (examples and comparative examples), the following is clarified. When the value of $H_A/H_B$ is less than 0.5, the surface layer (with the the depth of 50 µm or less) of the base steel sheet is locally deformed easily at the time of presswork and the hot-dip galvanizing layer cannot follow the deformation to peel off from the base steel sheet, resulting in that such a hot-dip galvanized steel sheet is evaluated to be poor in both plating wettability and plating adhesiveness.

Further, when the value of $H_A/H_B$ is greater than 0.9, deformation force and shear stress when presswork concentrate in the hot-dip galvanizing layer, resulting in that such a hot-dip galvanized steel sheet is evaluated to be poor in both plating wettability and plating adhesiveness. Incidentally, a more preferable value of $H_A/H_B$ is in the range of not less than 0.6 nor more than 0.8 (see FIG. 2).

From the above, the above-described relational expressions (1) to (3) of the base steel sheet are all satisfied, and thereby the hot-dip galvanized steel sheet can be made excellent also in workability. In this embodiment in particular, although the base steel sheet contains Si and Mn to thus be increased in strength (hardness), the hot-dip galvanized steel sheet can exhibit the above-described effects.

Further, the difference in hardness between the deep portion and the surface layer of the above-described base steel sheet can also be expressed by difference in content percentage of the components contained in the base steel sheet. In the case when the formation of the surface layer of the base steel sheet is performed by using a heating furnace and a soaking furnace, for example, when attention is focused on Si and Mn and it is considered that a treatment atmosphere in the furnaces is a decarburizing atmosphere, this embodiment is also expressed as follows. Incidentally, it goes without saying that the base steel sheet is defined by both the difference in hardness and the difference in content percentage of components, thereby making it possible to provide a hot-dip galvanized steel sheet having uniform quality.

$W_{C(A)}$, $W_{Si(A)}$, and $W_{Mn(A)}$ representing the content percentages of C, Si, and Mn in mass % in the surface layer of the base steel sheet respectively and $W_{C(B)}$, $W_{Si(B)}$, and $W_{Mn(B)}$ representing the content percentages of C, Si, and Mn in mass % in the deep portion of the base steel sheet respectively satisfy all the following relational expressions (4) to (6).

$$0.1 \leq W_{C(A)}/W_{C(B)} \leq 0.5 \quad (4)$$

$$0.1 \leq W_{Si(A)}/W_{Si(B)} \leq 0.5 \quad (5)$$

$$0.1 \leq W_{Mn(A)}/W_{Mn(B)} \leq 0.5 \quad (6)$$

Here, measurements of $W_{C(A)}$, $W_{Si(A)}$, and $S_{Mn(A)}$ are performed by performing analysis in the depth direction with the surface of the base steel sheet being a starting point roughly. Concretely, the surface of the hot-dip galvanized steel sheet is analyzed by XPS (X-ray photoelectron spectroscopy) while being sputtered at intervals of 10 µm. In this embodiment, $W_{C(A)}$, $W_{Si(A)}$, and $W_{Mn(A)}$ mean average values of analysis values of the respective components (the content percentage of C, the content percentage of single element Si, and the content percentage of single element Mn) in the range of the position where Zn is not detected substantially to 50 µm in depth. Similarly, $W_{C(B)}$, $W_{Si(B)}$, and $W_{Mn(B)}$ mean average values of analysis values, being analysis values at the position deeper than where Zn is not detected substantially, of the respective components (the content percentage of C, the content percentage of single element Si, and the content percentage of single element Mn) in the range of 100 µm to 200 µm in depth.

Figure 3:
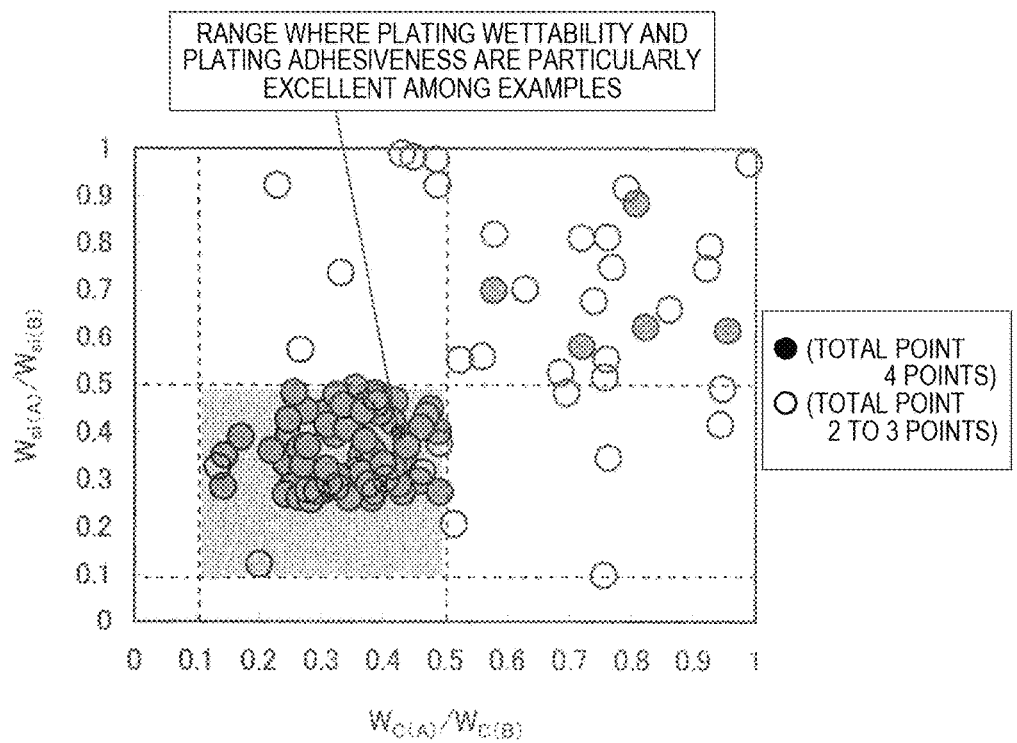
FIG. 3 is a graph showing the relationship between a value of a ratio of, of the base steel sheet, content percentage of C in the surface portion to content percentage of C in the deep portion ($W_{C(A)}/W_{C(B)}$) and a value of a ratio, of the base steel sheet, content percentage of Si in the surface portion to content percentage of Si in the deep portion ($W_{Si(A)}/W_{Si(B)}$) of the the hot-dip galvanized steel sheets manufactured by the manufacturing method of the hot-dip galvanized steel sheet according to the present invention (Examples A1 to A72 and B1 to B36)
Figure 4:
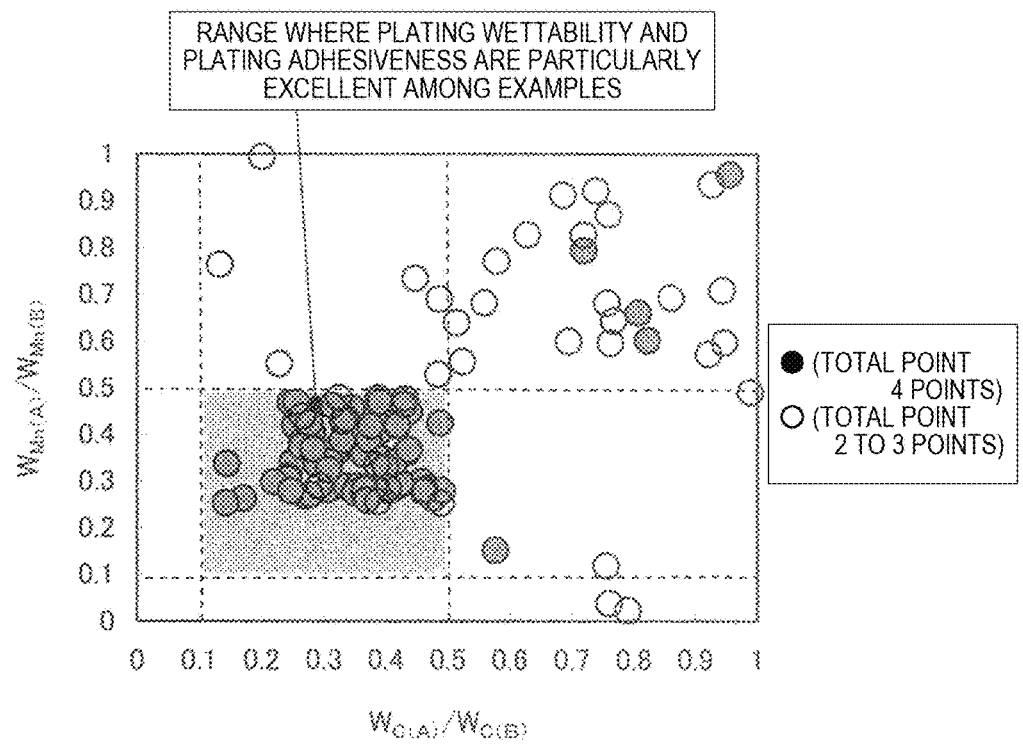
FIG. 4 is a graph showing the relationship between the value of the ratio of, of the base steel sheet, the content percentage of C in the surface portion to the content percentage of C in the deep portion ($W_{C(A)}/W_{C(B)}$) and a value of a ratio, of the base steel sheet, content percentage of Mn in the surface portion to content percentage of Mn in the deep portion ($W_{Mn(A)}/W_{Mn(B)}$) of the the hot-dip galvanized steel sheets manufactured by the manufacturing method of the hot-dip galvanized steel sheet according to the present invention (Examples A1 to A72 and B1 to B36)

The above-described relational expressions (4) to (6) are reflected also in the graphs shown in FIG. 3 and FIG. 4. Further, from results of corresponding examples (examples and comparative examples), the following is clarified. When the values of $W_{C(A)}/W_{C(B)}$, $Wi_{S(A)}/W_{Si(B)}$, and $W_{Mn(A)}/W_{Mn(B)}$ are each not less than 0.1 nor more than 0.5, such a hot-dip galvanized steel sheet is evaluated to be excellent in both plating wettability and plating adhesiveness. On the other hand, when the values of these ratios are each less than 0.1, C, Si, and Mn solid-dissolved in the base steel sheet are segregated in the depth direction inside the base steel sheet and concentration distribution is generated, hardness and workability (ductility) of the base steel sheet vary largely, and due to the variations, the base steel sheet is deformed locally at the time of presswork and plating is easily peeled off from the base steel sheet, resulting in that such a hot-dip galvanized steel sheet is evaluated to be poor in plating wettability and plating adhesiveness. When the values of these ratios are each greater than 0.5, C, Si, and Mn solid-dissolved in the base steel sheet inhibit reaction at the interface between the base steel sheet and the hot-dip galvanizing layer, and further due to the hardness of the base steel sheet being uniform, deformation force and shear stress when presswork concentrate in the hot-dip galvanizing layer, resulting in that such a hot-dip galvanized steel sheet is evaluated to be poor in plating wettability and plating adhesiveness. More preferable values of $W_{C(A)}/W_{C(B)}$, $W_{Si(A)}/W_{Si(B)}$, and $W_{Mn(A)}/W_{Mn(B)}$ are each in the range of not less than 0.15 nor more than 0.4 (see FIG. 3 and FIG. 4).

Figure 5:
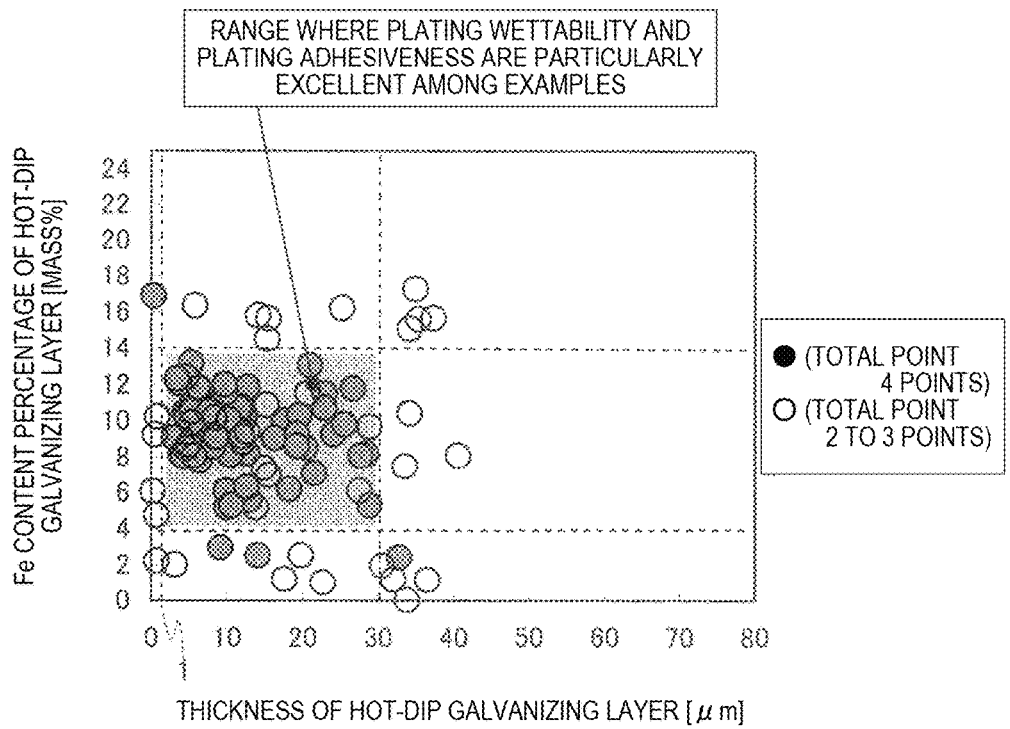
FIG. 5 is a graph showing the relationship between a thickness of a hot-dip galvanizing layer [μm] and content percentage of Fe in the hot-dip galvanizing layer [mass %] of the the hot-dip galvanized steel sheets manufactured by the manufacturing method of the hot-dip galvanized steel sheet according to the present invention (Examples A1 to A72 and B1 to B36)
Figure 6:
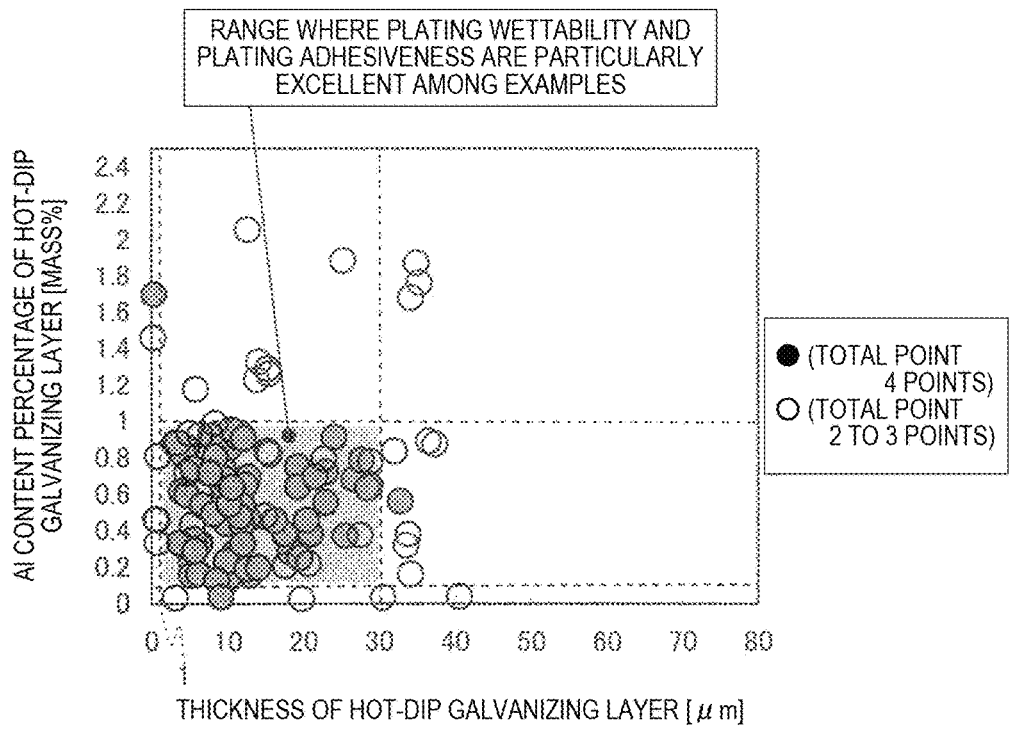
FIG. 6 is a graph showing the relationship between the thickness of the hot-dip galvanizing layer [μm] and content percentage of Al in the hot-dip galvanizing layer [mass %] of the the hot-dip galvanized steel sheets manufactured by the manufacturing method of the hot-dip galvanized steel sheet according to the present invention (Examples A1 to A72 and B1 to B36)

Further, in a more preferable aspect of this embodiment, the hot-dip galvanizing layer of the hot-dip galvanized steel sheet has a thickness in the range of not less than 1 μm nor more than 30 μm. Additionally, the hot-dip galvanizing layer contains not less than 4 mass % nor more than 14 mass % of Fe and not less than 0.1 mass % nor more than 1 mass % of Al, and contains a balance being composed of Zn and inevitable impurities. By satisfying these conditions, such a hot-dip galvanized steel sheet is evaluated to be more excellent in plating wettability and plating adhesiveness. This is reflected in the graphs shown in FIG. 5 and FIG. 6. Further, from results of corresponding examples (examples and comparative examples), the following is clarified.

When the thickness of the hot-dip galvanizing layer is less than 1 μm, a rust prevention property of the hot-dip galvanized steel sheet becomes insufficient, and further uniform plating adhesion to the surface of the base steel sheet becomes difficult and thereby unplating defects of the hot-dip galvanized steel sheet are caused. That is, there is caused a problem of worsening of plating wettability. When the thickness of the hot-dip galvanizing layer is greater than 30 μm, an effect of improvement in corrosion resistance is saturated and it is uneconomical, and further inside the hot-dip galvanizing layer, residual stress increases, resulting in that plating adhesiveness becomes worse on the contrary. Incidentally, in this embodiment, the thickness of the hot-dip galvanizing layer is calculated in a manner that a region having a size of 100 μm×100 μm of a cross section of the hot-dip galvanizing layer is observed by a SEM (scanning electron microscope), the thickness of the hot-dip galvanizing layer is measured by N =5, and values of obtained measurement results are averaged.

Further, when the content percentage of Fe in the hot-dip galvanizing layer is less than 4%, reactivity of the hot-dip galvanizing layer and the base steel sheet is poor, resulting in that such a hot-dip galvanized steel sheet is evaluated to be poor in plating wettability and plating adhesiveness. On the other hand, when the content percentage of Fe is greater than 14%, in the interface between the hot-dip galvanizing layer and the base steel sheet, a Γ phase or $Γ_1$ phase of hard Fe—Zn alloy is formed in large amounts, resulting in that such a hot-dip galvanized steel sheet is evaluated to be poor in plating wettability and plating adhesiveness.

Further, when the content percentage of Al of the hot-dip galvanizing layer is less than 0.1, it becomes impossible to sufficiently exhibit an effect that slidability of plating can be improved by containing Al in plating, resulting in that such a hot-dip galvanized steel sheet is evaluated to be poor in plating wettability and plating adhesiveness. On the other hand, when the content percentage of Al is greater than 1%, the hot-dip galvanizing layer becomes hard, resulting in that such a hot-dip galvanized steel sheet is evaluated to be poor in plating wettability and plating adhesiveness.

Incidentally, the content percentage of Fe and the content percentage of Al in the hot-dip galvanizing layer are calculated in the following manner, for example. A sample having a size of 30 mm×30 mm cut out from the hot-dip galvanized steel sheet is immersed in a 5% hydrochloric acid aqueous solution to which 0.02 vol % of an inhibitor (IBIT700A manufactured by ASAHI Chemical Co., Ltd.) is added, and thereby only the plating layer is dissolved. Subsequently, the obtained solution is analyzed by an ICP (an emission spectrochemical analyzer), and from its analysis result, the mass of Fe, the mass of Zn, and the mass of Al are found. Then, the mass of Fe is divided by (the mass of Fe+the mass of Zn +the mass of Al) and is multiplied by 100, and thereby the content percentage of Fe is calculated. Further, the mass of Al is divided by (the mass of Fe+the mass of Zn+the mass of Al) and is multiplied by 100, and thereby the content percentage of Al is calculated.

Next, there will be explained a manufacturing method of a hot-dip galvanized steel sheet of the present invention.

The hot-dip galvanized steel sheet is manufactured by performing a hot-dip galvanizing treatment on a base steel sheet containing Si and Mn basically. More concretely, the manufacturing method according to this embodiment includes at least the following steps.

Annealing step: an annealing step of performing an annealing treatment by heating on the aforementioned base steel sheet in the presence of a first gas mixture containing carbon monoxide and carbon dioxide in a heating furnace;

Soaking and holding step: a soaking and holding step of holding the base steel sheet having had the aforementioned annealing treatment performed thereon at a fixed temperature in the presence of a second gas mixture containing carbon monoxide and carbon dioxide in a soaking furnace connected to the aforementioned heating furnace; and Plating step: a plating step of performing a hot-dip galvanizing treatment on the base steel sheet obtained after undergoing the aforementioned soaking and holding step Additionally, in the manufacturing method according to this embodiment, a manufacturing method of the base steel sheet, components of the base steel sheet and their content percentages, a facility for manufacture, heating furnace conditions in the annealing step, soaking furnace conditions in the soaking and holding step, treatment conditions in the plating step, and the like are set as follows.

Manufacturing method of the base steel sheet and components of the base steel sheet and their content percentages. The base steel sheet contains the components explained in the invention and the modified example basically. Concretely, the base steel sheet is obtained after undergoing a casting step, a hot rolling step, a pickling step, a cold rolling step, the above-described annealing step, and the above-described soaking and holding step, and contains, in mass %, C: not less than 0.05% nor more than 0.50%,
Si: not less than 0.1% nor more than 3.0%,
Mn: nor more than 0.5% nor more than 5.0%,
P: not less than 0.001% nor more than 0.5%, S: not less than 0.001% nor more than 0.03%

Al: not less than 0.005% nor more than 1.0%, and
one or two or more of elements selected from Ti, Nb, Cr, Mo, Ni, Cu, Zr, V, W, B, Ca, and a rare-earth element REM: not less than 0% nor more than 1% each, and a balance being composed of Fe and inevitable impurities.

Facility for Manufacture

As a facility for manufacture, a continuous hot-dip galvanizing facility explained in the column of background art is used. That is, the annealing step and the soaking and holding step are performed in a continuous hot-dip galvanizing facility equipped with an all radiant tube type heating furnace as a heating furnace and a soaking furnace. Thereby, the base steel sheet (a cold-rolled steel sheet) can be passed through in the heating furnace and in the soaking furnace without being exposed to an oxidizing atmosphere such as the air.

Heating Furnace Conditions in the Annealing Step

The annealing step is performed so as to satisfy the following heating furnace conditions.

Heating temperature: a sheet temperature $T_0$ [° C.] representing the maximum temperature that, when a cold-rolled steel sheet obtained after undergoing the cold rolling step is heated in the heating furnace, the cold-rolled steel sheet reaches is in the range of not lower than a temperature $T_1$ [° C.] nor higher than a temperature $T_2$ [° C];

Heating time period: a heating time period $S_0$ [second] in the heating furnace is in the range of not shorter than a time period $S_1$ [second] nor longer than a time period $S_2$ [second]; and Atmosphere gas: a nitrogen atmosphere containing carbon dioxide and carbon monoxide in which $\log(PCO_2/PCO)$ being a logarithmic value of a value of, in the heating furnace, a partial pressure value of carbon dioxide divided by a partial pressure value of carbon monoxide exhibits a value in the range of not less than −2 nor more than 1.

Here, the temperatures $T_1$ and $T_2$ and the time periods $S_1$ and $S_2$ described above are defined as follows.

$T_1$: a temperature [° C.] satisfying the following relational expression (7) using $W_{Si(B)}$ and $W_{Mn(B)}$ representing content percentages of Si and Mn in mass % in a deep portion ranging from a surface of the cold-rolled steel sheet to greater than 50 μm in depth respectively;

$$T_1 = 500 - 50 \times W_{Si(B)} - 20 \times W_{Mn(B)} \quad (7)$$

$T_2$: a temperature [° C.] satisfying the following relational expression (8) using a temperature $T_{Ac3}$ [° C.] corresponding to a transformation point $A_{c3}$ of the cold-rolled steel sheet;

$$T_2 = T_{Ac3} + 40 \quad (8)$$

$S_1$: a time period [second] satisfying the following relational expression (9) using $W_{Si(B)}$ [mass %] representing the content percentage of Si and $W_{Mn(B)}$ [mass %] representing the content percentage of Mn in the deep portion of the cold-rolled steel sheet; and $$S_1 = 50 + 20 \times W_{Si(B)} + 10 \times W_{Mn(B)} \quad (9)$$

$S_2$: a time period [second] satisfying the following relational expression (10) using $W_{C(B)}$ [mass %] representing content percentage of C in the deep portion of the cold-rolled steel sheet $$S_2 = 200 + 1000 \times W_{C(B)} \quad (10)$$

Soaking Furnace Conditions in the Soaking and Holding Step

The soaking and holding step is performed so as to satisfy the following soaking furnace conditions.

Soaking and holding time period: a time period during which the cold-rolled steel sheet is held in the soaking furnace is in the range of not shorter than 100 seconds nor longer than 600 seconds; and Atmosphere gas: a nitrogen atmosphere containing carbon dioxide and carbon monoxide in which a value of $\log(PCO_2/PCO)$ in the soaking furnace is in the range of −5 or more to less than −2

Treatment Conditions in the Plating Step

In the plating step, the hot-dip galvanizing layer containing not less than 4 mass % nor more than 14 mass % of Fe, not less than 0.1 mass % nor more than 1 mass % of Al, and a balance being composed of Zn and inevitable impurities is formed on the surface of the base steel sheet so as to have a thickness of not less than 1 μm nor more than 30 μm.

Subsequently, the above-described respective conditions are explained in more detail.

With regard to the relational expression (7)

As expressed in the relational expression (7), the temperature $T_1$ is a function using the content percentages of Si and Mn as variables, and here, the content percentages are the content percentages of Si and Mn in the deep portion of the base steel sheet (incidentally, values of these content percentages are substantially equal to those of the content percentages of Si and Mn obtained before the surface layer is formed on the base steel sheet respectively). From the graph shown in FIG. 7, the types of elements (Mn and Si), the number of the elements, the content percentages of the respective elements, and the like, a coefficient (weighting) that should be added to the content percentage of each of the elements (a variable in the right side of the relational expression (7)) can be determined. Incidentally, when the base steel sheet further contains Cr and/or B as an easily oxidizable element in addition to Si and Mn, variable terms or a variable term regarding to content percentages or content percentage of the elements or element can be provided in a relational expression equivalent to the relational expression (7), and on the other hand, by regarding plural types of easily oxidizable elements as one type of easily oxidizable element, a single necessary variable term may also be provided in the relational expression. Incidentally, for manufacture of the hot-dip galvanized steel sheet, the sheet temperature $T_0$ is determined so as to fall within the range shown as a filled part on the graph in FIG. 7. As above, as long as the heating temperature ($T_0$ [° C.] is in the range of not lower than $T_1$ [° C.] nor higher than $T_2$ [° C.] and the heating time period $S_0$ [second] is in the range of not shorter than $S_1$ [second] nor longer than $S_2$ [second], improvements in plating wettability and plating adhesiveness can be expected.

With Regard to the Relational Expression (8)

As expressed in the relational expression (8), the temperature $T_2$ is a function of the temperature $T_{Ac3}$ corresponding to the transformation point $A_{c3}$. Then, as is found with reference to FIG. 7, the temperature $T_2$ needs to be a temperature equal to or higher than the sheet temperature $T_0$. A constant term in the right side of the relational expression (8) is determined experimentally or empirically, for example. One of the reasons why the temperature $T_2$ is expressed as a function of the temperature $T_{Ac3}$ is conceivably because transformation to an austenite phase from a ferrite phase in the base steel sheet at around the transformation point $A_{c3}$ and increases in diffusion speeds of C, Si, and Mn solid-dissolved in the base steel sheet are affected. Incidentally, a constant term shown in the right side of the relational expression (8) is not limited to "+40," but when the temperature $T_2$ is expressed by the relational expression (8), a good result can be obtained.

With Regard to the Steel Temperature $T_0$

Figure 7:
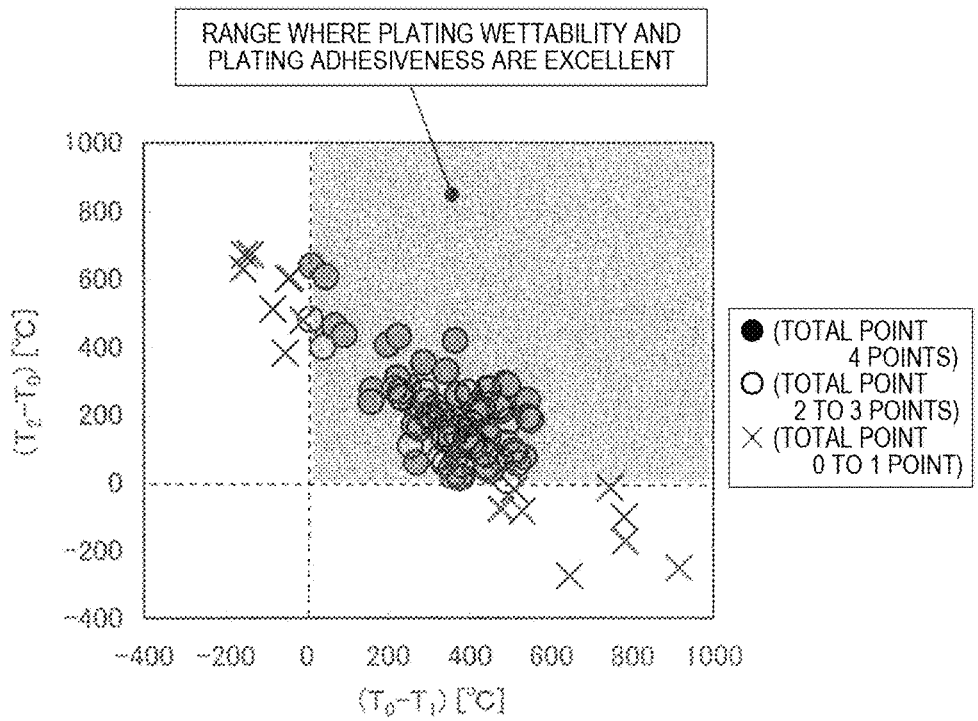
FIG. 7 is a graph showing the relationship between a value of difference between a sheet temperature $T_0$ [° C.] representing the maximum temperature that, when a base steel sheet for a hot-dip galvanized steel sheet is heated in a heating furnace in accordance with the manufacturing method of the hot-dip galvanized steel sheet according to the present invention (Examples A1 to A72 and B1 to B36) and another manufacturing method (Comparative examples C1 to C8 and C17 to C24), the base steel sheet reaches and a temperature $T_1$ [° C.] associated with $W_{Si(B)}$ [mass %] representing the content percentage of Si and $W_{Mn(B)}$ [mass %] representing the content percentage of Mn contained in the base steel sheet ($T_0$ to $T_1$) and a value of difference between a temperature $T_2$ [° C.] associated with a temperature $T_{Ac3}$ [° C.] corresponding to a transformation point $A_{c3}$ of the base steel sheet and the aforementioned sheet temperature $T_0$ [° C.] ($T_2-T_0$)

In order that both the value of $(T_0-T_1)$ and the value of $(T_2-T_0)$ shown in FIG. 7 should become 0 or more, the value of the sheet temperature $T_0$ [° C.] representing the maximum temperature that the cold-rolled steel sheet reaches needs to be in the range of not lower than $T_1$ nor higher than $T_2$. Here, when the sheet temperature $T_0$ [° C.] is lower than $T_1$° C., an internal oxidation reaction of Si and Mn does not progress sufficiently, and further C, Si, and Mn solid-dissolved in the base steel sheet inhibit the reaction at the interface between the base steel sheet and the hot-dip galvanizing layer, resulting in that such a hot-dip galvanized steel sheet is evaluated to be poor in plating wettability and plating adhesiveness. On the other hand, when the sheet temperature $T_0$ [° C.] is higher than $T_2$° C., an internal oxidation reaction of Si and Mn progresses excessively to cause that intercrystalline cracking caused by internal oxides occurs in grain boundaries of the surface layer of the base steel sheet, and further carbon in the surface layer of the base steel sheet oxidizes excessively to be released from the base steel sheet and hardness of the base steel sheet decreases significantly, resulting in that such a hot-dip galvanized steel sheet is evaluated to be poor in plating wettability and plating adhesiveness. A more preferable value of the sheet temperature $T_0$ is in the range of not lower than $(T_1+50)$° C. nor higher than $(T_2-20)$° C.

A temperature increasing rate when performing heating in the heating furnace is not limited in particular, but when it is too low, productivity of the base steel sheet or the hot-dip galvanized steel sheet becomes worse, when it is too high, on the other hand, the cost of maintaining a heating facility is required. Thus, the temperature increasing rate is preferably selected in the range of not less than 0.5° C./s nor more than 20° C./s.

A sheet temperature when the base steel sheet is introduced into the heating furnace is not limited in particular, but when it is too high, the base steel sheet is oxidized and plating wettability and plating adhesiveness become worse, and when it is too low, on the other hand, the cost of cooling is required. Thus, the sheet temperature is preferably in the range of not lower than 0° C. nor higher than 100° C.

With Regard to the Relational Expressions (9) and (10)

As expressed in the relational expression (9), the time period $S_1$ is a function using the content percentages of Si and Mn as variables, and further the time period $S_2$ is, as expressed in the relational expression (10), a function using the content percentage of C as a variable. In this embodiment, coefficients (weighting) of the variables in these functions are determined experimentally or empirically, for example. When the relational expression (9) and the relational expression (10) are satisfied, a good result can be obtained.

With Regard to the Heating Time Period $S_0$ [Second] in the Heating Furnace

Figure 8:
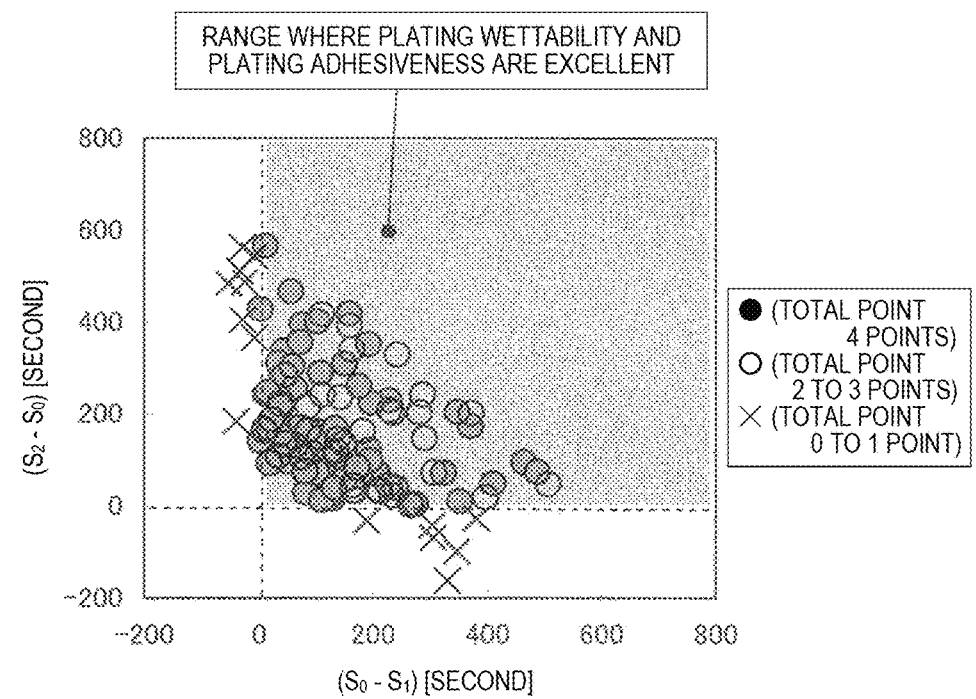
FIG. 8 is a graph showing the relationship between a value of difference between a heating time period $S_0$ [second] when the base steel sheet for a hot-dip galvanized steel sheet is heated in the heating furnace in accordance with the manufacturing method of the hot-dip galvanized steel sheet according to the present invention (Examples A1 to A72 and B1 to B36) and another manufacturing method (Comparative examples C11 to C24) and a time period $S_1$ [second] associated with $W_{Si(B)}$ [mass %] representing the content percentage of Si and $W_{Mn(B)}$ [mass %] representing the content percentage of Mn in the base steel sheet ($S_0-S_1$) and a value of difference between a time period $S_2$ [second] associated with $W_{C(B)}$ [mass %] representing the content percentage of C in the base steel sheet and the aforementioned heating time period $S_0$ [second] ($S_2-S_0$)

In order that both the value of $(S_0-S_1)$ and the value of $(S_2-S_0)$ shown in FIG. 8 should become 0 or more, the value of the heating time period $S_0$ [second] in the heating furnace needs to be in the range of not shorter than $S_1$ nor longer than $S_2$. Here, when the heating time period $S_0$ [second] is shorter than $S_1$ seconds, an internal oxidation reaction of Si and Mn does not progress sufficiently, and further C, Si, and Mn solid-dissolved in the base steel sheet inhibit the reaction at the interface between the base steel sheet and the hot-dip galvanizing layer, resulting in that such a hot-dip galvanized steel sheet is evaluated to be poor in plating wettability and plating adhesiveness. On the other hand, when the heating time period $S_0$ [second] is longer than $S_2$ seconds, an internal oxidation reaction of Si and Mn progresses excessively to cause that intercrystalline cracking caused by internal oxides occurs in grain boundaries of the surface layer of the base steel sheet, and further carbon in the surface layer of the base steel sheet oxidizes excessively to be released from the base steel sheet and hardness of the base steel sheet decreases significantly, resulting in that such a hot-dip galvanized steel sheet is evaluated to be poor in plating wettability and plating adhesiveness. A more preferable value of the heating time period $S_0$ is in the range of not shorter than $(S_1+50)$ seconds nor longer than $(S_2-50)$ seconds.

With Regard to the Atmosphere Gas in the Annealing Step

Figure 9:
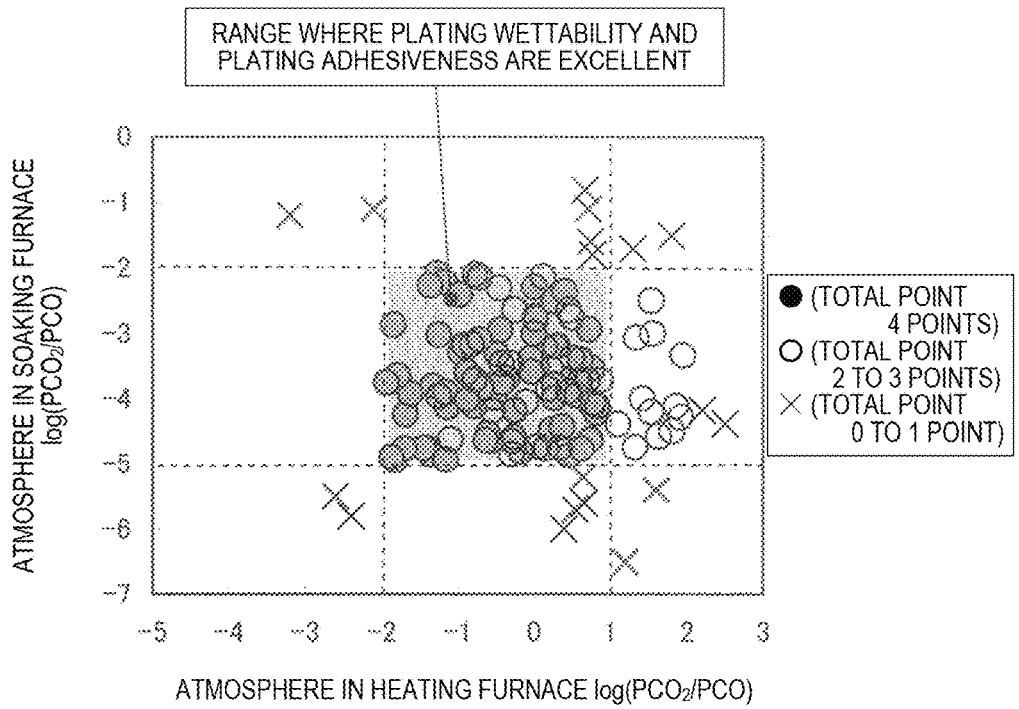
FIG. 9 is a graph showing the relationship between a logarithmic value of a partial pressure ratio of $CO_2$ to CO in an atmosphere gas when the base steel sheet for a hot-dip galvanized steel sheet is heated in the heating furnace and a logarithmic value of a partial pressure ratio of $CO_2$ to CO in an atmosphere gas when it is soaked and held in a soaking furnace in accordance with the manufacturing method of the hot-dip galvanized steel sheet according to the present invention (Examples A1 to A72 and B1 to B36) and another manufacturing method (Comparative examples C9, C10, and C41 to C56)
Figure 10:
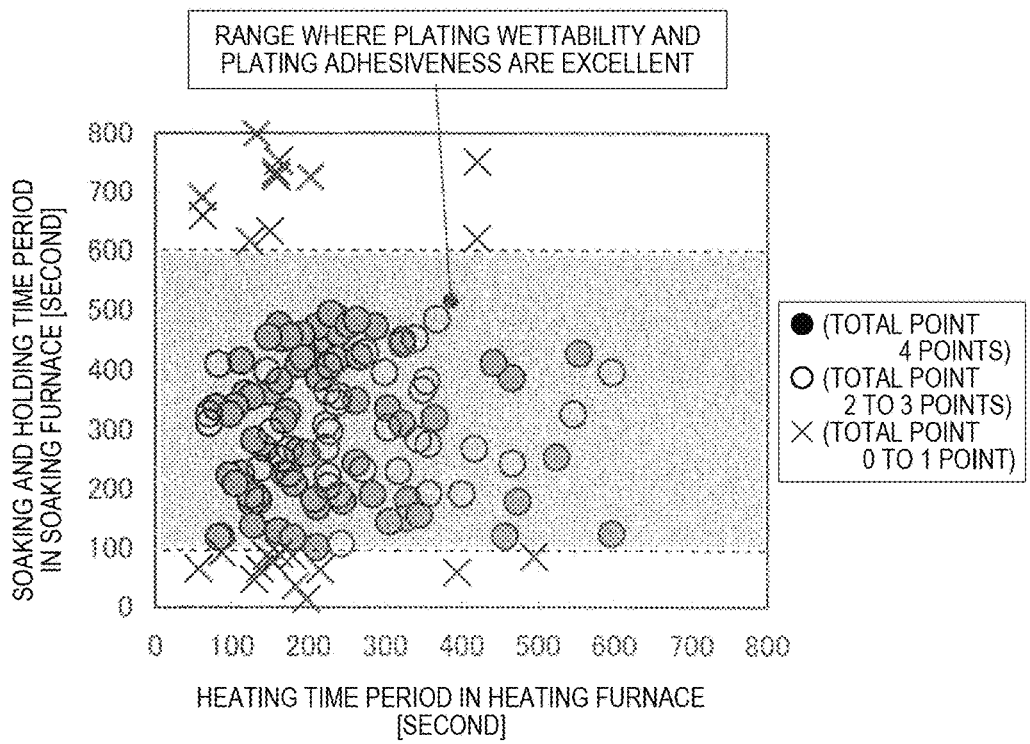
FIG. 10 is a graph showing the relationship between a heating time period [second] when the base steel sheet for a hot-dip galvanized steel sheet is heated in the heating furnace and a soaking and holding time period [second] when it is soaked and held in the soaking furnace in accordance with the manufacturing method of the hot-dip galvanized steel sheet according to the present invention (Examples A1 to A72 and B1 to B36) and another manufacturing method (Comparative examples C17 to C40)

In this embodiment, under a nitrogen gas of an Fe reducing atmosphere, $\log(PCO_2/PCO)$ being a logarithmic value of a value of in the heating furnace, a partial pressure value of carbon dioxide divided by a partial pressure value of carbon monoxide is adjusted to exhibit a value in the range of not less than −2 nor more than 1. This is reflected also in FIG. 9. Further, from results of corresponding examples (examples and comparative examples), the following is clarified. When the value of $\log(PCO_2/PCO)$ in the heating furnace is less than −2, an internal oxidation reaction of Si and Mn does not progress sufficiently, and further C, Si, and Mn solid-dissolved in the base steel sheet do not react to remain in the base steel sheet and these remaining elements inhibit the reaction at the interface between the base steel sheet and the hot-dip galvanizing layer after performing the subsequent hot-dip galvanizing treatment, resulting in that such a hot-dip galvanized steel sheet is evaluated to be poor in plating wettability and plating adhesiveness. When the value of $\log(PCO_2/PCO)$ in the heating furnace is greater than 1, an internal oxidation reaction of Si and Mn progresses excessively to cause that intercrystalline cracking caused by internal oxides occurs in grain boundaries of the surface layer of the base steel sheet, and further carbon in the surface layer of the base steel sheet oxidizes excessively to be released from the base steel sheet and hardness of the base steel sheet decreases significantly, resulting in that such a hot-dip galvanized steel sheet is evaluated to be poor in plating wettability and plating adhesiveness. Incidentally, a preferable value of $\log(PCO_2/PCO)$ in the heating furnace is in the range of not less than −1.5 nor more than 0.5.

In this embodiment, by using the nitrogen atmosphere containing carbon dioxide and carbon monoxide, a partial pressure of carbon monoxide in the atmosphere is adjusted, so that it is possible to suppress excessive occurrences of release (decarburization) caused by oxidation reaction of C solid-dissolved in the base steel sheet. Incidentally, as long as the condition that the value of $\log(PCO_2/PCO)$ in the heating furnace is in the range of not less than −2 nor more than 1 is satisfied, the atmosphere gas may also contain at least one of hydrogen, water vapor, oxygen, and inevitable impurities, and further in place of nitrogen, another inert gas may also be used. However, when the atmosphere gas contains hydrogen, the concentration of hydrogen is adjusted to be in the range of not less than 1 vol % nor more than 20 vol %. Thereby, plating wettability and plating adhesiveness of an obtainable hot-dip galvanized steel sheet can be made excellent. On the other hand, when the concentration of hydrogen is less than 1 vol %, it becomes difficult to adjust the concentration of hydrogen industrially, and further when the concentration of hydrogen is greater than 20 vol %, the base steel sheet becomes brittle by hydrogen, resulting in that an obtainable hot-dip galvanized steel sheet is evaluated to be poor in adhesiveness and wettability of plating.

A method of adjusting a partial pressure ratio of carbon dioxide and carbon monoxide in the heating furnace is not limited in particular, but because of easiness of adjustment, a gas mixture of carbon dioxide and carbon monoxide that are adjusted to a fixed partial pressure ratio beforehand is preferably supplied into the furnace filled with a nitrogen atmosphere. A flow rate of the gas mixture is more preferably determined in consideration of at least one parameter of a volume and a gas flow in the furnace, and a surface area of the base steel sheet that should be treated in the furnace. Incidentally, as a method of adjusting the partial pressure ratio, a second method in which the furnace is filled with a nitrogen atmosphere containing carbon monoxide and then into the furnace, carbon dioxide is supplied at a predetermined flow rate, or a third method in which the furnace is filled with a nitrogen atmosphere containing carbon dioxide and then into the furnace, carbon monoxide is supplied at a predetermined flow rate may also be employed. In terms of preventing carbon monoxide explosion in the furnace and carbon monoxide intoxication in a working environment outside the furnace, it is industrially preferred to employ the above-described second method. Incidentally, one of the above-described methods is employed also for a method of adjusting a partial pressure ratio of carbon dioxide and carbon monoxide in the soaking furnace.

Further, the carbon dioxide to be supplied into the furnace may be a commercially available carbon dioxide gas, may be carbon dioxide generated by burning carbon monoxide, or may also be carbon dioxide generated by completely burning a substance selected from a mixed gas of CO and $H_2$, a gas hydrocarbon such as $CH_4$ or $C_2H_6$, a gas hydrocarbon such as LNG, a liquid hydrocarbon such as gasoline or light oil, alcohols such as $CH_3OH$ or $C_2H_5OH$, a commercially available organic solvent, and a mixture of them. Further, the carbon monoxide to be supplied into the furnace may be a commercially available carbon monoxide gas, or may also be carbon monoxide generated by mixing carbon dioxide generated by the above-described method with hydrogen. Incidentally, water or water vapor generated when carbon dioxide or carbon monoxide is generated may be adsorbed to a moisture adsorbent such as silica gel or calcium chloride, may be discharged by using a discharge device, or may also be brought into contact with a coke obtained by heating carbon dioxide.

With Regard to the Holding Time Period in the Soaking and Holding Step

In this embodiment, the soaking and holding time period in the soaking and holding step to be performed in the soaking furnace is in the range of not shorter than 100 seconds nor longer than 600 seconds. When the soaking and holding time period is shorter than 100 seconds, recrystallization of the base steel sheet does not progress sufficiently, and thus strength and ductility of the base steel sheet to be obtained after the treatment decrease and when the hot-dip galvanized steel sheet is pressed, a crack is caused in the base steel sheet, resulting in that such a hot-dip galvanized steel sheet is evaluated to be poor in plating wettability and plating adhesiveness. On the other hand, when the soaking and holding time period is longer than 600 seconds, C, Si, and Mn solid-dissolved in the base steel sheet are diffused to the surface layer of the base steel sheet that is formed by heating to inhibit the reaction at the interface between the base steel sheet and the hot-dip galvanizing layer, resulting in that such a hot-dip galvanized steel sheet is evaluated to be poor in plating wettability and plating adhesiveness.

A treatment temperature in the soaking furnace is preferably set to the same temperature as the sheet temperature $T_0$ representing the maximum ultimate sheet temperature in the heating furnace. Incidentally, the treatment temperature is allowed to vary within the range of ±20° C. industrially.

With Regard to the Atmosphere Gas in the Soaking the Holding Step.

In this embodiment, $log(PCO_2/PCO)$ in the soaking furnace is adjusted to exhibit a value falling within the range of −5 or more to less than −2. This is reflected also in FIG. 9. Further, from results of corresponding examples (examples and comparative examples), the following is clarified. When the value of $log(PCO_2/PCO)$ in the heating furnace is less than −5, part of Si and Mn that are internally oxidized is reduced, and thus C, Si, and Mn solid-dissolved in the surface layer of the base steel sheet are increased in amount, resulting in that such a hot-dip galvanized steel sheet is evaluated to be poor in plating wettability and plating adhesiveness. On the other hand, when the value of $log(PCO_2/PCO)$ in the soaking furnace becomes −2 or more, an internal oxidation reaction of Si and Mn progresses excessively to cause that intercrystalline cracking caused by internal oxides occurs in grain boundaries of the surface layer of the base steel sheet, and further carbon in the surface layer of the base steel sheet oxidizes excessively to be released from the base steel sheet and hardness of the base steel sheet decreases significantly, resulting in that such a hot-dip galvanized steel sheet is evaluated to be poor in plating wettability and plating adhesiveness.

Incidentally, after performing the annealing step in the heating furnace and the soaking and holding step in the soaking furnace, and before performing the plating step, other treatment steps may also be performed. As such a treatment step, at least one step selected from a slow cooling step, a quenching step, an overaging step, a second cooling step, a water quenching step, and a reheating step is performed. Similarly, after performing the plating step, other treatment steps may also be performed.

Plating Step

Further, a bath temperature of a hot-dip galvanizing bath is preferably 440° C. or higher and lower than 550° C. When the bath temperature is lower than 440° C., there is a possibility that solidification of molten zinc is caused in the bath, so that it is inappropriate, and when it exceeds 550° C., evaporation of molten zinc is hard on the surface of the bath, and thus in terms of operation cost and further in terms of attachment of vaporized zinc to the inside of the furnace, operational problems are caused.

Treatment Conditions in the Plating Step

The treatment conditions in the plating step will be explained.

Schematically, the components of the hot-dip galvanizing layer and the content percentages of them are defined, and the thickness of the hot-dip galvanizing layer is defined. In this embodiment, as explained previously, the hot-dip galvanizing layer is defined to contain not less than 4 mass % nor more than 14 mass % of Fe and not less than 0.1 mass % nor more than 1 mass % of Al and contain a balance being composed of Zn and inevitable impurities, and the thickness of the hot-dip galvanizing layer formed on the surface of the base steel sheet is defined to fall within the range of not less than 1 μm nor more than 30 μm.

Figure 11:
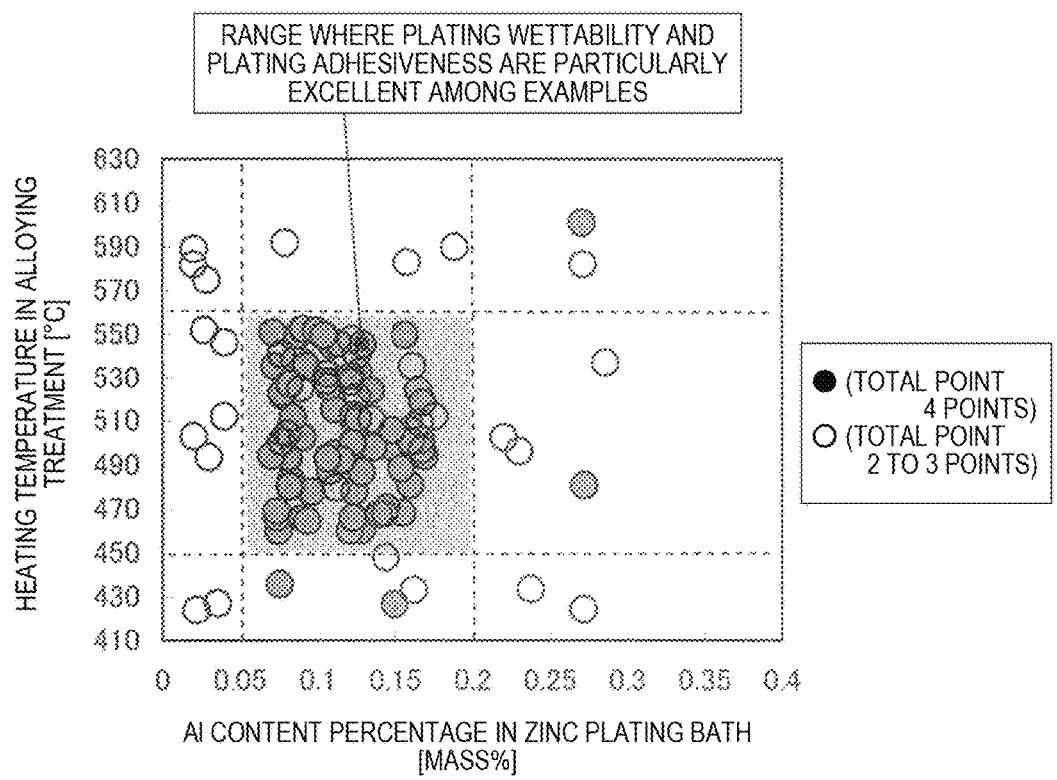
FIG. 11 is a graph showing the relationship between content percentage of Al [mass %] in a hot-dip galvanizing bath when a hot-dip galvanizing treatment is performed on the base steel sheet for a hot-dip galvanized steel sheet and a heating temperature [° C.] when heating is performed for performing an alloying treatment after the hot-dip galvanizing treatment in accordance with the manufacturing method of the hot-dip galvanized steel sheet according to the present invention (Examples A1 to A72 and B1 to B36).

In a preferable aspect of this embodiment, the concentration of Al in a melt in the hot-dip galvanizing bath to be used in the plating step is set to be in the range of not less than 0.05% nor more than 0.20%. Thereby, it is possible to manufacture a hot-dip galvanized steel sheet excellent in plating wettability and plating adhesiveness. This is reflected also in FIG. 11. Further, from results of corresponding examples (examples and comparative examples), the following is clarified. When the concentration of Al becomes less than 0.05%, a ζ phase is formed in large amounts, resulting in that such a hot-dip galvanized steel sheet is evaluated to be poor in plating adhesiveness. On the other hand, when the concentration of Al becomes greater than 0.2%, the amount of Al oxidized in the hot-dip galvanizing bath or on the hot-dip galvanizing bath increases and the reactivity of the hot-dip galvanizing and the base steel sheet becomes worse, resulting in that such a hot-dip galvanized steel sheet is evaluated to be poor in plating wettability and plating adhesiveness.

Further, in another preferable aspect of this embodiment, after performing the annealing step in the heating furnace and the soaking and holding step in the soaking furnace, and before performing the hot-dip galvanizing treatment, cooling of the base steel sheet is performed, and temperature keeping is performed according to need. Further, in this aspect, after performing the hot-dip galvanizing treatment, an alloying treatment is performed.

On the occasion of the above-described alloying treatment, a heating temperature when heating is in the range of not lower than 450° C. nor higher than 560° C. Thereby, an obtainable hot-dip galvanized steel sheet can be made excellent in plating wettability and plating adhesiveness. The range of this heating temperature is shown also in FIG. 11. Further, from results of corresponding examples (examples and comparative examples), the following is clarified. When the heating temperature of the alloying treatment is lower than 440° C., an alloying reaction does not progress sufficiently, so that an obtainable hot-dip galvanized steel sheet is evaluated to be poor in plating wettability and plating adhesiveness. On the other hand, when the heating temperature of the alloying treatment is higher than 560° C., due to overalloying, a Γ phase or $Γ_1$ phase of hard and brittle Zn—Fe alloy is formed in large amounts on an interface of a base iron, plating adhesiveness becomes worse or deteriorates, and further carbide of Fe is formed, and thus the balance between strength and ductility of the base steel sheet also becomes worse. Incidentally, this is caused even if the base steel sheet is a DP steel or a TRIP steel. Thus, also in the case of the heating temperature being too high, an obtainable hot-dip galvanized steel sheet is evaluated to be poor in plating wettability and plating adhesiveness.

EXAMPLE

Hereinafter, examples according to the present invention (the examples and the comparative examples) will be explained concretely.

Cold-rolled steel sheets obtained after undergoing normal casting, hot rolling, pickling, and cold rolling and having a thickness of 1 mm were prepared as sample materials 1 to 72 (see Table 1). On these sample materials, an annealing treatment and a hot-dip galvanizing treatment were performed in a continuous hot-dip galvanizing facility equipped with an all radiant tube type heating furnace. The all radiant tube type heating furnace was used, so that roll pickup was not easily caused and further productivity was also good. The temperature $T_{Ac3}$ corresponding to an $A_{c3}$ point being a transformation point in Table 1 was calculated by using a calculation expression of a transformation temperature provided on a web site of Welding Technology Information Center of The Japan Welding Engineering Society (http://www.-it.jwes.or.jp/weld_simulator/call.jsp). [Table1]

TABLE 1

| | Composition of cold-rolled steel sheet | | | | | | | | | | | | | | | | | |
|---|---|---|---|---|---|---|---|---|---|---|---|---|---|---|---|---|---|---|
| SAMPLE MATERIAL No. | COMPOSITION OF COLD-ROLLED STEEL SHEET [MASS%] | | | | | | | | | | | | | | | | | $AC_3$ POINT [° C.] |
| | C | Si | Mn | P | S | Al | Ti | Nb | Cr | Ms | Ni | Cu | Zr | V | W | B | Ca | Ce | |
| 1 | 0.06 | 0.3 | 0.5 | 0.010 | 0.002 | 0.04 | – | – | – | – | – | – | – | – | – | – | – | – | 923 |
| 2 | 0.17 | 0.3 | 0.5 | 0.006 | 0.005 | 0.02 | – | – | – | – | – | – | – | – | – | – | – | – | 874 |
| 3 | 0.25 | 0.3 | 0.5 | 0.002 | 0.002 | 0.01 | – | – | – | – | – | – | – | – | – | – | – | – | 836 |
| 4 | 0.36 | 0.3 | 0.5 | 0.002 | 0.007 | 0.08 | – | – | – | – | – | – | – | – | – | – | – | – | 801 |
| 5 | 0.43 | 0.3 | 0.5 | 0.006 | 0.012 | 0.07 | – | – | – | – | – | – | – | – | – | – | – | – | 768 |
| 6 | 0.06 | 1.0 | 0.5 | 0.005 | 0.002 | 0.04 | – | – | – | – | – | – | – | – | – | – | – | – | 966 |
| 7 | 0.13 | 1.0 | 0.5 | 0.011 | 0.007 | 0.08 | – | – | – | – | – | – | – | – | – | – | – | – | 942 |
| 8 | 0.27 | 1.0 | 0.5 | 0.002 | 0.014 | 0.03 | – | – | – | – | – | – | – | – | – | – | – | – | 872 |
| 9 | 0.33 | 1.0 | 0.5 | 0.013 | 0.004 | 0.08 | – | – | – | – | – | – | – | – | – | – | – | – | 852 |
| 10 | 0.45 | 1.0 | 0.5 | 0.001 | 0.004 | 0.08 | – | – | – | – | – | – | – | – | – | – | – | – | 802 |
| 11 | 0.05 | 2.0 | 0.5 | 0.009 | 0.016 | 0.02 | – | – | – | – | – | – | – | – | – | – | – | – | 1020 |
| 12 | 0.17 | 2.0 | 0.5 | 0.007 | 0.011 | 0.07 | – | – | – | – | – | – | – | – | – | – | – | – | 981 |
| 13 | 0.26 | 2.0 | 0.5 | 0.010 | 0.005 | 0.05 | – | – | – | – | – | – | – | – | – | – | – | – | 937 |
| 14 | 0.33 | 2.0 | 0.5 | 0.009 | 0.011 | 0.08 | – | – | – | – | – | – | – | – | – | – | – | – | 912 |
| 15 | 0.47 | 2.0 | 0.5 | 0.018 | 0.016 | 0.03 | – | – | – | – | – | – | – | – | – | – | – | – | 842 |
| 16 | 0.07 | 3.0 | 0.5 | 0.018 | 0.018 | 0.10 | – | – | – | – | – | – | – | – | – | – | – | – | 1084 |
| 17 | 0.15 | 3.0 | 0.5 | 0.006 | 0.007 | 0.02 | – | – | – | – | – | – | – | – | – | – | – | – | 1034 |
| 18 | 0.26 | 3.0 | 0.5 | 0.004 | 0.007 | 0.01 | – | – | – | – | – | – | – | – | – | – | – | – | 986 |
| 19 | 0.37 | 3.0 | 0.5 | 0.009 | 0.010 | 0.10 | – | – | – | – | – | – | – | – | – | – | – | – | 954 |
| 20 | 0.44 | 3.0 | 0.5 | 0.001 | 0.009 | 0.06 | – | – | – | – | – | – | – | – | – | – | – | – | 914 |
| 21 | 0.05 | 1.0 | 2.0 | 0.012 | 0.001 | 0.04 | – | – | – | – | – | – | – | – | – | – | – | – | 939 |
| 22 | 0.13 | 1.0 | 2.0 | 0.014 | 0.015 | 0.03 | – | – | – | – | – | – | – | – | – | – | – | – | 902 |
| 23 | 0.26 | 1.0 | 2.0 | 0.020 | 0.014 | 0.01 | – | – | – | – | – | – | – | – | – | – | – | – | 842 |
| 24 | 0.35 | 1.0 | 2.0 | 0.019 | 0.008 | 0.05 | – | – | – | – | – | – | – | – | – | – | – | – | 810 |
| 25 | 0.47 | 1.0 | 2.0 | 0.006 | 0.009 | 0.05 | – | – | – | – | – | – | – | – | – | – | – | – | 759 |
| 26 | 0.08 | 2.0 | 2.0 | 0.020 | 0.007 | 0.03 | – | – | – | – | – | – | – | – | – | – | – | – | 981 |
| 27 | 0.15 | 2.0 | 2.0 | 0.011 | 0.006 | 0.05 | – | – | – | – | – | – | – | – | – | – | – | – | 951 |
| 28 | 0.25 | 2.0 | 2.0 | 0.004 | 0.017 | 0.08 | – | – | – | – | – | – | – | – | – | – | – | – | 919 |
| 29 | 0.35 | 2.0 | 2.0 | 0.016 | 0.013 | 0.05 | – | – | – | – | – | – | – | – | – | – | – | – | 867 |
| 30 | 0.43 | 2.0 | 2.0 | 0.019 | 0.016 | 0.02 | – | – | – | – | – | – | – | – | – | – | – | – | 826 |
| 31 | 0.06 | 3.0 | 2.0 | 0.002 | 0.006 | 0.02 | – | – | – | – | – | – | – | – | – | – | – | – | 1041 |
| 32 | 0.14 | 3.0 | 2.0 | 0.019 | 0.013 | 0.02 | – | – | – | – | – | – | – | – | – | – | – | – | 1008 |
| 33 | 0.27 | 3.0 | 2.0 | 0.011 | 0.014 | 0.01 | – | – | – | – | – | – | – | – | – | – | – | – | 948 |

TABLE 1-continued

Composition of cold-rolled steel sheet

| SAMPLE MA-TERIAL No. | COMPOSITION OF COLD-ROLLED STEEL SHEET [MASS%] | | | | | | | | | | | | | | | | | | AC$_3$ POINT [° C.] |
|---|---|---|---|---|---|---|---|---|---|---|---|---|---|---|---|---|---|---|---|
| | C | Si | Mn | P | S | Al | Ti | Nb | Cr | Ms | Ni | Cu | Zr | V | W | B | Ca | Ce | |
| 34 | 0.34 | 3.0 | 2.0 | 0.14 | 0.009 | 0.06 | – | – | – | – | – | – | – | – | – | – | – | – | 931 |
| 35 | 0.43 | 3.0 | 2.0 | 0.001 | 0.005 | 0.07 | – | – | – | – | – | – | – | – | – | – | – | – | 890 |
| 36 | 0.05 | 1.0 | 4.0 | 0.019 | 0.020 | 0.04 | – | – | – | – | – | – | – | – | – | – | – | – | 902 |
| 37 | 0.13 | 1.0 | 4.0 | 0.012 | 0.014 | 0.05 | – | – | – | – | – | – | – | – | – | – | – | – | 866 |
| 38 | 0.25 | 1.0 | 4.0 | 0.015 | 0.009 | 0.02 | – | – | – | – | – | – | – | – | – | – | – | – | 810 |
| 39 | 0.37 | 1.0 | 4.0 | 0.014 | 0.009 | 0.03 | – | – | – | – | – | – | – | – | – | – | – | – | 759 |
| 40 | 0.44 | 1.0 | 4.0 | 0.008 | 0.017 | 0.04 | – | – | – | – | – | – | – | – | – | – | – | – | 732 |
| 41 | 0.06 | 2.0 | 4.0 | 0.014 | 0.010 | 0.04 | – | – | – | – | – | – | – | – | – | – | – | – | 954 |
| 42 | 0.13 | 2.0 | 4.0 | 0.014 | 0.012 | 0.05 | – | – | – | – | – | – | – | – | – | – | – | – | 922 |
| 43 | 0.27 | 2.0 | 4.0 | 0.016 | 0.011 | 0.01 | – | – | – | – | – | – | – | – | – | – | – | – | 854 |
| 44 | 0.37 | 2.0 | 4.0 | 0.013 | 0.015 | 0.10 | – | – | – | – | – | – | – | – | – | – | – | – | 829 |
| 45 | 0.44 | 2.0 | 4.0 | 0.016 | 0.004 | 0.04 | – | – | – | – | – | – | – | – | – | – | – | – | 784 |
| 46 | 0.06 | 3.0 | 4.0 | 0.008 | 0.017 | 0.05 | – | – | – | – | – | – | – | – | – | – | – | – | 1011 |
| 47 | 0.16 | 3.0 | 4.0 | 0.008 | 0.017 | 0.04 | – | – | – | – | – | – | – | – | – | – | – | – | 966 |
| 48 | 0.27 | 3.0 | 4.0 | 0.011 | 0.002 | 0.01 | – | – | – | – | – | – | – | – | – | – | – | – | 912 |
| 49 | 0.34 | 3.0 | 4.0 | 0.010 | 0.020 | 0.07 | – | – | – | – | – | – | – | – | – | – | – | – | 891 |
| 50 | 0.47 | 3.0 | 4.0 | 0.013 | 0.002 | 0.01 | – | – | – | – | – | – | – | – | – | – | – | – | 825 |
| 51 | 0.17 | 1.0 | 2.0 | 0.019 | 0.004 | 0.05 | 0.02 | – | – | – | – | – | – | – | – | – | – | – | 893 |
| 52 | 0.17 | 1.0 | 2.0 | 0.019 | 0.020 | 0.05 | – | 0.02 | 0.10 | – | – | – | – | – | – | – | – | – | 887 |
| 53 | 0.14 | 1.0 | 2.0 | 0.019 | 0.013 | 0.05 | – | – | – | 0.10 | – | – | – | – | – | – | – | – | 905 |
| 54 | 0.16 | 1.0 | 2.0 | 0.019 | 0.019 | 0.05 | – | – | – | – | 0.10 | – | – | – | – | – | – | – | 892 |
| 55 | 0.14 | 1.0 | 2.0 | 0.019 | 0.012 | 0.05 | – | – | – | – | – | 0.10 | – | – | – | – | – | – | 900 |
| 56 | 0.14 | 1.0 | 2.0 | 0.019 | 0.009 | 0.05 | – | – | – | – | – | – | 0.10 | – | – | – | – | – | 903 |
| 57 | 0.15 | 1.0 | 2.0 | 0.019 | 0.019 | 0.05 | – | – | – | – | – | – | – | 0.10 | – | – | – | – | 912 |
| 58 | 0.16 | 1.0 | 2.0 | 0.019 | 0.019 | 0.05 | – | – | – | – | – | – | – | – | 0.10 | – | – | – | 893 |
| 59 | 0.15 | 1.0 | 2.0 | 0.019 | 0.006 | 0.05 | – | – | 0.10 | – | – | – | – | – | – | 0.001 | – | – | 899 |
| 60 | 0.15 | 1.0 | 2.0 | 0.019 | 0.002 | 0.05 | – | – | – | – | – | – | – | – | – | – | 0.002 | – | 897 |
| 61 | 0.14 | 1.0 | 2.0 | 0.019 | 0.020 | 0.05 | – | – | – | – | – | – | – | – | – | – | – | 0.02 | 901 |
| 62 | 0.07 | 0.3 | 0.5 | 0.010 | 0.002 | 0.04 | 0.02 | 0.03 | – | 0.10 | – | – | – | – | – | 0.001 | – | – | 930 |
| 63 | 0.06 | 0.3 | 0.5 | 0.010 | 0.002 | 0.04 | 0.02 | – | 0.10 | – | – | – | – | – | – | – | – | – | 930 |
| 64 | 0.07 | 0.3 | 0.5 | 0.010 | 0.002 | 0.04 | 0.02 | – | 0.10 | 0.10 | – | – | – | – | – | – | – | – | 928 |
| 65 | 0.06 | 0.3 | 0.5 | 0.010 | 0.002 | 0.04 | – | – | – | – | 0.10 | – | – | – | – | – | – | – | 921 |
| 66 | 0.05 | 0.3 | 0.5 | 0.010 | 0.002 | 0.04 | – | – | – | – | – | 0.10 | – | – | – | – | – | – | 927 |
| 67 | 0.07 | 0.3 | 0.5 | 0.010 | 0.002 | 0.04 | – | – | – | – | – | – | 0.10 | – | – | – | – | – | 921 |
| 68 | 0.06 | 0.3 | 0.5 | 0.010 | 0.002 | 0.04 | – | – | – | – | – | – | – | 0.10 | – | – | – | – | 940 |
| 69 | 0.07 | 0.3 | 0.5 | 0.010 | 0.002 | 0.04 | – | – | – | – | – | – | – | – | 0.10 | – | – | – | 922 |
| 70 | 0.05 | 0.3 | 0.5 | 0.010 | 0.002 | 0.04 | 0.02 | 0.02 | 0.10 | – | – | – | – | – | – | 0.001 | – | – | 935 |
| 71 | 0.07 | 0.3 | 0.5 | 0.010 | 0.002 | 0.04 | – | – | – | – | – | – | – | – | – | – | 0.002 | – | 921 |
| 72 | 0.06 | 0.3 | 0.5 | 0.010 | 0.002 | 0.04 | – | – | – | – | – | – | – | – | – | – | – | 0.02 | 925 |

In Tables 2-1 to 4-2 below, treatment conditions in the heating furnace and a soaking furnace and a logarithmic value log(PCO$_2$/PCO) of a value of a carbon dioxide partial pressure divided by a carbon monoxide partial pressure are shown. The comparative examples are shown in Table 4-1 and Table 4-2. Incidentally, the treatment atmosphere in the furnaces was set to a nitrogen gas containing carbon dioxide and carbon monoxide. Carbon dioxide and carbon monoxide were supplied into the furnaces as a mixed gas. [Table2-1]

TABLE 2-1

Manufacturing conditions, analysis results, and evaluation results of plating wettability and plating adhesiveness (examples)

CONDITION OF RECRYSTALLIZATION ANNEALING

HEATING FURNACE CONDITION

| LEVEL | SAMPLE MA-TERIAL No. OF COLD-ROLLED STEEL SHEET | SHEET TEMPER-ATURE TO [° C.] WHEN REACH-ING MAXI-MUM | TEMPER-ATURE T$_1$ [° C.] T$_1$ = 500 – 50 × W$_{Si(B)}$ – 20 × W$_{Mn(B)}$ | TEMPER-ATURE T$_2$ [° C.] T$_2$ = A$_{C3}$ + 40 | HEAT-ING TIME PERIOD S$_0$ [SEC-OND] | TIME PERIOD S$_1$ [SEC-OND] S$_1$ = 20 × W$_{Si(B)}$ + 10 × W$_{Mn(B)}$ | TIME PERIOD S$_2$ [SEC-OND] S$_2$ = 200 + 1000 × W$_{C(B)}$ | CARBON DIOXIDE PAR-TIAL PRES-SURE log(PCO$_2$) | CARBON MONO-XIDE PAR-TIAL PRES-SURE log(PCO) | ATMO-SPHERE GAS log(PCO$_2$/PCO) |
|---|---|---|---|---|---|---|---|---|---|---|
| A1 | 1 | 807 | 475 | 960 | 143 | 61 | 273 | –1.94 | –1.94 | 0.0 |
| A2 | 2 | 515 | 475 | 917 | 147 | 61 | 362 | –1.32 | –1.77 | 0.5 |
| A3 | 3 | 830 | 475 | 874 | 169 | 61 | 458 | –1.85 | –1.67 | –0.2 |
| A4 | 4 | 730 | 475 | 841 | 223 | 61 | 564 | –2.25 | –1.71 | –0.5 |
| A5 | 5 | 745 | 475 | 806 | 219 | 61 | 638 | –2.93 | –1.67 | –1.3 |

TABLE 2-1-continued

Manufacturing conditions, analysis results, and evaluation results of plating wettability and plating adhesiveness (examples)

| | | | | | | | | | | |
|---|---|---|---|---|---|---|---|---|---|---|
| A6  | 6  | 845 | 440 | 1002 | 133 | 75  | 265 | −1.46 | −1.92 | 0.5 |
| A7  | 7  | 509 | 440 | 972  | 283 | 75  | 353 | −2.20 | −1.58 | −0.6 |
| A8  | 8  | 740 | 440 | 917  | 118 | 75  | 456 | −1.86 | −1.57 | −0.3 |
| A9  | 9  | 810 | 440 | 893  | 303 | 75  | 533 | −1.12 | −1.61 | 0.5 |
| A10 | 10 | 822 | 440 | 841  | 86  | 75  | 653 | −1.62 | −1.89 | 0.3 |
| A11 | 11 | 823 | 390 | 1066 | 224 | 95  | 240 | −3.06 | −1.68 | −1.4 |
| A12 | 12 | 678 | 390 | 1032 | 238 | 95  | 340 | −2.97 | −1.71 | −1.3 |
| A13 | 13 | 763 | 390 | 984  | 129 | 95  | 441 | −2.98 | −1.81 | −1.2 |
| A14 | 14 | 834 | 390 | 942  | 245 | 95  | 554 | −1.28 | −1.59 | 0.3 |
| A15 | 15 | 770 | 390 | 894  | 466 | 95  | 639 | −2.71 | −1.94 | −0.8 |
| A16 | 16 | 706 | 340 | 1126 | 240 | 115 | 264 | −2.95 | −1.60 | −1.3 |
| A17 | 17 | 786 | 340 | 1065 | 126 | 115 | 369 | −3.35 | −1.53 | −1.8 |
| A18 | 18 | 837 | 340 | 1021 | 226 | 115 | 467 | −2.65 | −1.55 | −1.1 |
| A19 | 19 | 352 | 340 | 992  | 524 | 115 | 574 | −2.61 | −1.75 | −0.9 |
| A20 | 20 | 847 | 340 | 945  | 274 | 115 | 666 | −2.81 | −1.56 | −1.3 |
| A21 | 21 | 794 | 410 | 982  | 187 | 90  | 243 | −1.04 | −1.79 | 0.7 |
| A22 | 22 | 815 | 410 | 925  | 330 | 90  | 370 | −2.35 | −1.99 | −0.4 |
| A23 | 23 | 776 | 410 | 886  | 442 | 90  | 453 | −1.71 | −1.73 | 0.0 |
| A24 | 24 | 571 | 410 | 845  | 166 | 90  | 561 | −1.44 | −1.71 | 0.3 |
| A25 | 25 | 568 | 410 | 808  | 553 | 90  | 648 | −3.65 | −1.88 | −1.8 |
| A26 | 26 | 704 | 360 | 1033 | 112 | 110 | 253 | −2.74 | −1.96 | −0.8 |
| A27 | 27 | 731 | 360 | 992  | 287 | 110 | 354 | −0.80 | −1.57 | 0.8 |
| A28 | 28 | 558 | 360 | 966  | 150 | 110 | 430 | −1.59 | −1.63 | 0.0 |
| A29 | 29 | 725 | 360 | 911  | 181 | 110 | 538 | −0.91 | −1.66 | 0.7 |
| A30 | 30 | 812 | 360 | 849  | 597 | 110 | 671 | −1.68 | −1.82 | 0.1 |
| A31 | 31 | 798 | 310 | 1091 | 212 | 130 | 241 | −1.03 | −1.65 | 0.6 |
| A32 | 32 | 800 | 310 | 1045 | 173 | 130 | 350 | −3.51 | −1.66 | −1.8 |
| A33 | 33 | 765 | 310 | 998  | 193 | 130 | 449 | −2.51 | −1.94 | −0.6 |
| A34 | 34 | 357 | 310 | 965  | 327 | 130 | 551 | −2.35 | −1.91 | −0.4 |
| A35 | 35 | 844 | 310 | 921  | 186 | 130 | 653 | −1.67 | −1.93 | 0.3 |
| A36 | 36 | 789 | 370 | 937  | 160 | 110 | 257 | −2.43 | −1.55 | −0.9 |

| | CONDITION OF RECRYSTALLIZATION ANNEALING | | | | HOT-DIP GALVANIZING TREATMENT CONDITION | |
|---|---|---|---|---|---|---|
| | SOAKING FURNACE CONDITION | | | | | |
| LEVEL | CARBON DIOXIDE PARTIAL PRESSURE log(PCO$_2$) | CARBON MONOXIDE PARTIAL PRESSURE log(PCO) | ATMOSPHERE GAS log(PCO$_2$/PCO) | SOAKING AND HOLDING TIME PERIOD [SECOND] | Al CONTENT PERCENTAGE IN ZINC PLATING BATH [MASS%] | HEATING TEMPERATURE IN ALLOYING TREATMENT [° C.] |
| A1  | −3.96 | −1.67 | −2.3 | 269 | 0.08 | 528 |
| A2  | −4.44 | −1.80 | −2.6 | 398 | 0.13 | 511 |
| A3  | −6.39 | −1.60 | −4.8 | 226 | 0.09 | 548 |
| A4  | −6.09 | −1.91 | −4.2 | 270 | 0.16 | 535 |
| A5  | −4.88 | −1.87 | −3.0 | 408 | 0.16 | 506 |
| A6  | −6.75 | −1.89 | −4.9 | 187 | 0.07 | 460 |
| A7  | −5.62 | −1.81 | −3.8 | 191 | 0.10 | 478 |
| A8  | −6.41 | −1.77 | −4.6 | 361 | 0.15 | 498 |
| A9  | −5.57 | −1.88 | −3.7 | 336 | 0.17 | 494 |
| A10 | −5.32 | −1.54 | −3.8 | 120 | 0.13 | 460 |
| A11 | −5.68 | −1.93 | −4.8 | 448 | 0.08 | 499 |
| A12 | −4.07 | −1.98 | −2.1 | 487 | 0.11 | 495 |
| A13 | −4.04 | −1.82 | −2.2 | 283 | 0.15 | 468 |
| A14 | −4.74 | −1.55 | −3.2 | 180 | 0.12 | 494 |
| A15 | −3.97 | −1.67 | −2.1 | 387 | 0.07 | 535 |
| A16 | −6.52 | −1.67 | −4.8 | 462 | 0.09 | 552 |
| A17 | −6.49 | −1.55 | −4.9 | 178 | 0.09 | 537 |
| A18 | −6.60 | −1.99 | −4.6 | 205 | 0.13 | 521 |
| A19 | −5.27 | −1.66 | −3.6 | 254 | 0.14 | 471 |
| A20 | −5.75 | −1.79 | −4.0 | 430 | 0.08 | 501 |
| A21 | −6.49 | −1.87 | −4.6 | 410 | 0.09 | 538 |
| A22 | −5.43 | −1.75 | −3.7 | 182 | 0.11 | 545 |
| A23 | −4.69 | −1.96 | −2.7 | 412 | 0.07 | 466 |
| A24 | −5.77 | −1.79 | −4.0 | 453 | 0.13 | 533 |
| A25 | −5.51 | −1.78 | −3.7 | 428 | 0.11 | 487 |
| A26 | −6.00 | −1.88 | −4.1 | 226 | 0.08 | 503 |
| A27 | −5.18 | −1.65 | −3.5 | 474 | 0.12 | 478 |
| A28 | −5.11 | −1.61 | −3.5 | 363 | 0.16 | 525 |
| A29 | −5.58 | −1.52 | −4.1 | 210 | 0.12 | 511 |
| A30 | −4.73 | −1.53 | −3.2 | 124 | 0.13 | 546 |
| A31 | −6.70 | −1.94 | −4.8 | 473 | 0.07 | 469 |
| A32 | −4.85 | −1.99 | −2.9 | 330 | 0.14 | 468 |
| A33 | −6.16 | −1.52 | −4.6 | 435 | 0.10 | 552 |

TABLE 2-1-continued

Manufacturing conditions, analysis results, and evaluation results of plating wettability and plating adhesiveness (examples)

| | | | | | | |
|---|---|---|---|---|---|---|
| A34 | −4.60 | −1.66 | −2.9 | 150 | 0.13 | 499 |
| A35 | −4.19 | −1.68 | −2.5 | 364 | 0.17 | 501 |
| A36 | −4.82 | −1.62 | −3.2 | 129 | 0.12 | 460 |

TABLE 2-2

Manufacturing conditions, analysis results, and evaluation results of plating wettability and plating adhesiveness (examples)

CONDITION OF RECRYSTALLIZATION ANNEALING

HEATING FURNACE CONDITION

| LEVEL | SAMPLE MATERIAL No. OF COLD-ROLLED STEEL SHEET | SHEET TEMPERATURE TO [° C.] WHEN REACHING MAXIMUM | TEMPERATURE $T_1$ [° C.] $T_1 = 500 - 50 \times W_{Si(B)} - 20 \times W_{Mn(B)}$ | TEMPERATURE $T_2$ [° C.] $T_2 = A_{C3} + 40$ | HEATING TIME PERIOD $S_0$ [SECOND] | TIME PERIOD $S_1$ [SECOND] $S_1 = 20 \times W_{Si(B)} + 10 \times W_{Mn(B)}$ | TIME PERIOD $S_2$ [SECOND] $S_2 = 200 + 1000 \times W_{C(B)}$ | CARBON DIOXIDE PARTIAL PRESSURE log(PCO$_2$) | CARBON MONOXIDE PARTIAL PRESSURE log(PCO) | ATMOSPHERE GAS log(PCO$_2$/PCO) |
|---|---|---|---|---|---|---|---|---|---|---|
| A37 | 37 | 828 | 370 | 896 | 229 | 110 | 355 | −2.91 | −1.75 | −1.2 |
| A38 | 38 | 708 | 370 | 840 | 168 | 110 | 472 | −3.61 | −1.93 | −1.7 |
| A39 | 39 | 634 | 370 | 806 | 112 | 110 | 541 | −2.93 | −1.60 | −1.3 |
| A40 | 40 | 745 | 370 | 762 | 457 | 110 | 661 | −3.19 | −1.82 | −1.4 |
| A41 | 41 | 766 | 320 | 996 | 240 | 130 | 253 | −2.43 | −1.91 | −0.5 |
| A42 | 42 | 737 | 320 | 951 | 212 | 130 | 380 | −2.20 | −1.78 | −0.4 |
| A43 | 43 | 766 | 320 | 906 | 322 | 130 | 444 | −1.95 | −1.70 | −0.3 |
| A44 | 44 | 716 | 320 | 870 | 305 | 130 | 566 | −2.70 | −1.73 | −1.0 |
| A45 | 45 | 761 | 320 | 811 | 322 | 130 | 674 | −0.85 | −1.57 | 0.7 |
| A46 | 46 | 813 | 270 | 1056 | 237 | 150 | 352 | −3.52 | −1.90 | −1.6 |
| A47 | 47 | 814 | 270 | 1008 | 262 | 150 | 352 | −2.76 | −1.61 | −1.1 |
| A48 | 48 | 748 | 270 | 962 | 345 | 150 | 444 | −1.76 | −1.72 | 0.0 |
| A49 | 49 | 496 | 270 | 929 | 473 | 150 | 546 | −3.04 | −1.59 | −1.5 |
| A50 | 50 | 782 | 270 | 870 | 253 | 150 | 654 | −1.47 | −1.63 | 0.2 |
| A51 | 51 | 755 | 410 | 935 | 354 | 90 | 360 | −1.09 | −1.59 | 0.5 |
| A52 | 52 | 813 | 410 | 945 | 266 | 90 | 330 | −3.61 | −1.91 | −1.7 |
| A53 | 53 | 502 | 410 | 940 | 192 | 90 | 353 | −3.74 | −1.95 | −1.8 |
| A54 | 54 | 777 | 410 | 925 | 228 | 90 | 372 | −2.17 | −1.87 | −0.3 |
| A55 | 55 | 844 | 410 | 943 | 161 | 90 | 332 | −2.67 | −1.98 | −0.7 |
| A56 | 56 | 660 | 410 | 946 | 214 | 90 | 330 | −0.90 | −1.72 | 0.8 |
| A57 | 57 | 820 | 410 | 941 | 365 | 90 | 369 | −1.63 | −1.60 | 0.0 |
| A58 | 58 | 848 | 410 | 933 | 126 | 90 | 360 | −0.67 | −1.50 | 0.8 |
| A59 | 59 | 633 | 410 | 943 | 198 | 90 | 345 | −2.59 | −1.62 | −1.0 |
| A60 | 60 | 847 | 410 | 936 | 105 | 90 | 352 | −2.91 | −1.99 | −0.9 |
| A61 | 61 | 735 | 410 | 941 | 128 | 90 | 342 | −2.87 | −1.99 | −0.9 |
| A62 | 62 | 485 | 475 | 967 | 228 | 61 | 262 | −2.30 | −1.52 | −0.8 |
| A63 | 63 | 779 | 475 | 973 | 180 | 61 | 243 | −1.36 | −1.96 | 0.6 |
| A64 | 64 | 772 | 475 | 970 | 97 | 61 | 257 | −3.58 | −1.71 | −1.9 |
| A65 | 65 | 783 | 475 | 965 | 125 | 61 | 255 | −2.10 | −1.62 | −0.5 |
| A66 | 66 | 803 | 475 | 963 | 207 | 61 | 262 | −3.49 | −1.55 | −1.9 |
| A67 | 67 | 776 | 475 | 976 | 163 | 61 | 236 | −1.56 | −1.96 | −0.4 |
| A68 | 68 | 757 | 475 | 974 | 211 | 61 | 268 | −2.96 | −1.80 | −1.2 |
| A69 | 69 | 732 | 475 | 971 | 79 | 61 | 248 | −1.59 | −1.59 | 0.0 |
| A70 | 70 | 757 | 475 | 978 | 105 | 61 | 238 | −2.66 | −1.95 | −0.7 |
| A71 | 71 | 691 | 475 | 969 | 97 | 61 | 252 | −2.57 | −1.69 | −0.9 |
| A72 | 72 | 788 | 475 | 977 | 193 | 61 | 232 | −2.14 | −1.53 | −0.6 |

| | CONDITION OF RECRYSTALLIZATION ANNEALING | | | | HOT-DIP GALVANIZING | |
|---|---|---|---|---|---|---|
| | SOAKING FURNACE CONDITION | | | | TREATMENT CONDITION | |
| LEVEL | CARBON DIOXIDE PARTIAL PRESSURE log(PCO$_2$) | CARBON MONOXIDE PARTIAL PRESSURE log(PCO) | ATMOSPHERE GAS log(PCO$_2$/PCO) | SOAKING AND HOLDING TIME PERIOD [SECOND] | Al CONTENT PERCENTAGE IN ZINC PLATING BATH [MASS%] | HEATING TEMPERATURE IN ALLOYING TREATMENT [° C.] |
| A37 | −6.74 | −1.82 | −4.9 | 494 | 0.08 | 483 |
| A38 | −5.93 | −1.70 | −4.2 | 316 | 0.08 | 494 |
| A39 | −5.59 | −1.79 | −3.8 | 415 | 0.11 | 528 |
| A40 | −4.12 | −1.86 | −2.3 | 120 | 0.09 | 503 |
| A41 | −5.58 | −1.61 | −4.0 | 190 | 0.11 | 546 |

TABLE 2-2-continued

Manufacturing conditions, analysis results, and evaluation results of plating wettability and plating adhesiveness (examples)

| | | | | | | |
|---|---|---|---|---|---|---|
| A42 | −5.73 | −1.97 | −3.8 | 171 | 0.11 | 515 |
| A43 | −5.76 | −1.59 | −4.2 | 451 | 0.09 | 466 |
| A44 | −5.15 | −1.86 | −3.3 | 145 | 0.16 | 481 |
| A45 | −4.59 | −1.66 | −2.9 | 310 | 0.12 | 513 |
| A46 | −5.66 | −1.93 | −3.9 | 419 | 0.09 | 535 |
| A47 | −5.66 | −1.54 | −4.1 | 349 | 0.13 | 487 |
| A48 | −5.05 | −1.69 | −3.4 | 156 | 0.15 | 488 |
| A49 | −6.48 | −1.74 | −4.7 | 179 | 0.14 | 498 |
| A50 | −6.33 | −1.59 | −4.7 | 476 | 0.13 | 511 |
| A51 | −4.63 | −1.88 | −2.7 | 382 | 0.14 | 468 |
| A52 | −6.70 | −1.95 | −4.8 | 423 | 0.10 | 549 |
| A53 | −5.45 | −1.81 | −3.6 | 459 | 0.08 | 522 |
| A54 | −5.46 | −2.00 | −3.5 | 407 | 0.13 | 540 |
| A55 | −5.55 | −1.72 | −3.8 | 475 | 0.16 | 501 |
| A56 | −5.71 | −1.50 | −4.2 | 387 | 0.11 | 526 |
| A57 | −5.12 | −1.53 | −3.6 | 320 | 0.07 | 551 |
| A58 | −5.89 | −1.78 | −4.1 | 356 | 0.17 | 518 |
| A59 | −4.01 | −1.60 | −2.4 | 260 | 0.15 | 506 |
| A60 | −5.01 | −1.84 | −3.2 | 340 | 0.12 | 500 |
| A61 | −5.24 | −1.65 | −3.6 | 138 | 0.12 | 466 |
| A62 | −5.44 | −1.73 | −3.7 | 298 | 0.11 | 480 |
| A63 | −5.32 | −1.58 | −3.7 | 118 | 0.06 | 480 |
| A64 | −6.87 | −1.78 | −4.9 | 223 | 0.08 | 512 |
| A65 | −5.22 | −1.91 | −3.3 | 188 | 0.09 | 465 |
| A66 | −5.45 | −1.70 | −3.7 | 182 | 0.12 | 492 |
| A67 | −4.27 | −1.91 | −2.4 | 382 | 0.08 | 523 |
| A68 | −5.60 | −1.70 | −3.9 | 102 | 0.12 | 531 |
| A69 | −4.54 | −1.54 | −3.0 | 338 | 0.07 | 494 |
| A70 | −5.07 | −1.98 | −3.1 | 209 | 0.16 | 550 |
| A71 | −5.54 | −1.54 | −4.0 | 327 | 0.13 | 524 |
| A72 | −6.05 | −1.52 | −4.5 | 420 | 0.08 | 527 |

TABLE 2-3

Manufacturing conditions, analysis results, and evaluation results of plating wettability and plating adhesiveness (examples)

ANALYSIS RESULT AND EVALUATION RESULT OF OBTAINED HOT-DIP GALVANIZED STEEL SHEET

| LEVEL | SAMPLE MATERIAL No OF COLD-ROLLED STEEL SHEET | VICKERS HARDNESS | | | CONTENT PERCENTAGES OF C, Si, And Mn IN SURFACE LAYER OF BASE STEEL SHEET (DOWN TO 50 mm IN DEPTH) | | | CONTENT PERCENTAGES OF C, Si, AND Mn IN DEEP PORTION OF BASE STEEL SHEET (GRATHER THAN 50 mm IN DEPTH) | | | $W_{C(A)}/$ $W_{C(B)}$ | $W_{Si(A)}/$ $W_{Si(B)}$ | $W_{Mn(A)}/$ $W_{Mn(B)}$ |
|---|---|---|---|---|---|---|---|---|---|---|---|---|---|
| | | $H_A$ | $H_B$ | $H_A/H_B$ | $W_{C(A)}$ | $W_{Si(A)}$ | $W_{Mn(A)}$ | $W_{C(B)}$ | $W_{Si(B)}$ | $W_{Mn(B)}$ | | | |
| A1 | 1 | 86 | 135 | 0.62 | 9.01 | 0.10 | 0.18 | 0.04 | 0.30 | 0.52 | 0.28 | 0.31 | 0.36 |
| A2 | 2 | 117 | 156 | 0.75 | 0.06 | 0.08 | 0.17 | 0.15 | 0.31 | 0.52 | 0.39 | 0.27 | 0.33 |
| A3 | 3 | 125 | 176 | 0.71 | 0.09 | 0.10 | 0.21 | 0.23 | 0.31 | 0.51 | 0.39 | 0.31 | 0.41 |
| A4 | 4 | 153 | 197 | 0.78 | 0.15 | 0.10 | 0.15 | 0.36 | 0.30 | 0.51 | 0.46 | 0.32 | 0.28 |
| A5 | 5 | 170 | 212 | 0.80 | 0.13 | 0.09 | 0.21 | 0.47 | 0.31 | 0.52 | 0.28 | 0.29 | 0.41 |
| A6 | 6 | 108 | 158 | 0.68 | 0.03 | 0.31 | 0.22 | 0.06 | 1.03 | 0.50 | 0.42 | 0.30 | 0.44 |
| A7 | 7 | 123 | 176 | 0.70 | 0.07 | 0.48 | 0.24 | 0.17 | 1.00 | 0.50 | 0.39 | 0.48 | 0.48 |
| A8 | 8 | 139 | 195 | 0.71 | 0.08 | 0.44 | 0.15 | 0.25 | 1.00 | 0.52 | 0.31 | 0.44 | 0.28 |
| A9 | 9 | 163 | 212 | 0.77 | 0.16 | 0.39 | 0.23 | 0.37 | 1.01 | 0.50 | 0.44 | 0.39 | 0.45 |
| A10 | 10 | 181 | 236 | 0.77 | 0.14 | 0.28 | 0.18 | 0.47 | 1.01 | 0.50 | 0.30 | 0.28 | 0.35 |
| A11 | 11 | 163 | 183 | 0.89 | 0.01 | 0.72 | 0.17 | 0.07 | 2.06 | 0.52 | 0.14 | 0.35 | 0.34 |
| A12 | 12 | 161 | 203 | 0.79 | 0.04 | 0.88 | 0.18 | 0.17 | 2.06 | 0.52 | 0.25 | 0.33 | 0.34 |
| A13 | 13 | 158 | 223 | 0.71 | 0.07 | 0.70 | 0.15 | 0.28 | 2.09 | 0.50 | 0.24 | 0.33 | 0.31 |
| A14 | 14 | 214 | 246 | 0.87 | 0.16 | 0.93 | 0.14 | 0.34 | 2.06 | 0.51 | 0.48 | 0.45 | 0.26 |
| A15 | 15 | 201 | 263 | 0.77 | 0.15 | 0.96 | 0.15 | 0.45 | 2.02 | 0.51 | 0.34 | 0.47 | 0.29 |
| A16 | 16 | 189 | 218 | 0.87 | 0.03 | 0.91 | 0.15 | 0.06 | 3.06 | 0.51 | 0.46 | 0.30 | 0.30 |
| A17 | 17 | 170 | 239 | 0.81 | 0.06 | 1.02 | 0.18 | 0.14 | 3.00 | 0.51 | 0.43 | 0.34 | 0.36 |
| A18 | 18 | 189 | 258 | 0.73 | 0.13 | 1.16 | 0.13 | 0.26 | 3.08 | 0.52 | 0.49 | 0.36 | 0.25 |
| A19 | 19 | 233 | 280 | 0.83 | 0.13 | 1.11 | 0.18 | 0.35 | 3.14 | 0.51 | 0.35 | 0.35 | 0.36 |
| A20 | 20 | 263 | 298 | 0.88 | 0.17 | 1.47 | 0.13 | 0.43 | 3.12 | 0.51 | 0.39 | 0.47 | 0.25 |
| A21 | 21 | 160 | 199 | 0.81 | 0.01 | 0.29 | 0.87 | 0.04 | 1.01 | 2.07 | 0.25 | 0.29 | 0.42 |
| A22 | 22 | 201 | 224 | 0.90 | 0.04 | 0.32 | 0.69 | 0.16 | 1.05 | 2.05 | 0.29 | 0.30 | 0.34 |
| A23 | 23 | 168 | 241 | 0.70 | 0.12 | 0.41 | 0.86 | 0.25 | 1.02 | 2.03 | 0.49 | 0.40 | 0.42 |
| A24 | 24 | 206 | 262 | 0.79 | 0.17 | 0.44 | 0.59 | 0.37 | 1.01 | 2.05 | 0.47 | 0.43 | 0.29 |
| A25 | 25 | 209 | 280 | 0.75 | 0.11 | 0.27 | 0.63 | 0.47 | 1.00 | 2.05 | 0.24 | 0.27 | 0.30 |
| A26 | 26 | 183 | 231 | 0.79 | 0.01 | 0.79 | 0.95 | 0.04 | 2.03 | 2.04 | 0.25 | 0.39 | 0.47 |
| A27 | 27 | 206 | 251 | 0.82 | 0.05 | 0.65 | 0.86 | 0.15 | 2.03 | 2.06 | 0.36 | 0.32 | 0.42 |

TABLE 2-3-continued

Manufacturing conditions, analysis results, and evaluation results of plating wettability and plating adhesiveness (examples)

| | | | | | | | | | | | | |
|---|---|---|---|---|---|---|---|---|---|---|---|---|
| A28 | 28 | 202 | 266 | 0.76 | 0.07 | 0.73 | 0.78 | 0.27 | 2.00 | 2.04 | 0.26 | 0.37 | 0.38 |
| A29 | 29 | 252 | 288 | 0.88 | 0.12 | 0.99 | 0.59 | 0.35 | 2.01 | 2.02 | 0.35 | 0.49 | 0.29 |
| A30 | 30 | 244 | 314 | 0.78 | 0.23 | 0.56 | 0.58 | 0.47 | 2.05 | 2.07 | 0.49 | 0.27 | 0.28 |
| A31 | 31 | 221 | 258 | 0.86 | 0.02 | 1.46 | 0.73 | 0.05 | 3.06 | 2.00 | 0.32 | 0.48 | 0.37 |
| A32 | 32 | 208 | 280 | 0.74 | 0.08 | 1.44 | 0.87 | 0.13 | 3.09 | 2.07 | 0.42 | 0.47 | 0.42 |
| A33 | 33 | 240 | 300 | 0.80 | 0.08 | 1.24 | 0.77 | 0.26 | 3.15 | 2.06 | 0.32 | 0.40 | 0.37 |
| A34 | 34 | 245 | 320 | 0.76 | 0.14 | 0.80 | 0.88 | 0.36 | 3.07 | 2.03 | 0.38 | 0.28 | 0.43 |
| A35 | 35 | 283 | 341 | 0.83 | 0.14 | 1.28 | 0.70 | 0.45 | 3.08 | 2.05 | 0.31 | 0.42 | 0.34 |
| A36 | 36 | 232 | 261 | 0.69 | 0.02 | 0.29 | 1.99 | 0.04 | 1.05 | 4.17 | 0.43 | 0.27 | 0.48 |

ANALYSIS RESULT AND EVALUATION RESULT OF OBTAINED HOT-DIP GALVANIZED STEEL SHEET

| LEVEL | HOT-DIP GALVANIZING LAYER | | | PLATING WETTABILITY | PLATING ADHESIVENESS | TOTAL POINT | NOTE |
|---|---|---|---|---|---|---|---|
| | THICKNESS [mm] | Fe CONTENT PERCENTAGE [MASS%] | Al CONTENT PERCENTAGE [MASS%] | | | | |
| A1 | 5.2 | 10.8 | 0.22 | ◎ | ◎ | 4 | EXAMPLE |
| A2 | 4.6 | 8.5 | 0.72 | ◎ | ○ | 3 | EXAMPLE |
| A3 | 13.0 | 5.6 | 0.16 | ◎ | ◎ | 4 | EXAMPLE |
| A4 | 28.8 | 9.7 | 0.78 | ○ | ◎ | 3 | EXAMPLE |
| A5 | 4.4 | 10.4 | 0.32 | ◎ | ◎ | 4 | EXAMPLE |
| A6 | 10.4 | 10.3 | 0.54 | ◎ | ◎ | 4 | EXAMPLE |
| A7 | 10.4 | 11.4 | 0.23 | ◎ | ◎ | 4 | EXAMPLE |
| A8 | 6.4 | 7.8 | 0.33 | ◎ | ◎ | 4 | EXAMPLE |
| A9 | 11.6 | 9.7 | 0.83 | ◎ | ◎ | 4 | EXAMPLE |
| A10 | 9.1 | 8.6 | 0.12 | ◎ | ◎ | 4 | EXAMPLE |
| A11 | 3.0 | 9.1 | 0.88 | ◎ | ◎ | 4 | EXAMPLE |
| A12 | 10.1 | 9.6 | 0.85 | ◎ | ◎ | 4 | EXAMPLE |
| A13 | 18.2 | 5.2 | 0.28 | ◎ | ◎ | 4 | EXAMPLE |
| A14 | 28.9 | 5.3 | 0.55 | ◎ | ◎ | 4 | EXAMPLE |
| A15 | 9.9 | 9.8 | 0.13 | ◎ | ◎ | 4 | EXAMPLE |
| A16 | 5.3 | 13.2 | 0.16 | ◎ | ◎ | 4 | EXAMPLE |
| A17 | 17.5 | 10.0 | 0.38 | ◎ | ◎ | 4 | EXAMPLE |
| A18 | 8.3 | 10.2 | 0.99 | ○ | ◎ | 3 | EXAMPLE |
| A19 | 24.0 | 9.3 | 0.91 | ◎ | ◎ | 4 | EXAMPLE |
| A20 | 4.9 | 8.7 | 0.93 | ◎ | ○ | 3 | EXAMPLE |
| A21 | 10.9 | 9.4 | 0.28 | ◎ | ◎ | 4 | EXAMPLE |
| A22 | 11.1 | 8.8 | 0.25 | ◎ | ◎ | 4 | EXAMPLE |
| A23 | 11.2 | 9.0 | 0.92 | ◎ | ◎ | 4 | EXAMPLE |
| A24 | 12.7 | 11.9 | 0.69 | ◎ | ◎ | 4 | EXAMPLE |
| A25 | 21.0 | 13.1 | 0.38 | ◎ | ◎ | 4 | EXAMPLE |
| A26 | 12.7 | 8.2 | 0.47 | ◎ | ◎ | 4 | EXAMPLE |
| A27 | 20.4 | 8.5 | 0.46 | ◎ | ◎ | 4 | EXAMPLE |
| A28 | 10.0 | 5.2 | 0.23 | ◎ | ◎ | 4 | EXAMPLE |
| A29 | 5.5 | 8.5 | 0.35 | ◎ | ◎ | 4 | EXAMPLE |
| A30 | 9.4 | 11.2 | 0.94 | ◎ | ◎ | 4 | EXAMPLE |
| A31 | 9.8 | 6.1 | 0.44 | ◎ | ◎ | 4 | EXAMPLE |
| A32 | 6.2 | 11.8 | 0.16 | ◎ | ◎ | 4 | EXAMPLE |
| A33 | 12.3 | 10.2 | 0.65 | ◎ | ◎ | 4 | EXAMPLE |
| A34 | 12.0 | 10.7 | 0.54 | ◎ | ◎ | 4 | EXAMPLE |
| A35 | 10.4 | 8.1 | 0.95 | ◎ | ◎ | 4 | EXAMPLE |
| A36 | 16.2 | 9.1 | 0.46 | ◎ | ◎ | 4 | EXAMPLE |

TABLE 2-4

Manufacturing conditions, analysis results, and evaluation results of plating wettability and plating adhesiveness (examples)

ANALYSIS RESULT AND EVALUATION RESULT OF OBTAINED HOT-DIP GALVANIZED STEEL SHEET

| LEVEL | SAMPLE MATERIAL No OF COLD-ROLLED STEEL SHEET | VICKERS HARDNESS | | | CONTENT PERCENTAGES OF C, Si, And Mn IN SURFACE LAYER OF BASE STEEL SHEET (DOWN TO 50 mm IN DEPTH) | | | CONTENT PERCENTAGES OF C, Si, AND Mn IN DEEP PORTION OF BASE STEEL SHEET (GRATHER THAN 50 mm IN DEPTH) | | | $W_{C(A)}/W_{C(B)}$ | $W_{Si(A)}/W_{Si(B)}$ | $W_{Mn(A)}/W_{Mn(B)}$ |
|---|---|---|---|---|---|---|---|---|---|---|---|---|---|
| | | $H_A$ | $H_B$ | $H_A/H_B$ | $W_{C(A)}$ | $W_{Si(A)}$ | $W_{Mn(A)}$ | $W_{C(B)}$ | $W_{Si(B)}$ | $W_{Mn(B)}$ | | | |
| A37 | 37 | 212 | 281 | 0.75 | 0.05 | 0.45 | 1.15 | 0.15 | 1.04 | 4.19 | 0.35 | 0.43 | 0.28 |
| A38 | 38 | 232 | 304 | 0.75 | 0.07 | 0.46 | 1.72 | 0.25 | 1.04 | 4.05 | 0.27 | 0.45 | 0.42 |

TABLE 2-4-continued

Manufacturing conditions, analysis results, and evaluation results of plating wettability and plating adhesiveness (examples)

| | | | | | | | | | | | | |
|---|---|---|---|---|---|---|---|---|---|---|---|---|
| A39 | 39 | 247 | 318 | 0.78 | 0.15 | 0.43 | 1.15 | 0.36 | 1.02 | 4.03 | 0.41 | 0.42 | 0.28 |
| A40 | 40 | 270 | 342 | 0.79 | 0.19 | 0.33 | 1.16 | 0.45 | 1.02 | 4.15 | 0.41 | 0.32 | 0.28 |
| A41 | 41 | 260 | 291 | 0.89 | 0.02 | 0.82 | 1.71 | 0.05 | 2.00 | 4.17 | 0.34 | 0.41 | 0.41 |
| A42 | 42 | 244 | 312 | 0.78 | 0.07 | 0.84 | 1.15 | 0.15 | 2.04 | 4.15 | 0.46 | 0.41 | 0.28 |
| A43 | 43 | 249 | 329 | 0.76 | 0.07 | 0.54 | 1.50 | 0.26 | 2.07 | 4.01 | 0.26 | 0.28 | 0.37 |
| A44 | 44 | 292 | 353 | 0.83 | 0.09 | 0.69 | 1.10 | 0.35 | 2.10 | 4.10 | 0.27 | 0.33 | 0.27 |
| A45 | 45 | 301 | 375 | 0.80 | 0.20 | 0.60 | 1.21 | 0.47 | 2.07 | 4.12 | 0.42 | 0.29 | 0.29 |
| A46 | 46 | 238 | 320 | 0.75 | 0.02 | 1.41 | 1.59 | 0.05 | 3.07 | 4.10 | 0.37 | 0.46 | 0.39 |
| A47 | 47 | 270 | 340 | 0.79 | 0.06 | 1.35 | 1.46 | 0.16 | 3.05 | 4.20 | 0.39 | 0.44 | 0.35 |
| A48 | 48 | 292 | 359 | 0.81 | 0.11 | 1.00 | 1.42 | 0.27 | 3.06 | 4.17 | 0.41 | 0.33 | 0.34 |
| A49 | 49 | 294 | 379 | 0.78 | 0.10 | 0.81 | 1.52 | 0.34 | 3.12 | 4.13 | 0.28 | 0.26 | 0.37 |
| A50 | 50 | 317 | 401 | 0.79 | 0.15 | 0.94 | 1.60 | 0.47 | 3.06 | 4.14 | 0.33 | 0.31 | 0.39 |
| A51 | 51 | 182 | 222 | 0.82 | 0.05 | 0.28 | 0.60 | 0.18 | 1.01 | 2.06 | 0.29 | 0.28 | 0.29 |
| A52 | 52 | 167 | 216 | 0.77 | 0.05 | 0.37 | 0.58 | 0.13 | 1.02 | 2.05 | 0.38 | 0.36 | 0.29 |
| A53 | 53 | 196 | 221 | 0.89 | 0.05 | 0.29 | 0.55 | 0.17 | 1.04 | 2.01 | 0.28 | 0.28 | 0.27 |
| A54 | 54 | 176 | 224 | 0.79 | 0.06 | 0.31 | 0.60 | 0.16 | 1.02 | 2.10 | 0.40 | 0.30 | 0.29 |
| A55 | 55 | 161 | 216 | 0.74 | 0.04 | 0.49 | 0.98 | 0.16 | 1.01 | 2.08 | 0.26 | 0.48 | 0.49 |
| A56 | 56 | 172 | 216 | 0.79 | 0.05 | 0.32 | 0.57 | 0.13 | 1.02 | 2.06 | 0.36 | 0.31 | 0.27 |
| A57 | 57 | 184 | 224 | 0.82 | 0.03 | 0.37 | 0.60 | 0.14 | 1.04 | 2.00 | 0.22 | 0.36 | 0.30 |
| A58 | 58 | 173 | 222 | 0.78 | 0.05 | 0.47 | 0.97 | 0.14 | 1.03 | 2.07 | 0.39 | 0.46 | 0.47 |
| A59 | 59 | 150 | 219 | 0.68 | 0.05 | 0.34 | 0.69 | 0.14 | 1.03 | 2.10 | 0.40 | 0.33 | 0.33 |
| A60 | 60 | 188 | 220 | 0.85 | 0.05 | 0.27 | 0.95 | 0.15 | 1.02 | 2.08 | 0.34 | 0.26 | 0.46 |
| A61 | 61 | 157 | 218 | 0.72 | 0.05 | 0.29 | 0.87 | 0.14 | 1.00 | 2.07 | 0.38 | 0.29 | 0.42 |
| A62 | 62 | 79 | 135 | 0.58 | 0.02 | 0.09 | 0.24 | 0.05 | 0.30 | 0.50 | 0.32 | 0.28 | 0.48 |
| A63 | 63 | 118 | 133 | 0.89 | 0.02 | 0.14 | 0.22 | 0.05 | 0.31 | 0.51 | 0.33 | 0.46 | 0.43 |
| A64 | 64 | 88 | 135 | 0.63 | 0.03 | 0.14 | 0.15 | 0.07 | 0.31 | 0.52 | 0.37 | 0.44 | 0.28 |
| A65 | 65 | 118 | 135 | 0.86 | 0.02 | 0.09 | 0.23 | 0.06 | 0.31 | 0.50 | 0.31 | 0.29 | 0.46 |
| A66 | 66 | 93 | 136 | 0.68 | 0.02 | 0.11 | 0.19 | 0.04 | 0.31 | 0.52 | 0.44 | 0.37 | 0.37 |
| A67 | 67 | 117 | 131 | 0.90 | 0.01 | 0.12 | 0.14 | 0.06 | 0.30 | 0.51 | 0.17 | 0.39 | 0.26 |
| A68 | 68 | 120 | 138 | 0.87 | 0.01 | 0.11 | 0.22 | 0.04 | 0.31 | 0.51 | 0.28 | 0.37 | 0.42 |
| A69 | 69 | 83 | 134 | 0.62 | 0.02 | 0.10 | 0.17 | 0.06 | 0.31 | 0.52 | 0.31 | 0.32 | 0.32 |
| A70 | 70 | 103 | 132 | 0.79 | 0.02 | 0.13 | 0.14 | 0.07 | 0.31 | 0.51 | 0.25 | 0.43 | 0.28 |
| A71 | 71 | 103 | 134 | 0.76 | 0.02 | 0.12 | 0.13 | 0.06 | 0.30 | 0.52 | 0.37 | 0.38 | 0.26 |
| A72 | 72 | 104 | 130 | 0.79 | 0.01 | 0.09 | 0.13 | 0.07 | 0.31 | 0.51 | 0.14 | 0.29 | 0.25 |

ANALYSIS RESULT AND EVALUATION RESULT OF OBTAINED HOT-DIP GALVANIZED STEEL SHEET

| | HOT-DIP GALVANIZING LAYER | | | | | | |
|---|---|---|---|---|---|---|---|
| LEVEL | THICKNESS [mm] | Fe CONTENT PERCENTAGE [MASS%] | Al CONTENT PERCENTAGE [MASS%] | PLATING WETTABILITY | PLATING ADHESIVENESS | TOTAL POINT | NOTE |
| A37 | 11.9 | 9.4 | 0.43 | ◎ | ◎ | 4 | EXAMPLE |
| A38 | 4.6 | 12.4 | 0.85 | ◎ | ◎ | 4 | EXAMPLE |
| A39 | 11.6 | 10.7 | 0.48 | ◎ | ◎ | 4 | EXAMPLE |
| A40 | 3.7 | 12.1 | 0.33 | ◎ | ◎ | 4 | EXAMPLE |
| A41 | 3.9 | 8.1 | 0.62 | ◎ | ◎ | 4 | EXAMPLE |
| A42 | 4.2 | 8.0 | 0.81 | ◎ | ◎ | 4 | EXAMPLE |
| A43 | 25.5 | 9.8 | 0.37 | ◎ | ◎ | 4 | EXAMPLE |
| A44 | 4.6 | 10.2 | 0.80 | ◎ | ◎ | 4 | EXAMPLE |
| A45 | 7.7 | 10.1 | 0.92 | ◎ | ◎ | 4 | EXAMPLE |
| A46 | 6.6 | 9.8 | 0.54 | ◎ | ◎ | 4 | EXAMPLE |
| A47 | 22.9 | 11.5 | 0.56 | ◎ | ◎ | 4 | EXAMPLE |
| A48 | 9.8 | 11.5 | 0.23 | ◎ | ◎ | 4 | EXAMPLE |
| A49 | 8.1 | 8.6 | 0.49 | ◎ | ◎ | 4 | EXAMPLE |
| A50 | 9.6 | 9.6 | 0.73 | ◎ | ◎ | 4 | EXAMPLE |
| A51 | 15.2 | 10.9 | 0.83 | ○ | ◎ | 3 | EXAMPLE |
| A52 | 8.4 | 10.4 | 0.80 | ◎ | ◎ | 4 | EXAMPLE |
| A53 | 9.7 | 12.0 | 0.88 | ◎ | ◎ | 4 | EXAMPLE |
| A54 | 20.6 | 11.5 | 0.22 | ◎ | ○ | 3 | EXAMPLE |
| A55 | 5.4 | 10.5 | 0.74 | ◎ | ◎ | 4 | EXAMPLE |
| A56 | 7.8 | 10.5 | 0.71 | ◎ | ◎ | 4 | EXAMPLE |
| A57 | 12.1 | 8.8 | 0.90 | ◎ | ◎ | 4 | EXAMPLE |
| A58 | 3.4 | 12.3 | 0.88 | ◎ | ◎ | 4 | EXAMPLE |
| A59 | 10.2 | 10.1 | 0.55 | ◎ | ◎ | 4 | EXAMPLE |
| A60 | 5.7 | 8.1 | 0.29 | ◎ | ◎ | 4 | EXAMPLE |
| A61 | 10.6 | 5.3 | 0.64 | ◎ | ◎ | 4 | EXAMPLE |
| A62 | 6.3 | 11.8 | 0.92 | ◎ | ○ | 3 | EXAMPLE |
| A63 | 19.5 | 10.3 | 0.25 | ◎ | ◎ | 4 | EXAMPLE |
| A64 | 25.6 | 11.8 | 0.68 | ◎ | ◎ | 4 | EXAMPLE |
| A65 | 8.5 | 9.1 | 0.13 | ◎ | ◎ | 4 | EXAMPLE |
| A66 | 19.2 | 9.3 | 0.75 | ◎ | ◎ | 4 | EXAMPLE |
| A67 | 19.2 | 8.6 | 0.64 | ◎ | ◎ | 4 | EXAMPLE |
| A68 | 12.0 | 9.1 | 0.33 | ◎ | ◎ | 4 | EXAMPLE |

TABLE 2-4-continued

Manufacturing conditions, analysis results, and evaluation results of plating wettability and plating adhesiveness (examples)

| | | | | | | | |
|---|---|---|---|---|---|---|---|
| A69 | 22.9 | 10.7 | 0.72 | ◎ | ◎ | 4 | EXAMPLE |
| A70 | 28.4 | 8.2 | 0.64 | ◎ | ◎ | 4 | EXAMPLE |
| A71 | 27.6 | 8.1 | 0.79 | ◎ | ◎ | 4 | EXAMPLE |
| A72 | 12.6 | 6.3 | 0.19 | ◎ | ◎ | 4 | EXAMPLE |

TABLE 3-1

Manufacturing conditions, analysis results, and evaluation results of plating wettability and plating adhesiveness (examples)

| | | CONDITION OF RECRYSTALLIZATION ANNEALING | | | | | | | |
|---|---|---|---|---|---|---|---|---|---|
| | | HEATING FURNACE CONDITION | | | | | | | |
| LEVEL | SAMPLE MATERIAL No. OF COLD-ROLLED STEEL SHEET | SHEET TEMPERATURE TO [° C.] WHEN REACHING MAXIMUM | TEMPERATURE $T_1$ [° C.] $T_1 = 500 - 50 \times W_{Si(B)} - 20 \times W_{Mn(B)}$ | TEMPERATURE $T_2$ [° C.] $T_2 = A_{C3} + 40$ | HEATING TIME PERIOD $S_0$ [SECOND] | TIME PERIOD $S_1$ [SECOND] $S_1 = 20 \times W_{Si(B)} + 10 \times W_{Mn(B)}$ | TIME PERIOD $S_2$ [SECOND] $S_2 = 200 + 1000 \times W_{C(B)}$ | CARBON DIOXIDE PARTIAL PRESSURE $\log(PCO_2)$ | CARBON MONOXIDE PARTIAL PRESSURE $\log(PCO)$ | ATMOSPHERE GAS $\log(PCO_2/PCO)$ |
| B1 | 1 | 815 | 475 | 961 | 83 | 61 | 271 | −2.16 | −1.60 | −0.6 |
| B2 | 3 | 804 | 475 | 882 | 367 | 61 | 440 | −3.49 | −1.94 | −1.6 |
| B3 | 5 | 835 | 475 | 856 | 304 | 61 | 633 | −3.13 | −1.71 | −1.4 |
| B4 | 7 | 847 | 440 | 970 | 223 | 75 | 359 | −1.97 | −1.62 | −0.3 |
| B5 | 9 | 718 | 440 | 882 | 357 | 75 | 559 | −1.29 | −1.55 | 0.3 |
| B6 | 11 | 732 | 390 | 1061 | 176 | 95 | 251 | −1.13 | −1.76 | 0.6 |
| B7 | 13 | 794 | 390 | 970 | 237 | 95 | 473 | −2.66 | −1.88 | −0.8 |
| B8 | 15 | 834 | 390 | 882 | 467 | 95 | 668 | −1.38 | −1.62 | 0.3 |
| B9 | 17 | 787 | 340 | 1063 | 152 | 115 | 373 | −2.72 | −1.62 | −1.1 |
| B10 | 19 | 736 | 340 | 1002 | 349 | 115 | 551 | −1.46 | −1.92 | 0.5 |
| B11 | 21 | 700 | 410 | 969 | 137 | 90 | 273 | −0.95 | −1.66 | 0.7 |
| B12 | 23 | 764 | 410 | 895 | 271 | 90 | 434 | −3.73 | −1.88 | −1.9 |
| B13 | 25 | 750 | 410 | 810 | 596 | 90 | 643 | −2.09 | −1.59 | −0.5 |
| B14 | 27 | 783 | 360 | 992 | 322 | 110 | 354 | −1.95 | −1.66 | −0.3 |
| B15 | 29 | 836 | 360 | 908 | 400 | 110 | 547 | −1.28 | −1.71 | 0.4 |
| B16 | 31 | 804 | 310 | 1091 | 148 | 130 | 241 | −2.50 | −1.89 | −0.6 |
| B17 | 33 | 781 | 310 | 1006 | 263 | 130 | 432 | −1.95 | −1.73 | −0.2 |
| B18 | 35 | 801 | 310 | 918 | 417 | 130 | 659 | −1.38 | −1.67 | 0.3 |
| B19 | 37 | 782 | 370 | 891 | 343 | 110 | 367 | −2.13 | −1.68 | −0.5 |
| B20 | 39 | 751 | 370 | 804 | 339 | 110 | 547 | −2.02 | −1.83 | −0.2 |
| B21 | 41 | 720 | 320 | 987 | 164 | 130 | 273 | −1.61 | −1.72 | 0.1 |
| B22 | 43 | 839 | 320 | 898 | 175 | 130 | 460 | −3.08 | −1.75 | −1.3 |
| B23 | 45 | 812 | 320 | 818 | 240 | 130 | 657 | −3.56 | −1.75 | −1.8 |
| B24 | 47 | 820 | 270 | 1008 | 243 | 150 | 358 | −1.58 | −1.56 | 0.0 |
| B25 | 49 | 703 | 270 | 920 | 546 | 150 | 565 | −3.91 | −2.00 | −1.9 |
| B26 | 51 | 737 | 410 | 936 | 357 | 90 | 358 | −1.83 | −1.78 | −0.1 |
| B27 | 53 | 802 | 410 | 936 | 317 | 90 | 363 | −3.08 | −1.54 | −1.5 |
| B28 | 55 | 738 | 410 | 940 | 176 | 90 | 339 | −2.90 | −1.55 | −1.3 |
| B29 | 57 | 728 | 410 | 953 | 225 | 90 | 343 | −3.38 | −1.74 | −1.6 |
| B30 | 59 | 703 | 410 | 942 | 262 | 90 | 346 | −1.92 | −1.55 | −0.4 |
| B31 | 61 | 742 | 410 | 944 | 299 | 90 | 335 | −2.77 | −1.89 | −0.9 |
| B32 | 63 | 774 | 475 | 973 | 135 | 61 | 241 | −2.64 | −1.93 | −0.7 |
| B33 | 65 | 782 | 475 | 975 | 70 | 61 | 233 | −3.75 | −1.80 | −1.9 |
| B34 | 67 | 705 | 475 | 975 | 71 | 61 | 238 | −0.77 | −1.58 | 0.8 |
| B35 | 69 | 707 | 475 | 961 | 82 | 61 | 269 | −1.95 | −1.84 | −0.1 |
| B36 | 71 | 710 | 475 | 961 | 226 | 61 | 270 | −3.52 | −1.99 | −1.5 |

| | CONDITION OF RECRYSTALLIZATION ANNEALING | | | | GALVANIZING TREATMENT CO | |
|---|---|---|---|---|---|---|
| | SOAKING FURNACE CONDITION | | | | | |
| LEVEL | CARBON DIOXIDE PARTIAL PRESSURE $\log(PCO_2)$ | CARBON MONOXIDE PARTIAL PRESSURE $\log(PCO)$ | ATMOSPHERE GAS $\log(PCO_2/PCO)$ | SOAKING AND HOLDING TIME PERIOD [SECOND] | Al CONTENT PERCENTAGE IN ZINC PLATING BATH [MASS%] | HEATING TEMPERATURE IN ALLOYING TREATMENT [° C.] |
| B1 | −5.91 | −1.97 | −3.9 | 118 | 0.27 | 601 |
| B2 | −4.52 | −1.52 | −3.0 | 485 | 0.27 | 582 |
| B3 | −5.78 | −1.79 | −4.0 | 304 | 0.27 | 424 |
| B4 | −6.51 | −1.77 | −4.7 | 308 | 0.24 | 434 |

TABLE 3-1-continued

Manufacturing conditions, analysis results, and evaluation results of plating wettability and plating adhesiveness (examples)

| | | | | | | |
|---|---|---|---|---|---|---|
| B5  | −4.43 | −1.79 | −2.6 | 276 | 0.29 | 537 |
| B6  | −6.59 | −1.96 | −4.6 | 457 | 0.27 | 481 |
| B7  | −5.78 | −1.72 | −4.1 | 345 | 0.02 | 589 |
| B8  | −6.40 | −1.82 | −4.6 | 243 | 0.03 | 575 |
| B9  | −6.01 | −1.63 | −4.4 | 297 | 0.04 | 427 |
| B10 | −3.81 | −1.50 | −2.3 | 367 | 0.02 | 424 |
| B11 | −3.90 | −1.76 | −2.1 | 235 | 0.02 | 503 |
| B12 | −5.76 | −1.65 | −4.1 | 233 | 0.03 | 552 |
| B13 | −5.09 | −1.72 | −3.4 | 396 | 0.19 | 590 |
| B14 | −5.10 | −1.91 | −3.2 | 444 | 0.16 | 563 |
| B15 | −5.19 | −1.73 | −3.5 | 192 | 0.16 | 433 |
| B16 | −5.01 | −1.61 | −3.4 | 456 | 0.15 | 427 |
| B17 | −6.45 | −1.98 | −4.5 | 484 | 0.11 | 493 |
| B18 | −6.82 | −1.98 | −4.8 | 268 | 0.18 | 512 |
| B19 | −5.55 | −1.67 | −3.9 | 284 | 0.11 | 529 |
| B20 | −5.42 | −1.58 | −3.8 | 453 | 0.02 | 582 |
| B21 | −6.00 | −1.95 | −4.0 | 251 | 0.23 | 496 |
| B22 | −6.56 | −1.83 | −4.7 | 226 | 0.08 | 592 |
| B23 | −6.26 | −1.77 | −4.5 | 356 | 0.04 | 546 |
| B24 | −4.28 | −1.51 | −2.8 | 108 | 0.12 | 548 |
| B25 | −5.98 | −1.71 | −4.3 | 326 | 0.11 | 532 |
| B26 | −6.32 | −1.59 | −4.7 | 193 | 0.03 | 494 |
| B27 | −4.46 | −1.95 | −2.5 | 230 | 0.17 | 509 |
| B28 | −4.82 | −1.75 | −3.1 | 268 | 0.09 | 525 |
| B29 | −6.37 | −1.61 | −4.5 | 365 | 0.08 | 541 |
| B30 | −5.97 | −1.55 | −4.4 | 244 | 0.08 | 436 |
| B31 | −5.39 | −1.68 | −3.7 | 396 | 0.14 | 448 |
| B32 | −5.30 | −1.59 | −3.7 | 181 | 0.04 | 512 |
| B33 | −5.11 | −1.78 | −3.3 | 327 | 0.12 | 528 |
| B34 | −5.15 | −1.99 | −3.2 | 311 | 0.17 | 497 |
| B35 | −3.95 | −1.81 | −2.1 | 410 | 0.22 | 503 |
| B36 | −5.98 | −1.78 | −4.2 | 222 | 0.08 | 504 |

TABLE 3-2

Manufacturing conditions, analysis results, and evaluation results of plating wettability and plating adhesiveness (examples)

| | | ANALYSIS RESULT AND EVALUATION RESULT OF OBTAINED HOT-DIP GALVANIZED STEEL SHEET | | | | | | | | | | | |
|---|---|---|---|---|---|---|---|---|---|---|---|---|---|
| LEVEL | SAMPLE MATERIAL No OF COLD-ROLLED STEEL SHEET | VICKERS HARDNESS | | | CONTENT PERCENTAGES OF C, Si, And Mn IN SURFACE LAYER OF BASE STEEL SHEET (DOWN TO 50 mm IN DEPTH) | | | | CONTENT PERCENTAGES OF C, Si, AND Mn IN DEEP PORTION OF BASE STEEL SHEET (GRATHER THAN 50 mm IN DEPTH) | | | $W_{C(A)}/W_{C(B)}$ | $W_{Si(A)}/W_{Si(B)}$ | $W_{Mn(A)}/W_{Mn(B)}$ |
| | | $H_A$ | $H_B$ | $H_A/H_B$ | $W_{C(A)}$ | $W_{Si(A)}$ | $W_{Mn(A)}$ | $W_{C(B)}$ | $W_{Si(B)}$ | $W_{Mn(B)}$ | | | |
| B1  | 1  | 101 | 138 | 0.73 | 0.03 | 0.18 | 0.41 | 0.04 | 0.31 | 0.52 | 0.72 | 0.58 | 0.79 |
| B2  | 3  | 132 | 172 | 0.77 | 0.21 | 0.17 | 0.45 | 0.28 | 0.31 | 0.52 | 0.76 | 0.55 | 0.87 |
| B3  | 5  | 147 | 211 | 0.70 | 0.42 | 0.24 | 0.48 | 0.45 | 0.31 | 0.52 | 0.93 | 0.79 | 0.94 |
| B4  | 7  | 157 | 177 | 0.89 | 0.16 | 0.67 | 0.35 | 0.18 | 1.02 | 0.51 | 0.86 | 0.86 | 0.59 |
| B5  | 9  | 157 | 217 | 0.72 | 0.22 | 0.72 | 0.43 | 0.35 | 1.03 | 0.52 | 0.63 | 0.70 | 0.83 |
| B6  | 11 | 150 | 185 | 0.61 | 0.03 | 1.81 | 0.33 | 0.04 | 2.05 | 0.50 | 0.81 | 0.88 | 0.66 |
| B7  | 13 | 157 | 230 | 0.68 | 0.16 | 1.64 | 0.40 | 0.28 | 2.01 | 0.52 | 0.58 | 0.82 | 0.77 |
| B8  | 15 | 194 | 269 | 0.72 | 0.35 | 1.56 | 0.33 | 0.45 | 2.08 | 0.51 | 0.77 | 0.75 | 0.64 |
| B9  | 17 | 189 | 240 | 0.79 | 0.09 | 1.71 | 0.35 | 0.17 | 3.07 | 0.51 | 0.56 | 0.55 | 0.68 |
| B10 | 19 | 222 | 275 | 0.81 | 0.27 | 2.50 | 0.02 | 0.36 | 3.08 | 0.52 | 0.78 | 0.81 | 0.04 |
| B11 | 21 | 151 | 205 | 0.74 | 0.03 | 0.57 | 1.14 | 0.06 | 1.03 | 2.04 | 0.52 | 0.55 | 0.56 |
| B12 | 23 | 197 | 237 | 0.83 | 0.20 | 0.35 | 1.24 | 0.27 | 1.01 | 2.06 | 0.76 | 0.35 | 0.60 |
| B13 | 25 | 240 | 279 | 0.86 | 0.34 | 0.54 | 1.42 | 0.45 | 1.04 | 2.08 | 0.76 | 0.52 | 0.68 |
| B14 | 27 | 219 | 251 | 0.87 | 0.03 | 1.93 | 1.13 | 0.13 | 2.09 | 2.03 | 0.23 | 0.92 | 0.55 |
| B15 | 29 | 260 | 289 | 0.90 | 0.25 | 1.64 | 1.65 | 0.35 | 2.03 | 2.01 | 0.72 | 0.81 | 0.83 |
| B16 | 31 | 185 | 258 | 0.72 | 0.04 | 1.90 | 1.22 | 0.04 | 3.06 | 2.02 | 0.82 | 0.52 | 0.60 |
| B17 | 33 | 240 | 296 | 0.81 | 0.25 | 1.86 | 1.96 | 0.26 | 3.02 | 2.04 | 0.96 | 0.52 | 0.96 |
| B18 | 35 | 303 | 342 | 0.89 | 0.22 | 0.65 | 1.30 | 0.44 | 3.14 | 2.03 | 0.51 | 0.21 | 0.64 |
| B19 | 37 | 207 | 283 | 0.73 | 0.15 | 0.42 | 2.95 | 0.16 | 1.01 | 4.16 | 0.94 | 0.42 | 0.71 |
| B20 | 39 | 286 | 319 | 0.90 | 0.34 | 0.75 | 2.39 | 0.37 | 1.01 | 4.17 | 0.92 | 0.75 | 0.57 |
| B21 | 41 | 230 | 295 | 0.78 | 0.05 | 1.84 | 0.10 | 0.06 | 2.01 | 4.12 | 0.79 | 0.92 | 0.02 |
| B22 | 43 | 267 | 332 | 0.80 | 0.13 | 1.91 | 2.79 | 0.27 | 2.07 | 4.04 | 0.49 | 0.92 | 0.69 |
| B23 | 45 | 304 | 371 | 0.82 | 0.34 | 1.37 | 3.85 | 0.46 | 2.03 | 4.19 | 0.74 | 0.68 | 0.92 |
| B24 | 47 | 307 | 342 | 0.90 | 0.10 | 1.65 | 3.71 | 0.15 | 3.14 | 4.06 | 0.69 | 0.53 | 0.91 |
| B25 | 49 | 335 | 383 | 0.87 | 0.12 | 2.31 | 1.73 | 0.36 | 3.13 | 4.05 | 0.33 | 0.74 | 0.43 |
| B26 | 51 | 177 | 222 | 0.80 | 0.04 | 0.60 | 0.91 | 0.17 | 1.04 | 2.08 | 0.27 | 0.57 | 0.44 |

TABLE 3-2-continued

Manufacturing conditions, analysis results, and evaluation results of plating wettability and plating adhesiveness (examples)

| | | | | | | | | | | | | | |
|---|---|---|---|---|---|---|---|---|---|---|---|---|---|
| B27 | 53 | 171 | 223 | 0.77 | 0.12 | 0.49 | 1.24 | 0.17 | 1.01 | 2.07 | 0.89 | 0.48 | 0.60 |
| B28 | 55 | 191 | 218 | 0.67 | 0.02 | 0.34 | 1.60 | 0.14 | 1.04 | 2.09 | 0.13 | 0.33 | 0.76 |
| B29 | 57 | 161 | 219 | 0.73 | 0.11 | 0.10 | 0.25 | 0.14 | 1.02 | 2.07 | 0.76 | 0.10 | 0.12 |
| B30 | 59 | 171 | 219 | 0.78 | 0.08 | 0.70 | 0.31 | 0.13 | 1.01 | 2.03 | 0.58 | 0.70 | 0.15 |
| B31 | 61 | 163 | 217 | 0.75 | 0.16 | 0.50 | 1.24 | 0.17 | 1.03 | 2.08 | 0.95 | 0.49 | 0.60 |
| B32 | 63 | 95 | 132 | 0.72 | 0.02 | 0.30 | 0.37 | 0.04 | 0.30 | 0.50 | 0.45 | 0.98 | 0.73 |
| B33 | 65 | 88 | 131 | 0.67 | 0.01 | 0.04 | 0.50 | 0.07 | 0.31 | 0.50 | 0.20 | 0.12 | 0.99 |
| B34 | 67 | 87 | 132 | 0.56 | 0.02 | 0.30 | 0.28 | 0.04 | 0.30 | 0.52 | 0.48 | 0.98 | 0.53 |
| B35 | 69 | 88 | 138 | 0.54 | 0.03 | 0.30 | 0.26 | 0.03 | 0.31 | 0.52 | 0.99 | 0.97 | 0.49 |
| B36 | 71 | 74 | 138 | 0.54 | 0.02 | 0.31 | 0.24 | 0.04 | 0.31 | 0.51 | 0.43 | 0.99 | 0.46 |

ANALYSIS RESULT AND EVALUATION RESULT OF OBTAINED HOT-DIP GALVANIZED STEEL SHEET

| | HOT-DIP GALVANIZING LAYER | | | | | | |
|---|---|---|---|---|---|---|---|
| LEVEL | THICKNESS [mm] | Fe CONTENT PERCENTAGE [MASS%] | Al CONTENT PERCENTAGE [MASS%] | PLATING WETTABILITY | PLATING ADHESIVENESS | TOTAL POINT | NOTE |
| B1 | 0.3 | 16.9 | 1.70 | ◎ | ◎ | 4 | EXAMPLE |
| B2 | 35.0 | 17.3 | 1.87 | ○ | ○ | 2 | EXAMPLE |
| B3 | 3.1 | 2.0 | 0.03 | ◎ | ○ | 3 | EXAMPLE |
| B4 | 19.8 | 2.5 | 0.03 | ◎ | ○ | 3 | EXAMPLE |
| B5 | 36.5 | 1.2 | 0.89 | ○ | ○ | 2 | EXAMPLE |
| B6 | 14.1 | 2.5 | 0.20 | ◎ | ◎ | 4 | EXAMPLE |
| B7 | 25.2 | 16.2 | 1.89 | ○ | ○ | 2 | EXAMPLE |
| B8 | 15.3 | 14.5 | 1.29 | ◎ | ○ | 3 | EXAMPLE |
| B9 | 30.5 | 2.0 | 0.03 | ○ | ○ | 2 | EXAMPLE |
| B10 | 17.5 | 1.2 | 0.21 | ○ | ○ | 2 | EXAMPLE |
| B11 | 13.8 | 5.2 | 1.23 | ◎ | ○ | 3 | EXAMPLE |
| B12 | 37.3 | 15.7 | 0.87 | ○ | ◎ | 3 | EXAMPLE |
| B13 | 5.8 | 16.4 | 1.18 | ○ | ○ | 2 | EXAMPLE |
| B14 | 15.5 | 15.7 | 1.26 | ○ | ○ | 2 | EXAMPLE |
| B15 | 40.8 | 8.1 | 0.04 | ○ | ○ | 2 | EXAMPLE |
| B16 | 32.8 | 2.4 | 0.56 | ◎ | ◎ | 4 | EXAMPLE |
| B17 | 21.5 | 7.1 | 0.70 | ◎ | ◎ | 4 | EXAMPLE |
| B18 | 33.8 | 0.03 | 0.38 | ◎ | ○ | 3 | EXAMPLE |
| B19 | 0.2 | 6.1 | 1.46 | ○ | ◎ | 3 | EXAMPLE |
| B20 | 35.4 | 15.8 | 1.76 | ◎ | ○ | 3 | EXAMPLE |
| B21 | 14.9 | 7.4 | 0.48 | ○ | ◎ | 3 | EXAMPLE |
| B22 | 34.2 | 15.1 | 1.68 | ◎ | ○ | 3 | EXAMPLE |
| B23 | 14.1 | 15.8 | 1.33 | ○ | ○ | 2 | EXAMPLE |
| B24 | 0.8 | 10.2 | 0.81 | ○ | ◎ | 3 | EXAMPLE |
| B25 | 15.5 | 7.0 | 0.82 | ○ | ○ | 2 | EXAMPLE |
| B26 | 12.7 | 9.4 | 2.06 | ○ | ○ | 2 | EXAMPLE |
| B27 | 0.5 | 9.3 | 0.46 | ○ | ◎ | 3 | EXAMPLE |
| B28 | 5.3 | 9.9 | 0.43 | ○ | ○ | 2 | EXAMPLE |
| B29 | 34.2 | 10.4 | 0.16 | ○ | ○ | 2 | EXAMPLE |
| B30 | 9.1 | 3.0 | 0.04 | ◎ | ◎ | 4 | EXAMPLE |
| B31 | 32.0 | 1.2 | 0.83 | ○ | ◎ | 3 | EXAMPLE |
| B32 | 0.7 | 2.2 | 0.46 | ○ | ○ | 2 | EXAMPLE |
| B33 | 27.4 | 6.1 | 0.38 | ○ | ○ | 2 | EXAMPLE |
| B34 | 33.6 | 7.5 | 0.32 | ○ | ◎ | 3 | EXAMPLE |
| B35 | 22.7 | 1.0 | 0.79 | ◎ | ○ | 3 | EXAMPLE |
| B36 | 0.7 | 4.8 | 0.33 | ○ | ◎ | 3 | EXAMPLE |

TABLE 4-1

Manufacturing conditions, analysis results, and evaluation results of plating wettability and plating adhesiveness (examples)

| | | CONDITION OF RECRYSTALLIZATION ANNEALING | | | | | | | | |
|---|---|---|---|---|---|---|---|---|---|---|
| | | HEATING FURNACE CONDITION | | | | | | | | |
| LEVEL | SAMPLE MATERIAL No. OF COLD-ROLLED STEEL SHEET | SHEET TEMPERATURE TO [° C.] WHEN REACHING MAXIMUM | TEMPERATURE $T_1$ [° C.] $T_1 = 500 - 50 \times W_{Si(B)} - 20 \times W_{Mn(B)}$ | TEMPERATURE $T_2$ [° C.] $T_2 = A_{C3} + 40$ | HEATING TIME PERIOD $S_0$ [SECOND] | TIME PERIOD $S_1$ [SECOND] $S_1 = 20 \times W_{Si(B)} + 10 \times W_{Mn(B)}$ | TIME PERIOD $S_2$ [SECOND] $S_2 = 200 + 1000 \times W_{C(B)}$ | CARBON DIOXIDE PARTIAL PRESSURE $\log(PCO_2)$ | CARBON MONOXIDE PARTIAL PRESSURE $\log(PCO)$ | ATMOSPHERE GAS $\log(PCO_2/PCO)$ |
| C1 | 1 | 985 | 475 | 966 | 139 | 61 | 259 | −3.75 | −1.90 | −1.9 |
| C2 | 2 | 1005 | 475 | 923 | 98 | 61 | 348 | −2.52 | −1.68 | −0.8 |
| C3 | 3 | 952 | 475 | 876 | 104 | 61 | 453 | −1.41 | −1.72 | 0.3 |
| C4 | 4 | 1120 | 475 | 845 | 135 | 61 | 555 | −3.41 | −1.88 | −1.5 |
| C5 | 5 | 421 | 475 | 804 | 119 | 61 | 643 | −1.92 | −1.73 | −0.2 |
| C6 | 6 | 396 | 440 | 999 | 146 | 75 | 271 | −3.10 | −1.55 | −1.6 |
| C7 | 7 | 302 | 440 | 977 | 137 | 75 | 342 | −2.49 | −1.70 | −0.8 |
| C8 | 8 | 285 | 440 | 918 | 160 | 75 | 454 | −3.39 | −1.98 | −1.4 |
| C9 | 9 | 733 | 440 | 893 | 358 | 75 | 532 | 0.39 | −1.81 | 2.2 |
| C10 | 10 | 799 | 440 | 846 | 384 | 75 | 541 | 0.66 | −1.84 | 2.5 |
| C11 | 11 | 836 | 390 | 1061 | 284 | 95 | 252 | −1.47 | −1.63 | 0.2 |
| C12 | 12 | 810 | 390 | 1031 | 442 | 95 | 343 | −1.64 | 101 | 0.7 |
| C13 | 13 | 711 | 390 | 979 | 87 | 95 | 453 | −3.84 | 132 | 0.8 |
| C14 | 14 | 838 | 390 | 941 | 70 | 95 | 556 | −1.91 | 147 | 0.7 |
| C15 | 15 | 819 | 390 | 898 | 86 | 95 | 630 | −1.53 | 157 | 0.9 |
| C16 | 16 | 763 | 340 | 1129 | 75 | 115 | 260 | −2.02 | 157 | 0.7 |
| C17 | 17 | 1085 | 340 | 1073 | 420 | 115 | 351 | −2.82 | 150 | 0.8 |
| C18 | 18 | 1121 | 340 | 1021 | 495 | 115 | 467 | −0.65 | 157 | 0.7 |
| C19 | 19 | 1254 | 340 | 1004 | 52 | 115 | 547 | −2.26 | 194 | 0.7 |
| C20 | 20 | 1123 | 340 | 951 | 87 | 115 | 651 | −1.16 | 189 | 0.8 |
| C21 | 21 | 369 | 410 | 975 | 421 | 90 | 259 | −2.95 | 222 | 0.8 |
| C22 | 22 | 258 | 410 | 933 | 394 | 90 | 352 | −2.65 | 151 | 0.7 |
| C23 | 23 | 401 | 410 | 880 | 62 | 90 | 467 | −3.34 | 197 | 0.8 |
| C24 | 24 | 327 | 410 | 842 | 57 | 90 | 588 | −2.14 | 240 | 0.9 |
| C25 | 25 | 824 | 410 | 805 | 150 | 90 | 655 | −1.91 | 219 | 0.9 |
| C26 | 26 | 810 | 360 | 1031 | 158 | 110 | 258 | −2.30 | 260 | 0.9 |
| C27 | 27 | 719 | 360 | 993 | 124 | 110 | 352 | −3.29 | 185 | 0.7 |
| C28 | 28 | 700 | 360 | 949 | 157 | 110 | 470 | −3.59 | 240 | 0.8 |
| C29 | 29 | 761 | 360 | 905 | 180 | 110 | 551 | −1.13 | 303 | 0.9 |
| C30 | 30 | 736 | 360 | 848 | 155 | 110 | 673 | −3.16 | 207 | 0.7 |
| C31 | 31 | 738 | 310 | 1089 | 161 | 130 | 247 | −1.72 | 288 | 0.9 |
| C32 | 32 | 804 | 310 | 1050 | 215 | 130 | 339 | −2.30 | 230 | 0.8 |
| C33 | 33 | 707 | 310 | 1000 | 148 | 130 | 445 | −0.77 | 267 | 0.8 |
| C34 | 34 | 845 | 310 | 970 | 198 | 130 | 540 | −0.22 | 304 | 0.8 |
| C35 | 35 | 721 | 310 | 919 | 203 | 130 | 658 | 0.39 | 307 | 0.9 |
| C36 | 36 | 770 | 370 | 947 | 161 | 110 | 234 | −0.67 | 335 | 0.9 |
| C37 | 37 | 746 | 370 | 900 | 183 | 110 | 348 | −3.75 | 177 | 0.8 |
| C38 | 38 | 710 | 370 | 851 | 137 | 110 | 447 | −4.47 | 171 | 0.8 |
| C39 | 39 | 704 | 370 | 795 | 130 | 110 | 567 | −5.74 | 191 | 0.9 |
| C40 | 40 | 725 | 370 | 770 | 133 | 110 | 644 | −4.69 | 161 | 0.7 |
| C41 | 41 | 706 | 320 | 988 | 157 | 130 | 270 | −1.83 | 171 | 0.8 |
| C42 | 42 | 781 | 320 | 951 | 216 | 130 | 360 | −2.19 | 163 | 0.7 |
| C43 | 43 | 715 | 320 | 911 | 192 | 130 | 433 | −2.13 | 95 | 0.7 |
| C44 | 44 | 817 | 320 | 879 | 219 | 130 | 547 | −0.81 | 88 | 0.7 |
| C45 | 45 | 808 | 320 | 818 | 173 | 130 | 656 | −3.41 | 67 | 0.7 |
| C46 | 46 | 722 | 270 | 1052 | 222 | 150 | 258 | −3.45 | 88 | 0.6 |
| C47 | 47 | 750 | 270 | 1003 | 208 | 150 | 364 | −2.93 | 74 | 0.5 |
| C48 | 48 | 824 | 270 | 960 | 271 | 150 | 448 | −1.57 | −1.96 | 0.4 |
| C49 | 49 | 722 | 270 | 919 | 215 | 150 | 567 | −0.09 | −1.89 | 1.8 |
| C50 | 50 | 804 | 270 | 867 | 196 | 150 | 661 | −0.67 | −1.97 | 1.3 |
| C51 | 51 | 823 | 410 | 946 | 193 | 90 | 335 | −0.31 | −1.51 | 1.2 |
| C52 | 52 | 810 | 410 | 931 | 142 | 90 | 363 | −0.16 | −1.76 | 1.6 |
| C53 | 53 | 798 | 410 | 940 | 143 | 90 | 352 | −3.83 | −1.73 | −2.1 |
| C54 | 54 | 771 | 410 | 934 | 141 | 90 | 352 | −4.78 | −1.58 | −3.2 |
| C55 | 55 | 754 | 410 | 933 | 138 | 90 | 355 | −4.59 | −1.99 | −2.8 |
| C56 | 56 | 717 | 410 | 938 | 108 | 90 | 347 | −4.35 | −1.95 | −2.4 |

TABLE 4-1-continued

Manufacturing conditions, analysis results, and evaluation results of plating wettability and plating adhesiveness (examples)

| | CONDITION OF RECRYSTALLIZATION ANNEALING | | | | GALVANIZING TREATMENT CO | |
| | SOAKING FURNACE CONDITION | | | | | |
| LEVEL | CARBON DIOXIDE PARTIAL PRESSURE $\log(PCO_2)$ | CARBON MONOXIDE PARTIAL PRESSURE $\log(PCO)$ | ATMOSPHERE GAS $\log(PCO_2/PCO)$ | SOAKING AND HOLDING TIME PERIOD [SECOND] | Al CONTENT PERCENTAGE IN ZINC PLATING BATH [MASS%] | HEATING TEMPERATURE IN ALLOYING TREATMENT [° C.] |
|---|---|---|---|---|---|---|
| C1 | −5.98 | −1.91 | −4.1 | 184 | 0.11 | 472 |
| C2 | −3.92 | −1.65 | −2.3 | 269 | 0.11 | 552 |
| C3 | −4.98 | −1.92 | −3.1 | 410 | 0.10 | 551 |
| C4 | −3.88 | −1.58 | −2.3 | 408 | 0.09 | 483 |
| C5 | −4.85 | −1.81 | −3.0 | 211 | 0.10 | 492 |
| C6 | −6.08 | −1.97 | −4.1 | 190 | 0.08 | 523 |
| C7 | −6.24 | −1.74 | −4.5 | 269 | 0.11 | 502 |
| C8 | −5.66 | −1.88 | −3.8 | 289 | 0.11 | 475 |
| C9 | −6.12 | −1.95 | −4.2 | 308 | 0.10 | 482 |
| C10 | −6.21 | −1.83 | −4.4 | 427 | 0.10 | 507 |
| C11 | −5.32 | −1.54 | −3.8 | 394 | 0.12 | 551 |
| C12 | −6.68 | −1.90 | −4.8 | 168 | 0.10 | 539 |
| C13 | −5.37 | −1.78 | −3.6 | 472 | 0.11 | 480 |
| C14 | −4.61 | −1.84 | −2.8 | 203 | 0.10 | 545 |
| C15 | −6.13 | −1.54 | −4.6 | 398 | 0.09 | 504 |
| C16 | −4.97 | −1.90 | −3.1 | 316 | 0.10 | 494 |
| C17 | −6.25 | −1.61 | −4.6 | 621 | 0.11 | 507 |
| C18 | −5.02 | −1.89 | −3.1 | 85 | 0.11 | 545 |
| C19 | −5.65 | −1.89 | −3.8 | 850 | 0.11 | 516 |
| C20 | −4.48 | −1.57 | −2.9 | 93 | 0.10 | 547 |
| C21 | −4.33 | −1.93 | −2.4 | 752 | 0.12 | 532 |
| C22 | −4.00 | −1.88 | −2.1 | 59 | 0.10 | 529 |
| C23 | −5.12 | −1.67 | −3.4 | 691 | 0.09 | 481 |
| C24 | −6.74 | −1.87 | −4.9 | 67 | 0.11 | 526 |
| C25 | −5.52 | −1.67 | −3.9 | 634 | 0.11 | 486 |
| C26 | −4.13 | −1.59 | −2.5 | 727 | 0.08 | 476 |
| C27 | −5.11 | −1.56 | −3.6 | 817 | 0.10 | 548 |
| C28 | −4.19 | −1.66 | −2.5 | 734 | 0.08 | 481 |
| C29 | −3.85 | −1.66 | −2.2 | 88 | 0.11 | 542 |
| C30 | −5.37 | −1.72 | −3.7 | 78 | 0.08 | 488 |
| C31 | −6.48 | −1.67 | −4.8 | 91 | 0.10 | 471 |
| C32 | −5.42 | −1.83 | −3.8 | 64 | 0.11 | 549 |
| C33 | −4.17 | −1.54 | −2.6 | 88 | 0.12 | 477 |
| C34 | −3.88 | −1.53 | −2.4 | 15 | 0.08 | 467 |
| C35 | −5.45 | −1.92 | −3.5 | 725 | 0.08 | 493 |
| C36 | −6.50 | −1.95 | −4.6 | 753 | 0.10 | 505 |
| C37 | −4.33 | −1.96 | −2.4 | 36 | 0.11 | 552 |
| C38 | −3.59 | −1.54 | −2.2 | 66 | 0.09 | 472 |
| C39 | −4.60 | −1.69 | −2.9 | 48 | 0.11 | 535 |
| C40 | −6.42 | −1.89 | −4.5 | 799 | 0.08 | 536 |
| C41 | −3.40 | −1.60 | −1.8 | 497 | 0.11 | 471 |
| C42 | −3.27 | −1.67 | −1.6 | 214 | 0.12 | 484 |
| C43 | −2.87 | −1.77 | −1.1 | 206 | 0.08 | 552 |
| C44 | −2.48 | −1.68 | −0.8 | 478 | 0.11 | 516 |
| C45 | −7.11 | −1.51 | −5.6 | 323 | 0.11 | 503 |
| C46 | −6.94 | −1.74 | −5.2 | 270 | 0.09 | 465 |
| C47 | −7.51 | −1.81 | −5.7 | 279 | 0.09 | 550 |
| C48 | −7.61 | −1.61 | −6.0 | 288 | 0.11 | 544 |
| C49 | −3.30 | −1.80 | −1.5 | 391 | 0.11 | 521 |
| C50 | −3.45 | −1.75 | −1.7 | 190 | 0.08 | 489 |
| C51 | −8.40 | −1.90 | −6.5 | 274 | 0.08 | 468 |
| C52 | −7.27 | −1.87 | −5.4 | 291 | 0.12 | 522 |
| C53 | −2.93 | −1.83 | −1.1 | 153 | 0.10 | 527 |
| C54 | −3.17 | −1.97 | −1.2 | 411 | 0.11 | 516 |
| C55 | −7.34 | −1.84 | −5.5 | 122 | 0.08 | 527 |
| C56 | −7.71 | −1.91 | −5.8 | 183 | 0.10 | 540 |

TABLE 4-2

Manufacturing conditions, analysis results, and evaluation results of plating wettability and plating adhesiveness (examples)

ANALYSIS RESULT AND EVALUATION RESULT OF OBTAINED HOT-DIP GALVANIZED STEEL SHEET

| LEVEL | SAMPLE MATERIAL No OF COLD-ROLLED STEEL SHEET | VICKERS HARDNESS | | | CONTENT PERCENTAGES OF C, Si, And Mn IN SURFACE LAYER OF BASE STEEL SHEET (DOWN TO 50 mm IN DEPTH) | | | CONTENT PERCENTAGES OF C, Si, AND Mn IN DEEP PORTION OF BASE STEEL SHEET (GRATHER THAN 50 mm IN DEPTH) | | | $W_{C(A)}/W_{C(B)}$ | $W_{Si(A)}/W_{Si(B)}$ | $W_{Mn(A)}/W_{Mn(B)}$ |
|---|---|---|---|---|---|---|---|---|---|---|---|---|---|
| | | $H_A$ | $H_B$ | $H_A/H_B$ | $W_{C(A)}$ | $W_{Si(A)}$ | $W_{Mn(A)}$ | $W_{C(B)}$ | $W_{Si(B)}$ | $W_{Mn(B)}$ | | | |
| C1 | 1 | 23 | 35 | 0.66 | 0.02 | 0.18 | 0.18 | 0.05 | 0.31 | 0.52 | 0.35 | 0.58 | 0.30 |
| C2 | 2 | 15 | 46 | 0.33 | 0.04 | 0.11 | 0.17 | 0.16 | 0.31 | 0.52 | 0.24 | 0.38 | 0.32 |
| C3 | 3 | 10 | 42 | 0.24 | 0.16 | 0.09 | 0.01 | 0.23 | 0.31 | 0.51 | 0.59 | 0.29 | 0.02 |
| C4 | 4 | 19 | 195 | 0.10 | 0.18 | 0.10 | 0.16 | 0.38 | 0.31 | 0.52 | 0.46 | 0.32 | 0.30 |
| C5 | 5 | 225 | 213 | 1.06 | 0.01 | 0.08 | 0.02 | 0.45 | 0.30 | 0.50 | 0.02 | 0.28 | 0.04 |
| C6 | 6 | 51 | 37 | 1.38 | 0.02 | 0.38 | 0.31 | 0.06 | 1.01 | 0.51 | 0.38 | 0.38 | 0.61 |
| C7 | 7 | 62 | 23 | 2.70 | 0.12 | 0.50 | 0.18 | 0.17 | 1.01 | 0.50 | 0.71 | 0.49 | 0.36 |
| C8 | 8 | 212 | 196 | 1.08 | 0.10 | 0.49 | 0.14 | 0.25 | 1.02 | 0.51 | 0.41 | 0.48 | 0.27 |
| C9 | 9 | 65 | 211 | 0.32 | 0.10 | 0.02 | 0.14 | 0.35 | 1.04 | 0.52 | 0.30 | 0.02 | 0.26 |
| C10 | 10 | 72 | 233 | 0.31 | 0.01 | 0.30 | 0.18 | 0.45 | 1.00 | 0.52 | 0.02 | 0.29 | 0.35 |
| C11 | 11 | 36 | 46 | 0.78 | 0.02 | 0.73 | 0.20 | 0.05 | 2.09 | 0.51 | 0.30 | 0.35 | 0.40 |
| C12 | 12 | 95 | 204 | 0.47 | 0.01 | 0.51 | 0.19 | 0.17 | 2.05 | 0.51 | 0.06 | 0.25 | 0.37 |
| C13 | 13 | 210 | 226 | 0.96 | 0.10 | 0.72 | 0.24 | 0.26 | 2.03 | 0.52 | 0.38 | 0.38 | 0.46 |
| C14 | 14 | 232 | 246 | 0.94 | 0.09 | 0.81 | 0.35 | 0.35 | 2.04 | 0.31 | 0.27 | 0.40 | 0.89 |
| C15 | 15 | 254 | 261 | 0.97 | 0.12 | 0.65 | 0.21 | 0.47 | 2.07 | 0.51 | 0.26 | 0.31 | 0.41 |
| C16 | 16 | 205 | 217 | 0.94 | 0.01 | 1.37 | 0.23 | 0.06 | 3.01 | 0.50 | 0.16 | 0.46 | 0.46 |
| C17 | 17 | 233 | 235 | 0.99 | 0.06 | 1.05 | 0.17 | 0.17 | 3.05 | 0.51 | 0.34 | 0.35 | 0.34 |
| C18 | 18 | 255 | 258 | 0.99 | 0.40 | 0.79 | 0.13 | 0.26 | 3.11 | 0.51 | 1.54 | 0.25 | 0.25 |
| C19 | 19 | 251 | 274 | 0.91 | 0.15 | 1.80 | 0.24 | 0.38 | 3.07 | 0.51 | 0.39 | 0.59 | 0.48 |
| C20 | 20 | 111 | 295 | 0.38 | 0.21 | 0.77 | 0.21 | 0.45 | 3.08 | 0.51 | 0.46 | 0.25 | 0.40 |
| C21 | 21 | 198 | 202 | 0.98 | 0.02 | 0.47 | 0.57 | 0.05 | 1.02 | 2.10 | 0.41 | 0.46 | 0.27 |
| C22 | 22 | 88 | 220 | 0.40 | 0.04 | 0.41 | 0.89 | 0.17 | 1.04 | 2.01 | 0.23 | 0.33 | 0.44 |
| C23 | 23 | 91 | 243 | 0.37 | 0.01 | 0.33 | 0.05 | 0.27 | 1.02 | 2.01 | 0.04 | 0.32 | 0.02 |
| C24 | 24 | 101 | 264 | 0.38 | 0.10 | 0.38 | 0.72 | 0.37 | 1.01 | 2.01 | 0.26 | 0.37 | 0.36 |
| C25 | 25 | 275 | 281 | 0.98 | 0.11 | 0.46 | 0.73 | 0.45 | 1.02 | 2.07 | 0.26 | 0.45 | 0.35 |
| C26 | 26 | 221 | 232 | 0.95 | 0.02 | 0.76 | 0.84 | 0.05 | 2.09 | 2.05 | 0.37 | 0.36 | 0.41 |
| C27 | 27 | 257 | 250 | 1.03 | 0.06 | 0.89 | 0.05 | 0.16 | 2.08 | 2.08 | 0.46 | 0.44 | 0.02 |
| C28 | 28 | 255 | 274 | 0.93 | 0.13 | 0.66 | 0.64 | 0.25 | 2.06 | 2.05 | 0.51 | 0.32 | 0.31 |
| C29 | 29 | 34 | 290 | 0.12 | 0.19 | 0.91 | 1.80 | 0.38 | 2.02 | 2.07 | 0.50 | 0.45 | 0.87 |
| C30 | 30 | 121 | 512 | 0.24 | 0.14 | 1.30 | 0.92 | 0.47 | 2.04 | 2.02 | 0.30 | 0.64 | 0.45 |
| C31 | 31 | 37 | 259 | 0.12 | 0.01 | 1.01 | 0.79 | 0.06 | 3.04 | 2.10 | 0.21 | 0.33 | 0.38 |
| C32 | 32 | 30 | 278 | 0.11 | 0.04 | 1.36 | 0.74 | 0.14 | 3.11 | 2.02 | 0.30 | 0.44 | 0.37 |
| C33 | 33 | 68 | 299 | 0.23 | 0.22 | 1.08 | 0.89 | 0.26 | 3.08 | 2.02 | 0.64 | 0.35 | 0.44 |
| C34 | 34 | 295 | 582 | 0.52 | 0.14 | 1.24 | 0.91 | 0.35 | 3.11 | 2.08 | 0.41 | 0.40 | 0.44 |
| C35 | 35 | 324 | 511 | 0.63 | 0.17 | 1.06 | 0.03 | 0.45 | 3.14 | 2.04 | 0.37 | 0.34 | 0.01 |
| C36 | 36 | 61 | 257 | 0.24 | 0.01 | 0.44 | 2.51 | 0.05 | 1.01 | 4.08 | 0.23 | 0.44 | 0.62 |
| C37 | 37 | 84 | 280 | 0.30 | 0.06 | 0.36 | 1.37 | 0.14 | 1.00 | 4.03 | 0.44 | 0.36 | 0.34 |
| C38 | 38 | 38 | 299 | 0.13 | 0.07 | 0.26 | 1.62 | 0.25 | 1.02 | 4.07 | 0.27 | 0.26 | 0.40 |
| C39 | 39 | 313 | 323 | 0.97 | 0.01 | 0.35 | 1.05 | 0.38 | 1.01 | 4.16 | 0.03 | 0.35 | 0.25 |
| C40 | 40 | 31 | 338 | 0.09 | 0.16 | 0.29 | 1.29 | 0.44 | 1.04 | 4.18 | 0.35 | 0.28 | 0.31 |
| C41 | 41 | 511 | 294 | 1.74 | 0.03 | 0.70 | 1.31 | 0.06 | 2.05 | 4.13 | 0.58 | 0.34 | 0.32 |
| C42 | 42 | 20 | 312 | 0.08 | 0.05 | 0.94 | 1.23 | 0.15 | 2.08 | 4.06 | 0.35 | 0.45 | 0.30 |
| C43 | 43 | 545 | 327 | 1.67 | 0.07 | 0.64 | 1.44 | 0.27 | 2.09 | 4.09 | 0.25 | 0.31 | 0.35 |
| C44 | 44 | 40 | 349 | 0.11 | 0.13 | 0.91 | 1.78 | 0.35 | 2.03 | 4.16 | 0.37 | 0.45 | 0.43 |
| C45 | 45 | 516 | 371 | 1.39 | 0.21 | 0.73 | 2.21 | 0.46 | 2.03 | 4.08 | 0.45 | 0.36 | 0.54 |
| C46 | 46 | 22 | 322 | 0.07 | 0.03 | 1.31 | 1.90 | 0.07 | 3.07 | 4.11 | 0.40 | 0.43 | 0.43 |
| C47 | 47 | 510 | 512 | 1.00 | 0.14 | 1.16 | 1.40 | 0.17 | 3.03 | 4.18 | 0.83 | 0.38 | 0.34 |
| C48 | 48 | 532 | 523 | 1.02 | 0.10 | 1.02 | 1.38 | 0.26 | 3.05 | 4.04 | 0.39 | 0.34 | 0.34 |
| C49 | 49 | 23 | 564 | 0.04 | 0.12 | 1.50 | 1.39 | 0.36 | 3.14 | 4.12 | 0.32 | 0.48 | 0.32 |
| C50 | 50 | 24 | 552 | 0.06 | 0.13 | 1.32 | 1.21 | 0.48 | 3.05 | 4.04 | 0.29 | 0.43 | 0.30 |
| C51 | 51 | 90 | 217 | 0.41 | 0.04 | 0.27 | 0.80 | 0.13 | 1.01 | 2.02 | 0.28 | 0.27 | 0.40 |
| C52 | 52 | 13 | 223 | 0.06 | 0.01 | 0.78 | 0.98 | 0.14 | 1.04 | 2.10 | 0.07 | 0.75 | 0.43 |
| C53 | 53 | 27 | 220 | 0.12 | 0.04 | 0.02 | 0.88 | 0.14 | 1.04 | 2.01 | 0.32 | 0.02 | 0.41 |
| C54 | 54 | 210 | 220 | 0.95 | 0.08 | 0.39 | 0.87 | 0.17 | 1.01 | 2.01 | 0.33 | 0.38 | 0.43 |
| C55 | 55 | 220 | 221 | 1.00 | 0.04 | 0.29 | 0.81 | 0.18 | 1.02 | 2.01 | 0.27 | 0.28 | 0.40 |
| C56 | 56 | 37 | 219 | 0.12 | 0.05 | 0.30 | 0.85 | 0.16 | 1.02 | 2.03 | 0.29 | 0.29 | 0.32 |

TABLE 4-2-continued

Manufacturing conditions, analysis results, and evaluation results of plating wettability and plating adhesiveness (examples)

ANALYSIS RESULT AND EVALUATION RESULT OF OBTAINED HOT-DIP GALVANIZED STEEL SHEET

HOT-DIP GALVANIZING LAYER

| LEVEL | THICKNESS [mm] | Fe CONTENT PERCENTAGE [MASS%] | Al CONTENT PERCENTAGE [MASS%] | PLATING WETTABILITY | PLATING ADHESIVENESS | TOTAL POINT | NOTE |
|---|---|---|---|---|---|---|---|
| C1 | 6.4 | 8.3 | 0.04 | X | ○ | 1 | COMPARATIVE EXAMPLE |
| C2 | 9.3 | 8.1 | 0.06 | X | X | 0 | COMPARATIVE EXAMPLE |
| C3 | 4.8 | 11.5 | 0.03 | ○ | X | 1 | COMPARATIVE EXAMPLE |
| C4 | 12.8 | 8.3 | 0.01 | X | X | 0 | COMPARATIVE EXAMPLE |
| C5 | 4.7 | 14.5 | 0.03 | X | X | 0 | COMPARATIVE EXAMPLE |
| C6 | 4.6 | 8.7 | 0.03 | X | X | 0 | COMPARATIVE EXAMPLE |
| C7 | 11.4 | 11.3 | 0.02 | X | ○ | 1 | COMPARATIVE EXAMPLE |
| C8 | 3.5 | 10.2 | 0.03 | X | X | 0 | COMPARATIVE EXAMPLE |
| C9 | 6.5 | 9.4 | 0.02 | X | X | 0 | COMPARATIVE EXAMPLE |
| C10 | 8.2 | 8.8 | 0.01 | X | X | 0 | COMPARATIVE EXAMPLE |
| C11 | 7.4 | 9.3 | 0.02 | X | X | 0 | COMPARATIVE EXAMPLE |
| C12 | 11.5 | 8.8 | 0.02 | ○ | X | 1 | COMPARATIVE EXAMPLE |
| C13 | 12.0 | 11.0 | 0.03 | X | X | 0 | COMPARATIVE EXAMPLE |
| C14 | 9.0 | 2.8 | 0.05 | X | X | 0 | COMPARATIVE EXAMPLE |
| C15 | 5.0 | 10.1 | 0.03 | X | X | 0 | COMPARATIVE EXAMPLE |
| C16 | 9.8 | 11.6 | 0.04 | X | X | 0 | COMPARATIVE EXAMPLE |
| C17 | 4.3 | 10.3 | 0.02 | X | X | 0 | COMPARATIVE EXAMPLE |
| C18 | 7.8 | 9.0 | 0.04 | X | X | 0 | COMPARATIVE EXAMPLE |
| C19 | 3.8 | 9.0 | 0.04 | X | X | 0 | COMPARATIVE EXAMPLE |
| C20 | 4.6 | 11.9 | 0.05 | X | X | 0 | COMPARATIVE EXAMPLE |
| C21 | 10.0 | 11.9 | 0.06 | X | X | 0 | COMPARATIVE EXAMPLE |
| C22 | 6.1 | 9.6 | 0.03 | X | X | 0 | COMPARATIVE EXAMPLE |
| C23 | 12.7 | 8.4 | 0.06 | X | X | 0 | COMPARATIVE EXAMPLE |
| C24 | 12.4 | 6.0 | 0.02 | X | X | 0 | COMPARATIVE EXAMPLE |
| C25 | 11.8 | 11.2 | 0.02 | X | X | 0 | COMPARATIVE EXAMPLE |
| C26 | 9.2 | 10.7 | 0.02 | X | X | 0 | COMPARATIVE EXAMPLE |
| C27 | 11.8 | 15.2 | 0.05 | ○ | X | 1 | COMPARATIVE EXAMPLE |
| C28 | 7.6 | 10.1 | 0.02 | X | X | 0 | COMPARATIVE EXAMPLE |
| C29 | 11.4 | 9.1 | 0.04 | X | X | 0 | COMPARATIVE EXAMPLE |
| C30 | 10.4 | 11.5 | 0.06 | X | X | 0 | COMPARATIVE EXAMPLE |
| C31 | 6.0 | 12.0 | 0.05 | X | X | 0 | COMPARATIVE EXAMPLE |
| C32 | 5.0 | 11.1 | 0.02 | X | X | 0 | COMPARATIVE EXAMPLE |
| C33 | 12.4 | 10.3 | 0.05 | ○ | X | 1 | COMPARATIVE EXAMPLE |
| C34 | 3.2 | 11.3 | 0.06 | X | X | 0 | COMPARATIVE EXAMPLE |
| C35 | 10.3 | 10.7 | 0.02 | X | X | 0 | COMPARATIVE EXAMPLE |
| C36 | 8.1 | 9.1 | 0.05 | X | X | 0 | COMPARATIVE EXAMPLE |
| C37 | 9.5 | 10.4 | 0.06 | X | X | 0 | COMPARATIVE EXAMPLE |
| C38 | 8.1 | 9.9 | 0.03 | X | X | 0 | COMPARATIVE EXAMPLE |
| C39 | 3.1 | 8.1 | 0.05 | X | X | 0 | COMPARATIVE EXAMPLE |
| C40 | 6.3 | 11.5 | 0.03 | X | ○ | 1 | COMPARATIVE EXAMPLE |
| C41 | 5.0 | 11.9 | 0.04 | X | X | 0 | COMPARATIVE EXAMPLE |
| C42 | 8.5 | 9.1 | 0.04 | X | ○ | 1 | COMPARATIVE EXAMPLE |
| C43 | 9.8 | 2.5 | 0.02 | X | X | 0 | COMPARATIVE EXAMPLE |
| C44 | 8.3 | 9.0 | 0.03 | X | X | 0 | COMPARATIVE EXAMPLE |
| C45 | 5.0 | 8.8 | 0.04 | X | X | 0 | COMPARATIVE EXAMPLE |
| C46 | 6.4 | 9.0 | 0.04 | X | X | 0 | COMPARATIVE EXAMPLE |
| C47 | 10.9 | 11.6 | 0.04 | X | X | 0 | COMPARATIVE EXAMPLE |
| C48 | 3.2 | 11.5 | 0.02 | X | X | 0 | COMPARATIVE EXAMPLE |
| C49 | 8.1 | 9.9 | 0.05 | X | X | 0 | COMPARATIVE EXAMPLE |
| C50 | 9.7 | 11.2 | 0.04 | X | X | 0 | COMPARATIVE EXAMPLE |
| C51 | 11.2 | 14.3 | 0.06 | X | X | 0 | COMPARATIVE EXAMPLE |
| C52 | 7.0 | 3.5 | 0.03 | X | X | 0 | COMPARATIVE EXAMPLE |
| C53 | 5.0 | 10.6 | 0.06 | X | X | 0 | COMPARATIVE EXAMPLE |
| C54 | 3.3 | 10.5 | 0.06 | ○ | X | 1 | COMPARATIVE EXAMPLE |
| C55 | 5.9 | 8.3 | 0.01 | X | X | 0 | COMPARATIVE EXAMPLE |
| C56 | 6.4 | 10.7 | 0.05 | ○ | X | 1 | COMPARATIVE EXAMPLE |

After the treatment in the soaking furnace, the sample materials underwent a general slow cooling step, quenching step, overaging step, and second cooling step and were immersed in a hot-dip galvanizing bath. Conditions of the hot-dip galvanizing bath and an alloying furnace are also shown in Tables 2-1 to 4-2. Each thickness of hot-dip galvanizing layers was adjusted by nitrogen gas wiping.

Plating wettability and plating adhesiveness of obtained hot-dip galvanized steel sheets were evaluated. Results of the evaluation are also shown in Tables 2-1 to 4-2.

Of the obtained hot-dip galvanized steel sheets, Vickers hardnesses $H_A$ and $H_B$ and $W_{C(A)}$, $W_{Si(A)}$, $W_{Mn(A)}$, $W_{C(B)}$, $W_{Si(B)}$, and $W_{Mn(B)}$ were found by the previously described methods. Further, of the hot-dip galvanizing layers, thicknesses, content percentages of Fe, and content percentages of Al were also found by the previously described methods. Respective results are shown in Tables 2 to 4.

The plating adhesiveness was measured by a powdering test, and the case of a peeled width of the hot-dip galvanizing layer being greater than 2 mm was evaluated as rejection (x) because of adhesiveness being bad, the case of the peeled width being 2 mm or less and greater than 0.5 mm was evaluated as pass (○) because of adhesiveness being good, and the case of the peeled width being 0.5 mm or less was evaluated as pass (◎) because of adhesiveness being extremely good. The powdering test is an adhesiveness inspection method, in which to an alloyed hot-dip galvanized steel sheet, a Sellotape (registered trademark) is applied, a tape surface is bent at 90° and is bent back, and then the tape is peeled off, and a peeled width made at that time is measured.

With regard to the plating wettability, after the plating adhesiveness was measured by the powdering test, a plating surface having a size of 200 μm×200 μm in the adhesiveness measured portion was subjected to EPMA mapping of Zn and Fe, and the case of an area ratio of a place where there is no Zn and Fe is exposed being not less than 20% nor more than 100% was evaluated as rejection (x) because of wettability being bad, the case of the area ratio being 5% or more and less than 20% was evaluated as pass (○) because of wettability being good, and the case of the area ratio being less than 5% was evaluated as pass (◎) because of wettability being extremely good.

Examination results of the plating wettability and the plating adhesiveness of the examples of the present invention and the comparative examples were rated with points, in which ◎ was regarded as 2 points, ○ was regarded as 1 point, and x was regarded as 0 point. Then, the sum of points of the plating wettability and points of the plating adhesiveness was set to a total point. With regard to overall evaluation, the evaluation of plating wettability was ○ or ◎, the evaluation of plating adhesiveness was ○ or ◎, and the total point was 2 points or more (2 points to 4 points), which was regarded as pass. It was found that Levels A1 to A72, B1 to B72, and C1 to C72 in Tables 2-1 to 3-2 that are the examples of the present invention are excellent in plating wettability and plating adhesiveness as compared to Levels D1 to D56 in Tables 4-1 to 4-2 that are the comparative examples.

INDUSTRIAL APPLICABILITY

The hot-dip galvanized steel sheet according to the present invention is excellent in plating wettability and plating adhesiveness, to thus be usable as a member of products in an automotive field, a household appliance filed, or a building material filed, for example.

The invention claimed is:

1. A hot-dip galvanized steel sheet including a base steel sheet and a hot-dip galvanizing layer formed on at least one surface of the base steel sheet, wherein
the base steel sheet contains, in mass %,
C: not less than 0.05% nor more than 0.50%,
Si: not less than 0.1% nor more than 3.0%,
Mn: not less than 0.5% nor more than 5.0%,
P: not less than 0.001% nor more than 0.5%,
S: not less than 0.001% nor more than 0.03%,
Al: not less than 0.005% nor more than 1.0%, and
one or two or more of elements selected from Ti, Nb, Cr, Mo, Ni, Cu, Zr, V, W, B, Ca, and a rare-earth element REM: 0% to not more than 1% each, and
a balance being composed of Fe and inevitable impurities, and
in the base steel sheet, a value of $H_A$ representing average Vickers hardness in a surface layer ranging from an interface between the base steel sheet and the hot-dip galvanizing layer to 50 μm in depth and a value of $H_B$ representing average Vickers hardness in a deep portion ranging from the interface to greater than 50 μm in depth satisfy all the following relational expressions (1) to (3), $$50 \leq H_A \leq 500 \quad (1),$$

$$50 \leq H_B \leq 500 \quad (2),$$

$$0.5 \leq H_A/H_B \leq 0.9 \quad (3).$$

2. The hot-dip galvanized steel sheet according to claim 1, wherein
$W_{C(A)}$, $W_{Si(A)}$, and $W_{Mn(A)}$ representing content percentages of C, Si, and Mn in mass % in the surface layer of the base steel sheet respectively and $W_{C(B)}$, $W_{Si(B)}$, and $W_{Mn\ (B)}$ representing content percentages of C, Si, and Mn in mass % in the deep portion of the base steel sheet respectively satisfy all the following relational expressions (4) to (6), $$0.1 \leq W_{C(A)}/W_{C(B)} \leq 0.5 \quad (4),$$

$$0.1 \leq W_{Si(A)}/W_{Si(B)} \leq 0.5 \quad (5),$$

$$0.1 \leq W_{Mn(A)}/W_{Mn(B)} \leq 0.5 \quad (6).$$

3. The hot-dip galvanized steel sheet according to claim 1, wherein
the base steel sheet contains one or two or more of elements selected from Ti, Nb, Cr, Mo, Ni, Cu, Zr, V, W, B, Ca, and a rare-earth element REM in not less than 0.0001% nor more than 1% each.

4. The hot-dip galvanized steel sheet according to claim 1, wherein
the hot-dip galvanizing layer has a thickness in the range of not less than 1 μm nor more than 30 μm and contains not less than 4 mass % nor more than 14 mass % of Fe, not less than 0.1 mass % nor more than 1 mass % of Al, and a balance being composed of Zn and inevitable impurities.

5. The hot-dip galvanized steel sheet according to claim 2, wherein
the base steel sheet contains one or two or more of elements selected from Ti, Nb, Cr, Mo, Ni, Cu, Zr, V, W, B, Ca, and a rare-earth element REM in not less than 0.0001% nor more than 1% each.

6. The hot-dip galvanized steel sheet according to claim 5, wherein
the hot-dip galvanizing layer has a thickness in the range of not less than 1 μm nor more than 30 μm, and contains not less than 4 mass % nor more than 14 mass % of Fe, not less than 0.1 mass % nor more than 1 mass % of Al, and a balance being composed of Zn and inevitable impurities.

7. The hot-dip galvanized steel sheet according to claim 2, wherein
the hot-dip galvanizing layer has a thickness in the range of not less than 1 μm nor more than 30 μm, and contains not less than 4 mass % nor more than 14 mass % of Fe, not less than 0.1 mass % nor more than 1 mass % of Al, and a balance being composed of Zn and inevitable impurities.

8. The hot-dip galvanized steel sheet according to claim 3, wherein
the hot-dip galvanizing layer has a thickness in the range of not less than 1 μm nor more than 30 μm, and contains not less than 4 mass % nor more than 14 mass % of Fe, not less than 0.1 mass % nor more than 1 mass % of Al, and a balance being composed of Zn and inevitable impurities.

9. A method for manufacturing the hot-dip galvanized steel sheet of claim 1 by performing a hot-dip galvanizing treatment on the base steel sheet, wherein
the base steel sheet is obtained after undergoing a casting step, a hot rolling step, a pickling step, a cold rolling step, an annealing step, and a soaking and holding step, and contains, in mass %,
C: not less than 0.05% nor more than 0.50%,
Si: not less than 0.1% nor more than 3.0%,
Mn: not less than 0.5% nor more than 5.0%,
P: not less than 0.001% nor more than 0.5%,
S: not less than 0.001% nor more than 0.03%,
Al: not less than 0.005% nor more than 1.0%, and
one or two or more of elements selected from Ti, Nb, Cr, Mo, Ni, Cu, Zr, V, W, B, Ca, and a rare-earth element REM: 0% to not more than 1% each, and
a balance being composed of Fe and inevitable impurities,
the annealing step and the soaking and holding step are performed in a continuous hot-dip galvanizing facility equipped with an all radiant tube type heating furnace as a heating furnace and a soaking furnace,
the annealing step is performed so as to satisfy the following heating furnace conditions:
heating temperature: a sheet temperature $T_0$ [° C.] representing the maximum temperature that, when a cold-rolled steel sheet obtained after undergoing the cold rolling step is heated in the heating furnace, the cold-rolled steel sheet reaches is in the range of not lower than a temperature $T_1$ [° C.] nor higher than a temperature $T_2$ [° C.];
heating time period: a heating time period $S_0$ [second] in the heating furnace is in the range of not shorter than a time period $S_1$ [second] nor longer than a time period $S_2$ [second]; and
atmosphere gas: a nitrogen atmosphere containing carbon dioxide and carbon monoxide in which log $(PCO_2/PCO)$ being a logarithmic value of a value of, in the heating furnace, a partial pressure value of carbon dioxide divided by a partial pressure value of carbon monoxide exhibits a value in the range of not less than −2 nor more than 1,
here, the temperatures $T_1$ and $T_2$ and the time periods $S_1$ and $S_2$ are defined as follows:

$T_1$: a temperature [° C.] satisfying the following relational expression (7) using $W_{Si\ (B)}$ and $W_{Mn\ (B)}$ representing content percentages of Si and Mn in mass % in a deep portion ranging from a surface of the cold-rolled steel sheet to greater than 50 μm in depth respectively;

$$T_1 = 500 - 50 \times W_{Si(B)} - 20 \times W_{Mn(B)} \tag{7}$$

$T_2$: a temperature [° C.] satisfying the following relational expression (8) using a temperature $T_{Ac3}$ [° C.] corresponding to a transformation point $A_{c3}$ of the cold-rolled steel sheet;

$$T_2 = T_{Ac3} + 40 \tag{8}$$

$S_1$: a time period satisfying the following relational expression (9) using $W_{Si\ (B)}$ [mass %] representing the content percentage of Si and $W_{Mn(B)}$ [mass %] representing the content percentage of Mn in the deep portion of the cold-rolled steel sheet; and $$S_1 = 50 + 20 \times W_{Si(B)} + 10 \times W_{Mn(B)} \tag{9}$$

$S_2$: a time period satisfying the following relational expression (10) using $W_{C\ (B)}$ [mass %] representing content percentage of C in the deep portion of the cold-rolled steel sheet, $$S_2 = 200 + 1000 \times W_{C(B)} \tag{10}$$

the soaking and holding step is performed so as to satisfy the following soaking furnace conditions:
soaking and holding time period: a time period during which the cold-rolled steel sheet is held in the soaking furnace is in the range of not shorter than 100 seconds nor longer than 600 seconds; and
atmosphere gas: a nitrogen atmosphere containing carbon dioxide and carbon monoxide in which a value of $\log(PCO_2/PCO)$ in the soaking furnace is in the range of −5 or more to less than −2, and
in the plating step, a hot-dip galvanizing layer containing not less than 4 mass % nor more than 14 mass % of Fe, not less than 0.1 mass % nor more than 1 mass % of Al, and a balance being composed of Zn and inevitable impurities is formed on the surface of the base steel sheet so as to have a thickness of not less than 1 μm nor more than 30 μm.

10. The method according to claim 9, wherein
on the occasion of performing the hot-dip galvanizing treatment, the base steel sheet obtained after undergoing the soaking and holding step is immersed in a hot-dip galvanizing bath containing not less than 0.05 mass % nor more than 0.20 mass % of Al, and then is subjected to an alloying treatment in which heating is performed to a heating temperature in the range of not lower than 450° C. nor higher than 560° C.

* * * * *